United States Patent
Hillier et al.

(10) Patent No.: US 10,523,492 B2
(45) Date of Patent: Dec. 31, 2019

(54) METHOD AND SYSTEM FOR DETERMINING COMPATIBILITY OF COMPUTER SYSTEMS

(71) Applicant: Cirba Inc., Richmond Hill (CA)

(72) Inventors: Andrew D. Hillier, Toronto (CA); Tom Yuyitung, Toronto (CA)

(73) Assignee: Cirba IP Inc., Markham (CA)

(*) Notice: Subject to any disclaimer, the term of this patent is extended or adjusted under 35 U.S.C. 154(b) by 655 days.

(21) Appl. No.: 14/341,471

(22) Filed: Jul. 25, 2014

(65) Prior Publication Data
US 2015/0081868 A1    Mar. 19, 2015

Related U.S. Application Data

(63) Continuation of application No. 11/738,936, filed on Apr. 23, 2007, now Pat. No. 8,793,679, which is a
(Continued)

(51) Int. Cl.
*G06F 15/173* (2006.01)
*H04L 12/24* (2006.01)

(52) U.S. Cl.
CPC ........ *H04L 41/022* (2013.01); *H04L 41/0853* (2013.01); *H04L 41/0873* (2013.01)

(58) Field of Classification Search
CPC .............. H04L 41/022; H04L 41/0873; H04L 41/0853; H04L 12/24
(Continued)

(56) References Cited

U.S. PATENT DOCUMENTS 6,249,769 B1 * 6/2001 Ruffin ................... G06Q 10/06
                                                                 705/7.13
6,412,012 B1 * 6/2002 Bieganski .............. G06Q 30/02
                                                                 709/232
(Continued)

FOREIGN PATENT DOCUMENTS

EP           0498130 A2     8/1992
WO     WO 2004/084083 A1    9/2004

OTHER PUBLICATIONS

U.S. Appl. No. 60/969,344, filed Aug. 31, 2007, pp. 1-24.*
(Continued)

*Primary Examiner* — Anthony Mejia
(74) *Attorney, Agent, or Firm* — Brett J. Slaney; Blake, Cassels & Graydon LLP

(57) ABSTRACT

Compatibility and consolidation analyses can be performed on a collection of systems to evaluate the 1-to-1 compatibility of every source-target pair, evaluate the multi-dimensional compatibility of specific transfer sets, and to determine the best consolidation solution based on various constraints including the compatibility scores of the transfer sets. The analyses can be done together or be performed independently. These analyses are based on collected system data related to their technical configuration, business factors and workloads. Differential rule sets and workload compatibility algorithms are used to evaluate the compatibility of systems. The technical configuration, business and workload related compatibility results are combined to create an overall compatibility assessment. These results are visually represented using color coded scorecard maps.

33 Claims, 54 Drawing Sheets

Related U.S. Application Data continuation-in-part of application No. 11/535,355, filed on Sep. 26, 2006, now Pat. No. 7,809,817, and a continuation-in-part of application No. 11/535,308, filed on Sep. 26, 2006, now Pat. No. 7,680,754.

(60) Provisional application No. 60/745,322, filed on Apr. 21, 2006.

(58) Field of Classification Search
USPC .......................................................... 709/223
See application file for complete search history.

(56) References Cited

U.S. PATENT DOCUMENTS

| | | | |
|---|---|---|---|
| 6,487,723 B1* | 11/2002 | MacInnis | A63F 13/12 725/132 |
| 6,557,008 B1 | 4/2003 | Temple, III et al. | |
| 7,055,149 B2 | 5/2006 | Birkholz et al. | |
| 7,577,722 B1* | 8/2009 | Khandekar | G06F 9/45558 709/220 |
| 7,616,583 B1* | 11/2009 | Power | G06Q 10/06 370/252 |
| 7,640,342 B1 | 12/2009 | Aharoni et al. | |
| 7,680,754 B2 | 3/2010 | Hillier | |
| 7,809,817 B2 | 10/2010 | Hillier | |
| 7,865,889 B1* | 1/2011 | Bird | G06F 8/60 717/168 |
| 8,024,743 B2* | 9/2011 | Werner | G06F 9/541 709/203 |
| 8,667,500 B1 | 3/2014 | Ji et al. | |
| 2001/0049743 A1* | 12/2001 | Phippen | G06F 9/541 709/237 |
| 2002/0078262 A1* | 6/2002 | Harrison | G06F 9/44526 719/331 |
| 2002/0199180 A1* | 12/2002 | Donaldson | G06F 9/45537 717/178 |
| 2003/0154472 A1* | 8/2003 | Daase | G06F 8/61 717/176 |
| 2004/0034577 A1 | 2/2004 | Van Hoose et al. | |
| 2004/0107125 A1* | 6/2004 | Guheen | G06Q 50/01 705/319 |
| 2005/0132331 A1 | 6/2005 | Wood | |
| 2005/0209819 A1* | 9/2005 | Wehrs | G06F 9/4411 702/182 |
| 2006/0155912 A1* | 7/2006 | Singh | G06F 9/5088 711/6 |
| 2006/0179124 A1* | 8/2006 | Stefaniak | G06F 9/5055 709/219 |
| 2006/0179171 A1* | 8/2006 | Stefaniak | G06F 9/5061 710/15 |
| 2006/0179431 A1* | 8/2006 | Devanathan | G06F 8/61 717/168 |
| 2006/0184917 A1* | 8/2006 | Troan | G06F 11/2289 717/124 |
| 2006/0253472 A1* | 11/2006 | Wasserman | G06Q 10/06 |
| 2007/0006218 A1* | 1/2007 | Vinberg | G06F 8/61 717/174 |
| 2007/0094375 A1 | 4/2007 | Snyder et al. | |
| 2007/0156857 A1* | 7/2007 | King | H04L 41/0806 709/220 |
| 2007/0250615 A1 | 10/2007 | Hillier | |
| 2007/0250621 A1 | 10/2007 | Hillier | |
| 2009/0070771 A1* | 3/2009 | Yuyitung | G06Q 10/06 718/105 |
| 2013/0204975 A1* | 8/2013 | Keith, Jr. | H04L 63/10 709/219 |
| 2015/0089501 A1* | 3/2015 | Ganesan | G06F 9/5077 718/1 |

OTHER PUBLICATIONS

McKenna, D.; "Systems Consolidation Framework"; 2004; pp. 1 to 21; http://www.sun.com/emrkt/campaign_docs/0904enterprise_consolidation/consolidation_framework.pdf.

Tanenbaum, Andrew S. et al; Distributed Systems: Principles and Paradigms; US Ed edition; Jan. 15, 2002; pp. 22-42, 326-336; Prentice Hall.

Hillier, Andrew; "A Quantitative and Analytical Approach to Server Consolidation" dated Jan. 2006, published at least as early as Feb. 3, 2006; CiRBA Inc.; Technical Whitepaper.

Hillier, Andrew; "Data Center Intelligence" dated Mar. 2006, published at least as early as Apr. 1, 2006; CiRBA Inc.; Technical Whitepaper.

Spellman, Amy et al.; "Server Consolidation Using Performance Modeling"; IT Professional; Sep./Oct. 2003; pp. 31-36; vol. 5, No. 5.

Tsagaris, N.; International PCT Search Report from corresponding PCT Application No. PCT/CA2007/000675; search completed Jun. 19, 2007.

Kielhofer, P.; Search Report from corresponding European Application No. 13169900.1; search completed Nov. 6, 2013.

Kielhofer, P.; Supplementary Partial Search Report for corresponding European Application No. 07719602.0; search completed Jul. 7, 2010.

Examination report dated Nov. 24, 2016 issued in respect of European Application No. 13169900.1.

Raman, R. et al.; "Policy Drive Heterogeneous Resource Co-Allocation with Gangmatching"; HPDC '03 Proceedings of the 12th IEEE International Symposium on High Performance Distributed Computing; Jun. 22-24, 2003; IEEE computer Society, U.S.A.

VMware Product Data Sheet; VMware DRS: Dynamic balancing and allocation of resources for virtual machines; https://www.vmware.com/pdf/drs_datasheet.pdf; VMware, Inc.; published at least as early as 2007.

VMware Infrastructure: Resource Management; https://www.vmware.com/pdf/vmware_drs_wp.pdf; VMware, Inc.; published at least as early as 2006.

* cited by examiner

| Name | Description |
|---|---|
| Solaris Kernel Settings | Detailed Analysis of Solaris Kernel Settings |
| Solaris Name Service Settings | Detailed Analysis of Solaris Name Service Settings |
| Solaris NVRAM Settings | Detailed Analysis of Solaris EEPROM Settings |
| UNIX Application Stacking | Detailed analysis rules for OS-level stacking of UNIX apps onto existing or new systems |
| UNIX Forward Consolidation | Detailed analysis rules for forward consolidation of UNIX applications onto existing infrastructure |
| WebLogic J2EE App Stacking | WebLogic J2EE Application Stacking Ruleset |
| Windows Compatibility | Assess compatibility between Windows systems |
| Acquisition Date | Group servers based on acquisition date |
| Application Tier | Prevent consolidating servers across application tiers. |
| Availability Target | Prevent combining servers with differing availability (uptime) targets |
| Backup Window | Prevent combining servers with differing backup windows |
| Building | Prevent consolidating servers between buildings |
| Business Service | Prevent consolidating servers across business services |
| Combined Constraints | Combined business constraint ruleset |
| Department | Prevent consolidating servers across departments |
| DR Strategy | Prevent combining servers with inconsistent DR strategies |
| Lease Renewal Date | Group servers based on lease renewal date |
| Location | Prevent consolidating servers across physical locations |
| Maintenance Window | Prevent consolidating servers with contentious maintenance windows |
| Operational Environment | Prevent consolidating servers between environments |
| Operational Role | Prevent consolidating servers that have differing functional roles |
| Ownership | Prevent combining servers that belong to different owners |
| Primary Application | Prevent combining servers that are servicing different applications |
| Service Plan | Prevent consolidating servers that have different service plans |
| UPS Profile | Prevent combining servers that have differing UPS requirements |
| Oracle Stacking Analysis Data Validation | Determine data coverage for app stacking analysis |
| UNIX Analysis Data Validation | Determine data coverage for app stacking analysis |
| Windows Analysis Data Validation | Determine data coverage for windows stacking and virtualization analysis |
| Oracle Data Stacking | Assess data consolidation potential between Oracle instances |
| Oracle Instance Stacking | Assess affinity for instance-level stacking |
| SQL Server 2000 (WMI) | Map out data-level consolidation opportunities in MS SQL 2000 environments |
| Windows File and Print Consolidation | Analyze compatibility of file and print servers |
| Hardware Models | Map out manufacturers and models |
| Macro Analysis | Combined Macro Analysis ruleset |
| OS Map | Map out OS Types, Versions and kernel patch levels |
| OS Map (with Kernel Bits) | Map out high-level OS affinity regions |

Figure 12

| Name | Description |
|---|---|
| CPU Utilization | CPU resource constraints |
| Disk I/O | Disk I/O constraints |
| Network I/O | Network I/O constraints |
| Disk capacity | Available disk space |
| Memory | Available memory resources |

Figure 13

| | Rule Type | Rule Specifier | Source | Target | Weight | Mutex Flag | Match Flag | Suppress Flags | Remediation Cost | Description |
|---|---|---|---|---|---|---|---|---|---|---|
| 1 | AliasQuery | OS | | | 70% | | OS | | $1,200 | Different Operating Systems |
| 2 | AliasQuery | OS Version | | | 30% | | VER | OS | $320 | Different Operating System Versions |
| 3 | AliasQuery | Time Zone | | | 20% | | | | $320 | Systems are in Different Time Zones |
| 4 | AliasQuery | Total memory | | v | 5% | | | | $350 | Target Has Less Memory |
| 5 | UriQuery | cirba-cm/ServerInformation/OSPatchLevel | | | 5% | | PATCH | OS VER | $160 | Different Patch Levels |
| 6 | UriQuery | cirba-pa/patches Table/# | | | 5% | Y | | OS VER | $80 | Patch Differences Between Systems |
| 7 | UriQuery | cirba-cm/ServerInformation/OSKernelBits | | | 10% | | | OS | $80 | Not Running Same Kernel Bits |
| 8 | UriQuery | cirba-cm/KernelParametersTable/# | present | absent | 5% | Y | | OS | $80 | Some Kernel Parameters are Absent |
| 9 | UriQuery | cirba-cm/KernelParametersTable/Setting#SHMMAX | v | | 5% | | | | $80 | Maximum Shared Memory Settings Differ |
| 10 | UriQuery | cirba-si/appInvTableTable.appInvTableTable/version#oracle | 9 | 8 | 4% | | ORA | | $1,500 | Different Version of Oracle |
| 11 | UriQuery | cirba-si/appInvTableTable.appInvTableTable/version#oracle | | | 5% | | | ORA | $3,500 | Different Version of Oracle |
| 12 | UriQuery | cirba-si/appInvTableTable.appInvTableTable/version#apache | | | 2% | | | | $80 | Different Version of Apache |
| 13 | UriQuery | win32-os/Win32_OperatingSystem/ServicePackMajorVersion | | | 5% | | PATCH | OS VER | $160 | Different Service Pack Levels |
| 14 | UriQuery | win32-quickfix/win-hotfix/# | present | absent | 5% | Y | | OS VER | $80 | Patch Differences Between Systems |
| 15 | UriQuery | win32-os/Win32_StartupCommand/# | | | 2% | Y | | OS | $80 | Startup Commands are Different |
| 16 | UriQuery | win32-misc/Win32_Environment/VariableValue#Path | | | 2% | | | OS | $80 | Global Path is Different |
| 17 | UriQuery | win32-misc/Win32_Environment/VariableValue#Path <SYSTEM> | | | 2% | | | OS | $80 | System Path is Different |
| 18 | UriQuery | win32-os/Win32_Service/# | present | absent | 5% | Y | | OS | $160 | Some Services not On Target |
| 19 | UriQuery | win32-os/Win32_Service/Started | | | 1% | Y | | OS | $80 | Some Services not Started On Target |
| 20 | UriQuery | win32-application/win-products/#McAfee VirusScan Enterprise | present | absent | 5% | | | OS | $200 | McAfee Not On Target |

Multi-stack Workload Compatibility Report

*Report Generated: Feb 7, 2007 8:55:11 PM*

Summary

| | |
|---|---|
| Transfer Source | dci.site.213 |
| Transfer Source | dci.site.177 |
| Transfer Source | dci.site.218 |
| Transfer Source | dci.site.201 |
| Transfer Source | dci.site.127 |
| Transfer Source | exch01 |
| Target | ibmsystemx3950-b |
| Score | 83 |
| Workload Type | CPU Utilization |
| Usage Limit | 75 % |
| Benchmark Type | cpu |
| Transfer Source Benchmark | 4132 |
| Transfer Source Benchmark | 888 |
| Transfer Source Benchmark | 6008 |
| Transfer Source Benchmark | 4820 |
| Transfer Source Benchmark | 444 |
| Transfer Source Benchmark | 2410 |
| Target Benchmark | 5916 |

Scorecard

| Criteria | Value | Score |
|---|---|---|
| Peak 4th Quartile (Like Times) | 102 | 64 |
| Peak 4th Quartile (Worst Case) | 164 | 0 |
| Peak 3rd Quartile (Like Times) | 3 | 100 |
| Peak 3rd Quartile (Worst Case) | 5 | 100 |
| Aggregate | | 83 |

Target Server - ibmsystemx3950-b (Avg 0.00 %)

Analysis Summary - Microsoft Internet Explorer provided by CiRBA, Inc.

|  | Initial State | After Transfers |
|---|---|---|
| Total Systems | 27 | 21 |
| Consolidation % | - | 22.23% reduction |
| Consolidation % (Net of Targets) | - | 22.23% reduction |
| Consolidated Systems | - | 6 |
| Transferred Systems | - | 6 |
| Sources Only | 0 | 0 |
| Targets Only | 0 | 0 |
| Sources And Targets | 27 | 21 |

Rulesets

| Name | Category | Version | Importance |
|---|---|---|---|
| Unix | Configuration | 1 | 3 |
| Combined Business Constraints | Business Constraints | 01052007 | 5 |

Workload Types

| Name | Limits | Importance |
|---|---|---|
| CPU_Utilization | 90 | 1 |

Workload Settings

| | |
|---|---|
| Audit Date Range | All available workload data |
| Workload Days Included | Monday, Tuesday, Wednesday, Thursday, Friday, Saturday, Sunday |

Transfers

| Source | Transfer | Target |
|---|---|---|
| _dci.ny.206_ | Stacks onto | _dci.ny.110_ |
| _dci.ny.455_ | Stacks onto | _dci.ny.408_ |
| _dci.ny.231_ | Stacks onto | _dci.ny.460_ |
| _dci.ny.329_ | Stacks onto | _dci.ny.418_ |
| _dci.ny.470_ | Stacks onto | _dci.ny.438_ |
| _dci.ny.395_ | Stacks onto | _dci.ny.269_ |

Configuration Compatibility Report
Report Generated: Apr 21, 2007 11:47:10 AM

Summary

| | |
|---|---|
| Source | dci_unix_7309 |
| Target | dci_unix_11591 |
| Score | 63 |
| Category | Configuration |
| Ruleset Name | Unix OS Stacking |
| Version | 04202007 |
| Remediation Cost | $ 0.00 |

Summary of Differences

| Description | Penalty Weight | Counts | Remediation Cost |
|---|---|---|---|
| /dev/tcp settings differ | 3% | 1 | $ 0.00 |
| /dev/udp settings differ | 0% | 1 | $ 0.00 |
| Kernel file group differ | 1% | 1 | $ 0.00 |
| Kernel file permissions differ | 1% | 1 | $ 0.00 |
| Target has different InetD services | 2% | 1 | $ 0.00 |
| Target has different InetD services settings | 2% | 1 | $ 0.00 |
| Target running newer version of OS | 30% | 1 | $ 0.00 |
| udp_max_buf settings are different | 1% | 1 | $ 0.00 |
| Total | | 8 | $ 0.00 |

Difference Details

| Source System | Target System | Description | Module | Object | Property | Instance | Source | Target | Penalty Weight | Remediation Cost |
|---|---|---|---|---|---|---|---|---|---|---|
| dci_unix_7309 | dci_unix_11591 | /dev/tcp settings differ | CiRBA Solaris Details | CiRBA Solaris NDD Table (/dev/tcp) | Device Value | tcp_time_wait_interval | 240000 | 60000 | 3% | $ 0.00 |
| dci_unix_7309 | dci_unix_11591 | /dev/tcp settings differ | CiRBA Solaris Details | CiRBA Solaris NDD Table (/dev/tcp) | Device Value | tcp_maxpsz_multiplier | 2 | 10 | | $ 0.00 |
| dci_unix_7309 | dci_unix_11591 | /dev/tcp settings differ | CiRBA Solaris Details | CiRBA Solaris NDD Table (/dev/tcp) | Device Value | tcp_xmit_hiwat | 16384 | 49152 | | $ 0.00 |
| dci_unix_7309 | dci_unix_11591 | /dev/tcp settings differ | CiRBA Solaris Details | CiRBA Solaris NDD Table (/dev/tcp) | Device Value | tcp_recv_hiwat | 24576 | 49152 | | $ 0.00 |
| dci_unix_7309 | dci_unix_11591 | /dev/tcp settings differ | CiRBA Solaris Details | CiRBA Solaris NDD Table (/dev/tcp) | Device Value | tcp_strong_iss | 2 | 1 | | $ 0.00 |
| dci_unix_7309 | dci_unix_11591 | /dev/tcp settings differ | CiRBA Solaris Details | CiRBA Solaris NDD Table (/dev/tcp) | Device Value | tcp_wscale_always | 0 | 1 | | $ 0.00 |

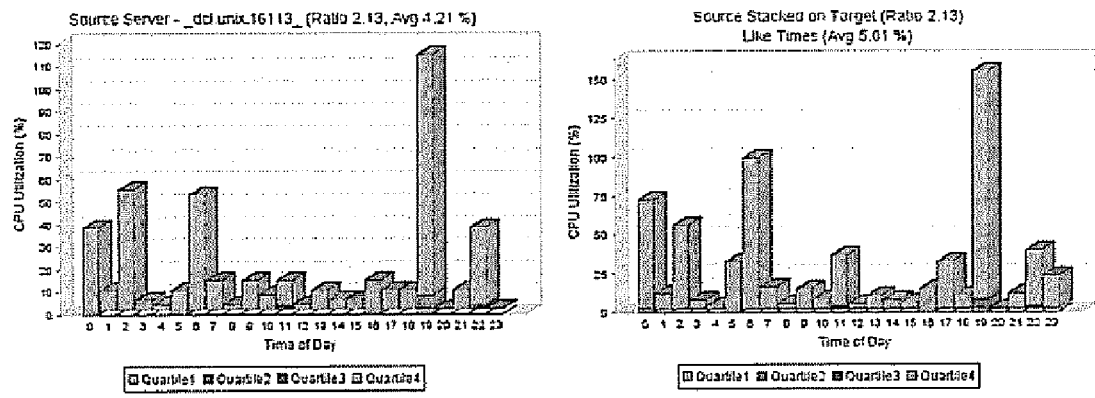
CPU Utilization peaks at 161 % between the hours of 6 AM and 7 AM when the worst times are stacked together.
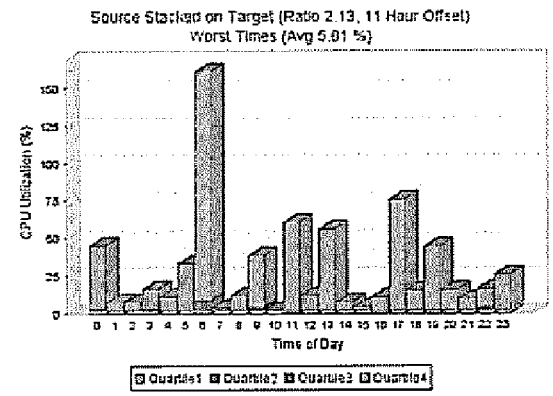
Audit Information
Figure 42

Overall Compatibility Report

*Report Generated: Apr 21, 2007 11:48:34 AM*

Summary

| | |
|---|---|
| Source | dci_unix_8453 |
| Target | dci_unix_9462 |
| Overall Score | 61 |

| Category | Name | Importance | Score | Remediation Cost |
|---|---|---|---|---|
| Business Constraints | Combined Business Constraints | 5 | 100 | $ 0.00 |
| Configuration | Unix OS Stacking | 5 | 88 | $ 0.00 |
| Workload | CPU_Utilization | 5 | 70 | |
| Total | | | | $ 0.00 |

System Configuration Compatibility

Combined Business Constraints Ruleset Summary *
*Overall Score: 100*

| Description | Penalty Weight | Count | Remediation Cost |
|---|---|---|---|
| Total | 100 | 0 | $ 0.00 |

Unix OS Stacking Ruleset Summary *
*Overall Score: 88*

| Description | Penalty Weight | Count | Remediation Cost |
|---|---|---|---|
| Different software versions | 2% | 1 | $ 0.00 |
| Kernel configuration file does not exist on target | 2% | 1 | $ 0.00 |
| Kernel file group differ | 1% | 1 | $ 0.00 |
| Patch differences between systems | 2% | 1 | $ 0.00 |
| Target Has Less Memory | 2% | 1 | $ 0.00 |
| Target does not have software package installed | 2% | 1 | $ 0.00 |
| Target has different InetD services | 2% | 1 | $ 0.00 |
| Target has less allowable processes | 0% | 1 | $ 0.00 |
| Total | 88 | 8 | $ 0.00 |

Figure 44

Overall Compatibility Report

Report Generated: Apr 21, 2007 11:54:26 AM

Summary

| | |
|---|---|
| Transfer Source | _dcj.unix.9462_ |
| Transfer Source | _dcj.unix.6001_ |
| Target | _dcj.unix.8453_ |
| Overall Score | 91 |

| Category | Name | Importance | Score | Remediation Cost |
|---|---|---|---|---|
| Business Constraints | Combined Business Constraints | 5 | 100 | $ 0.00 |
| Configuration | Unix OS Stacking | 5 | 89 | $ 0.00 |
| Workload | CPU_Utilization | 5 | 95 | |
| Total | | | | $ 0.00 |

System Configuration Compatibility

Combined Business Constraints Ruleset Summary *

Overall Score: 100

| Description | Penalty Weight | Count | Remediation Cost |
|---|---|---|---|
| Total | 100 | 0 | $ 0.00 |

Unix OS Stacking Ruleset Summary *

Overall Score: 89

| Description | Penalty Weight | Count | Remediation Cost |
|---|---|---|---|
| Different software versions | 2% | 1 | $ 0.00 |
| Kernel file group differ | 1% | 1 | $ 0.00 |
| Patch differences between systems | 2% | 1 | $ 0.00 |
| Target Has Less Memory | 2% | 1 | $ 0.00 |
| Target does not have software package installed | 2% | 1 | $ 0.00 |
| Target has different InetD services | 2% | 1 | $ 0.00 |
| Total | 89 | 6 | $ 0.00 |

Figure 48

Analysis Summary

| Analysis | Demo Stacking |
|---|---|
| Description | |
| Folder Structure | Analysis Folders -> Consolidation Analysis -> OS Stacking |
| Systems Analyzed | 28 |
| Status of Audit | 2007-04-21 11:19:30.267 |
| Created By | admin |

Consolidation Summary

| | Initial State | After Transfers |
|---|---|---|
| Total Systems | 28 | 17 |
| Consolidation % | - | 39.29% reduction |
| Consolidation % (Net of Targets) | - | 39.29% reduction |
| Consolidated Systems | - | 5 |
| Transferred Systems | - | 11 |
| Sources Only | 0 | 0 |
| Targets Only | 0 | 0 |
| Sources And Targets | 28 | 17 |

Rulesets

| Name | Category | Version | Importance |
|---|---|---|---|
| Unix OS Stacking | Configuration | 04202007 | 5 |
| Combined Business Constraints | Business Constraints | 03302007 | 5 |

Workload Types

| Name | Limits | Importance |
|---|---|---|
| CPU Utilization | 90 % | 5 |

Workload Settings

| Audit Date Range | All available workload data |
|---|---|
| Workload Days Included | Monday, Tuesday, Wednesday, Thursday, Friday, Saturday, Sunday |

Figure 51

| Transfers | | |
|---|---|---|
| Source | Transfer | Target |
| _dci.unix.9898_ | Stacks onto | _dci.unix.7309_ |
| _dci.unix.8453_ | Stacks onto | _dci.unix.7309_ |
| _dci.unix.9462_ | Stacks onto | _dci.unix.7309_ |
| _dci.unix.8001_ | Stacks onto | _dci.unix.7309_ |
| _dci.unix.16113_ | Stacks onto | _dci.unix.16394_ |
| _dci.unix.16098_ | Stacks onto | _dci.unix.16394_ |
| _dci.unix.16380_ | Stacks onto | _dci.unix.16394_ |
| _dci.unix.16078_ | Stacks onto | _dci.unix.16394_ |
| _dci.unix.4657_ | Stacks onto | _dci.unix.4925_ |
| _dci.unix.16891_ | Stacks onto | _dci.unix.16830_ |
| _dci.unix.11691_ | Stacks onto | _dci.unix.12971_ |

Figure 52

METHOD AND SYSTEM FOR DETERMINING COMPATIBILITY OF COMPUTER SYSTEMS

CROSS-REFERENCE TO RELATED APPLICATIONS

This application is a continuation of U.S. patent application Ser. No. 11/738,936 filed on Apr. 23, 2007, which is a continuation-in-part of U.S. patent application Ser. Nos. 11/535,355 and 11/535,308 filed on Sep. 26, 2006, both of which claim priority from U.S. Provisional Patent Application No. 60/745,322 filed Apr. 21, 2006, all incorporated herein by reference.

TECHNICAL FIELD

The present invention relates to information technology infrastructures and has particular utility in determining compatibility of computer systems in such infrastructures.

BACKGROUND

As organizations have become more reliant on computers for performing day to day activities, so to has the reliance on networks and information technology (IT) infrastructures increased. It is well known that large organizations having offices and other facilities in different geographical locations utilize centralized computing systems connected locally over local area networks (LAN) and across the geographical areas through wide-area networks (WAN).

As these organizations grow, the amount of data to be processed and handled by the centralized computing centers also grows. As a result, the IT infrastructures used by many organizations have moved away from reliance on centralized computing power and towards more robust and efficient distributed systems. Distributed systems are decentralized computing systems that use more than one computer operating in parallel to handle large amounts of data. Concepts surrounding distributed systems are well known in the art and a complete discussion can be found in, e.g., "Distributed Systems: Principles and Paradigms"; Tanenbaum Andrew S.; Prentice Hall; Amsterdam, Netherlands; 2002.

While the benefits of a distributed approach are numerous and well understood, there has arisen significant practical challenges in managing such systems for optimizing efficiency and to avoid redundancies and/or under-utilized hardware. In particular, one challenge occurs due to the sprawl that can occur over time as applications and servers proliferate. Decentralized control and decision making around capacity, the provisioning of new applications and hardware, and the perception that the cost of adding server hardware is generally inexpensive, have created environments with far more processing capacity than is required by the organization.

When cost is considered on a server-by-server basis, the additional cost of having underutilized servers is often not deemed to be troubling. However, when multiple servers in a large computing environment are underutilized, having too many servers can become a burden. Moreover, the additional hardware requires separate maintenance considerations; separate upgrades and requires the incidental attention that should instead be optimized to be more cost effective for the organization. Heat production and power consumption can also be a concern. Even considering only the cost of having redundant licenses, removing even a modest number of servers from a large computing environment can save a significant amount of cost on a yearly basis.

As a result, organizations have become increasingly concerned with such redundancies and how they can best achieve consolidation of capacity to reduce operating costs. The cost-savings objective can be evaluated on the basis of consolidation strategies such as, but not limited to: virtualization strategies, operating system (OS) level stacking strategies, database consolidation strategies, application stacking strategies, physical consolidation strategies, and storage consolidation strategies.

Virtualization involves virtualizing a physical system as a separate guest OS instance on a host machine. This enables multiple virtualized systems to run on a single physical machine, e.g. a server. Examples of virtualization technologies include VMware™, Microsoft Virtual Server™, IBM LPAR™, Solaris Containers™, Zones™, etc.

OS-Level application stacking involves moving the applications and data from one or more systems to the consolidated system. This can effectively replace multiple operating system instances with a single OS instance, e.g. system A running application X and system B running application Y are moved onto system C running application Z such that system C runs applications X, Y and Z, and system A and B are no longer required. This strategy is applicable to all operation system types, e.g. Windows™, Linux™, Solaris™, AIX™, HP-UX™, etc.

Database stacking combines one or more database instances at the database server level, e.g. Oracle™, Microsoft SQL Server™, etc. Database stacking combines data within a database instance, namely at the table level. Application stacking combines one or more database instances at the application server level, e.g. J2EE™ application servers, Weblogic™, WebSphere™, JBoss™, etc.

Physical consolidation moves physical systems at the OS level to multi-system hardware platforms such as Blade Servers™, Dynamic System Domains™, etc. Storage consolidation centralizes system storage through storage technologies such as Storage Area Networks (SAN), Network Attached Storage (NAS), etc.

The consolidation strategies to employ and the systems and applications to be consolidated are to be considered taking into account the specific environment. Consolidation strategies should be chosen carefully to achieve the desired cost savings while maintaining or enhancing the functionality and reliability of the consolidated systems. Moreover, multiple strategies may often be required to achieve the full benefits of a consolidation initiative.

Complex systems configurations, diverse business requirements, dynamic workloads and the heterogeneous nature of distributed systems can cause incompatibilities between systems. These incompatibilities limit the combinations of systems that can be consolidated successfully. In enterprise computing environments, the virtually infinite number of possible consolidation permutations which include suboptimal and incompatibility system combinations make choosing appropriate consolidation solutions difficult, error-prone and time consuming.

It is therefore an object of the following to obviate or mitigate the above-described disadvantages.

SUMMARY

In one aspect, a method for determining a consolidation solution for a plurality of computer systems is provided comprising obtaining a data set comprising a compatibility score for each pair of the plurality of computer systems, each the compatibility score being indicative of the compatibility of one of the plurality of computer systems with respect to another of the plurality of computer systems; determining one or more candidate transfer sets each indicating one or more of the computer systems capable of being transferred to a target computer system; selecting a desired one of the one or more candidate transfer sets; and providing the desired one as a consolidation solution.

In another aspect, there is provided method for determining compatibilities for a plurality of computer systems comprising: obtaining at least one transfer set indicating one or more of the computer systems capable of being transferred to a target computer system; evaluating compatibilities of the one or more computer systems against the target computer system to obtain a first compatibility score; evaluating compatibilities of each the one or more of the computer systems against each other to obtain a second compatibility score; and computing an overall compatibility score for the transfer set using the first and second compatibility scores.

In yet another aspect, there is provided a computer program for determining compatibilities for a plurality of computer systems comprising an audit engine for obtaining information pertaining to the compatibility of the plurality of computer systems; an analysis engine for generating a compatibility score for each pair of the plurality of systems based on the information that is specific to respective pairs; and a client for displaying the compatibility score on an interface, the interface being configured to enable a user to specify parameters associated with a map summarizing the compatibility scores and to define and initiate a transfer of one or more of the computer systems to a target computer system.

BRIEF DESCRIPTION OF THE DRAWINGS

An embodiment of the invention will now be described by way of example only with reference to the appended drawings wherein:

FIG. 4 is an example of a rule-based compatibility analysis map.

FIG. 5 is an example of a workload compatibility analysis map.

FIG. 6 is an example of an overall compatibility analysis map.

FIG. 8 is a table mapping audit data sources with consolidation strategies.

FIG. 12 is a table showing example rule sets.

FIG. 13 is a table showing example workload types.

FIG. 16 shows an example rule set.

FIG. 19 is an example of the rule-based compatibility analysis result details.

FIG. 27 is an example of the multi-dimensional compatibility analysis result details for a rule set.

FIG. 31 is an example of a consolidation solution produced by the consolidation analysis.

Figures 34, 35:
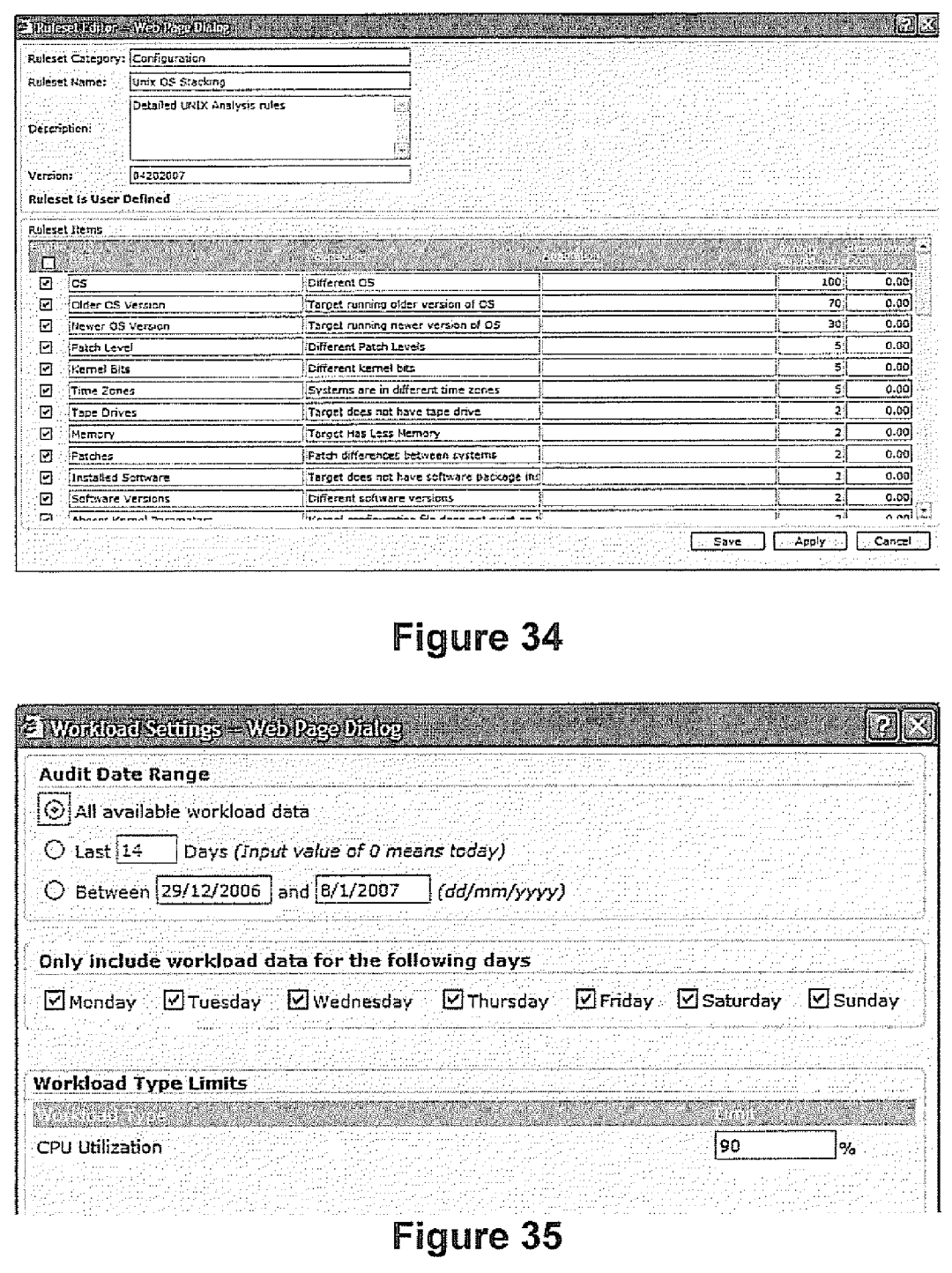

FIG. 34 shows an example of the rule set editor screen.

FIG. 35 shows an example of the screen for editing workload settings.

FIG. 38 is example configuration compatibility analysis details.

Figure 40:
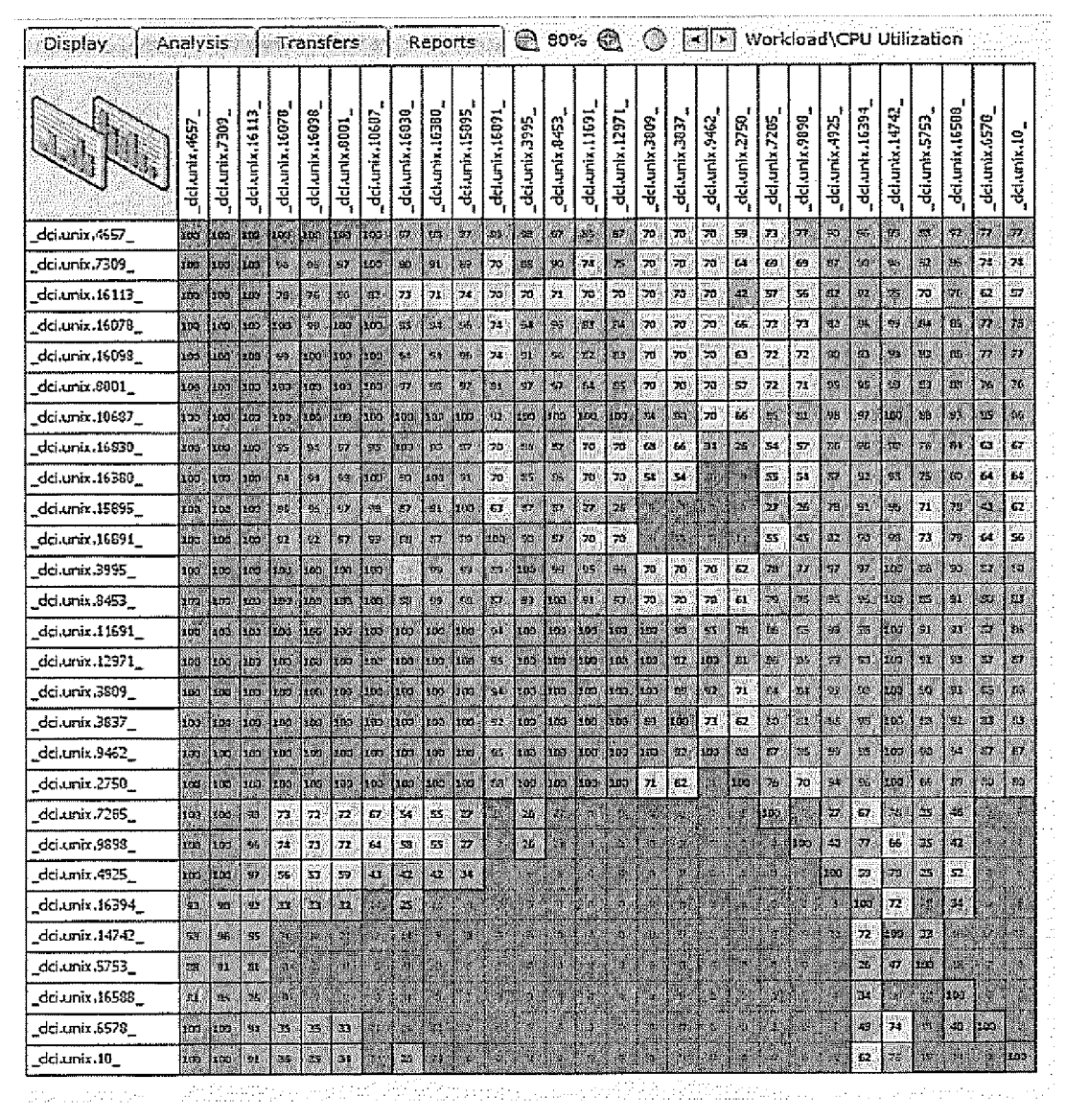

FIG. 40 is an example 1-to-1 workload compatibility map.

FIG. 42 is an example workload details report with stacked workloads.

FIG. 44 is an example of the 1-to-1 overall compatibility details report.

FIG. 47 shows example transfers on a compatibility map with net effect on.

FIG. 48 is an example multi-dimensional compatibility details report.

FIG. 51 is an example consolidation summary report.

FIG. 52 shows the example transfers that comprise the consolidation solution.

DETAILED DESCRIPTION OF THE DRAWINGS

Analysis Program Overview

Figure 1:
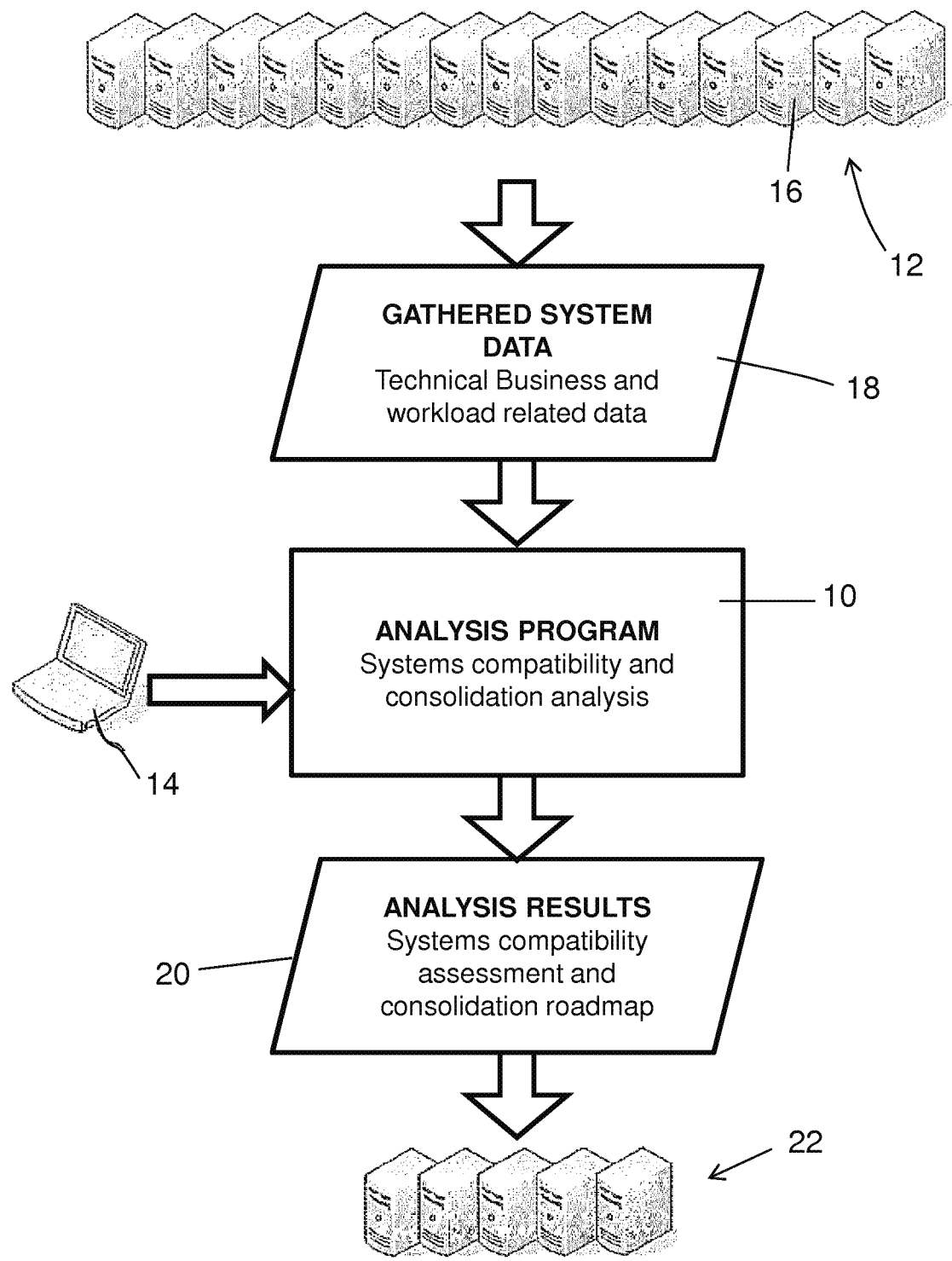
FIG. 1 is a block diagram of an analysis program for evaluating the compatibility of computer systems to identify consolidation solutions.

A block diagram of an analysis program 10 for determining compatibilities in computing environment 12 is provided in FIG. 1. The analysis program 10, accessed through a computer station 14, gathers data 18 pertaining to a collection of systems to be consolidated 16. The analysis program 10 uses the gathered data 18 to evaluate the compatibility of the computer systems 28 and provide a roadmap 20 specifying how the original set of systems can be consolidated to a smaller number of systems 22.

Figure 2:
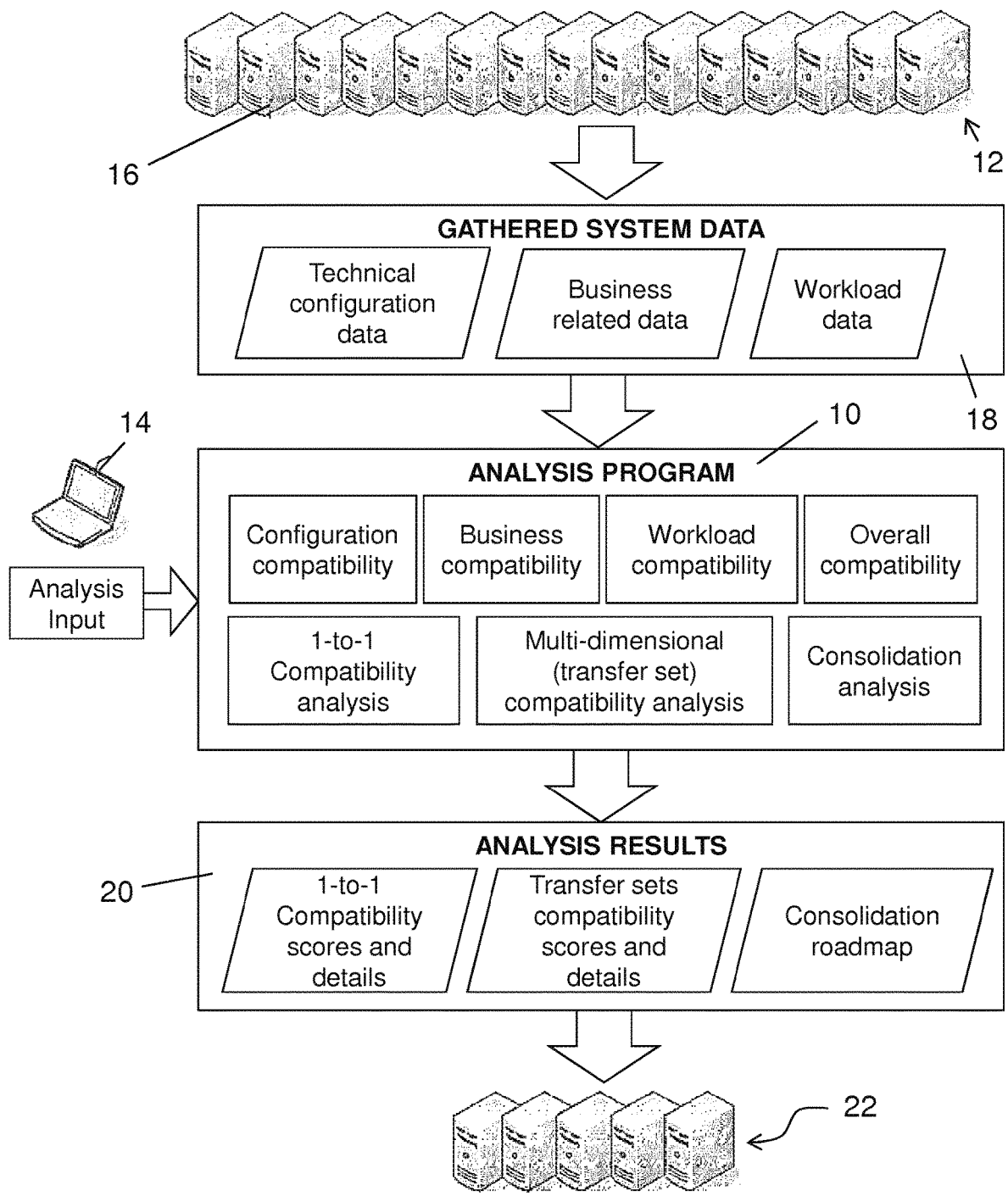
FIG. 2 is a more detailed diagram of the analysis program depicted in FIG. 1.

The following provides an overview of the principles and functionality related to the analysis program 10 and its environment depicted in FIG. 2.

System Data Parameters

A distinct data set is obtained for each system 16 to contribute to the combined system data 18 shown in FIG. 2. Each data set comprises one or more parameters that relate preferably to technical 24, business 26 and workload 28 characteristics or features of the respective system 16. The parameters can be evaluated by scrutinizing program definitions, properties, objects, instances and any other representation or manifestation of a component, feature or characteristic of the system 16. In general, a parameter is anything related to the system 16 that can be evaluated, quantified, measured, compared etc.

Examples of technical parameters relevant of the consolidation analysis include the operating system, OS version, patches, application settings, hardware devices, etc.

Examples of business parameters of systems relevant to the consolidation analysis include the physical location, organization department, data segregation requirements, owner, service level agreements, maintenance windows, hardware lease agreements, software licensing agreements, etc.

Examples of workload parameters relevant to consolidation analysis include various resource utilization and capacity metrics related to the system processor, memory, disk storage, disk I/O throughput and network bandwidth utilization.

System and Entity Models

The system data parameters associated with a system 16 comprise the system model used in the analyses.

In the following examples, a source system refers to a system from which applications and/or data are to be moved, and a target server or system is a system to which such applications and/or data are to be moved. For example, an underutilized environment having two systems 16 can be consolidated to a target system (one of the systems) by moving applications and/or data from the source system (the other of the systems) to the target system.

The computer systems 16 may be physical systems, virtual systems or hypothetical models. In contrast to actual physical systems, hypothetical systems do not currently exist in the computing environment 12. Hypothetical systems can be defined and included in the analysis to evaluate various types of "what if" consolidation scenarios. Hypothetical targets can be used to simulate a case where the proposed consolidation target systems do not exist in the environment 12, e.g. for adding a system 16. Similarly, hypothetical source systems can be used to simulate the case where a new application is to be introduced into the environment 12 and "forward consolidated" onto existing target systems 16.

Hypothetical systems can be created through data imports, cloning from actual systems models, and manual specification by users, etc. The system model can be minimal (sparse) or include as much data as an actual system model. These system models may also be further modified to address the analysis requirements.

The compatibility analysis can also be generalized to evaluate entities beyond physical, virtual or hypothetical systems. For example, entities can be components that comprise systems such as applications and database instances. By analysing the compatibility of database instances and database servers with database stacking rule sets, database consolidation can also be assessed. Similarly, application consolidation can be evaluated by analyzing application servers and instances with application stacking rules. The entity could also be a logical application system and technical data can pertain to functional aspects and specifications of the entity.

It will therefore be appreciated that a "system" or "computer system" hereinafter referred, can encompass any entity which is capable of being analysed for any type of compatibility and should not be considered limited to existing or hypothetical physical or virtual systems etc.

Consolidation and Transfers

Consolidation as described above can be considered to include one or more "transfers". The actual transfer describes the movement of a single source entity onto a target, wherein the specification identifies the source, target and transfer type. The transfer type (or consolidation strategy) describes how a source entity is transferred onto a target, e.g. virtualization, OS stacking etc.

A transfer set 23 (see FIG. 3) can be considered one or more transfers that involve a common target, wherein the set specifies one or more source entities, the target and a transfer type.

A consolidation solution (or roadmap) is one or more transfer sets 23 based on a common pool of source and target entities. As can be seen in FIG. 2, the consolidation roadmap can be included in the analysis results 20. Each source or target entity is referenced at most one time by the transfer sets that comprise the solution.

Figure 3:
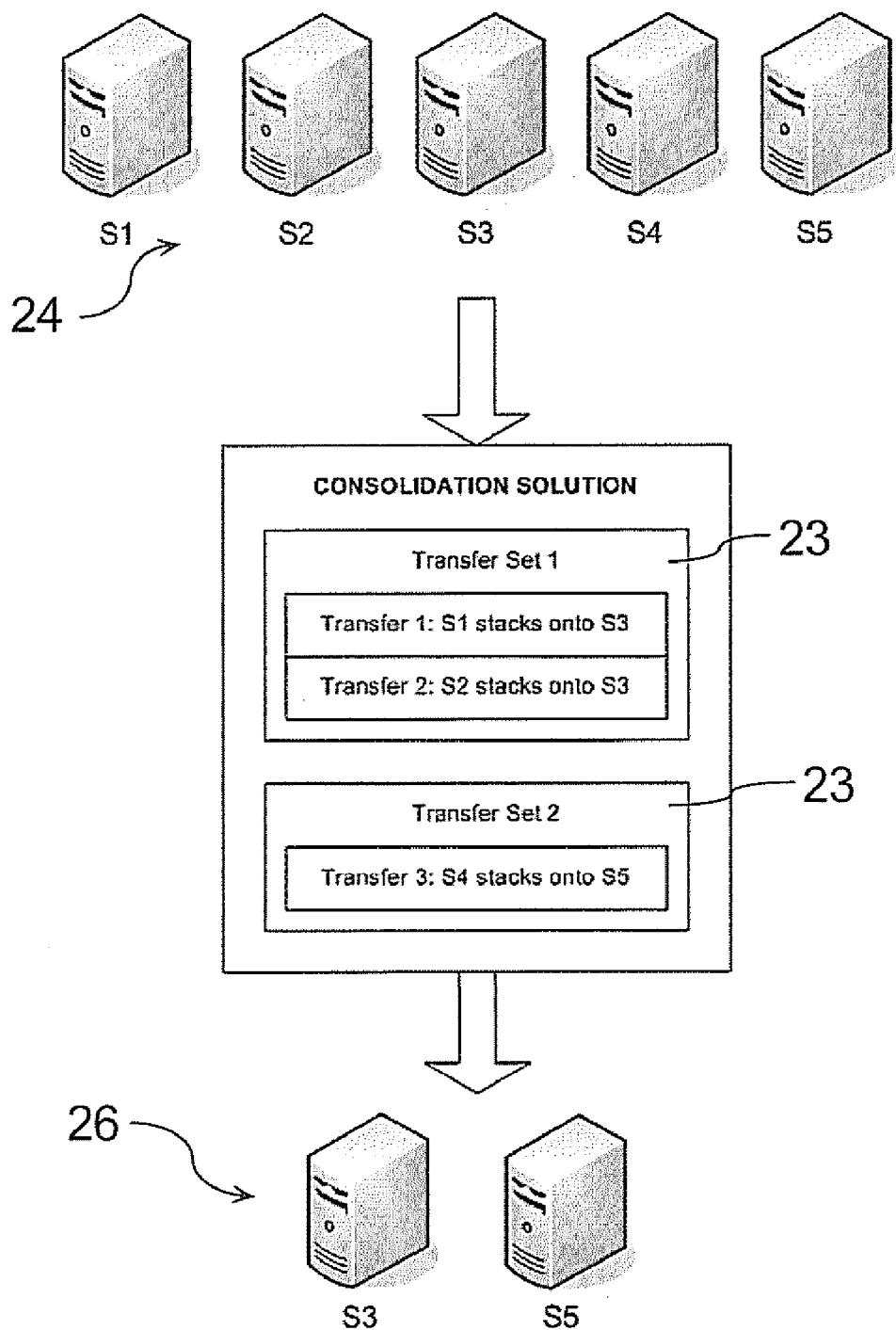
FIG. 3 is a block diagram illustrating a sample consolidation solution comprised of multiple transfers.

FIG. 3 shows how an example pool 24 of 5 systems (S1, S2, S3, S4 and S5) can be consolidated through 2 transfer sets 23: stack S1 and S2 onto S3, and stack S4 onto S5. The transfer sets 23 include 3 transfers, and each system 16 is referenced by the transfer sets 23 only once. In the result, a consolidated pool 26 of 2 systems is achieved.

It will be appreciated that the principles described herein support many transformation strategies and consolidation is only one example.

Compatibility Analyses

The following discusses compatibilities between systems 16 based on the parameters to determine if efficiencies can be realized by consolidating either entire systems 16 or aspects or components thereof.

The analyses employ differential rule sets 28 to evaluate and quantify the compatibility of systems 16 with respect to technical configuration and business related factors comprised in the gathered system data 18. Similarly, workload compatibility of a set of systems 16 is assessed using workload stacking and scoring algorithms 30. The results of configuration, business and workload compatibility analyses are combined to produce an overall compatibility score for a set of systems 16.

Figure 4:
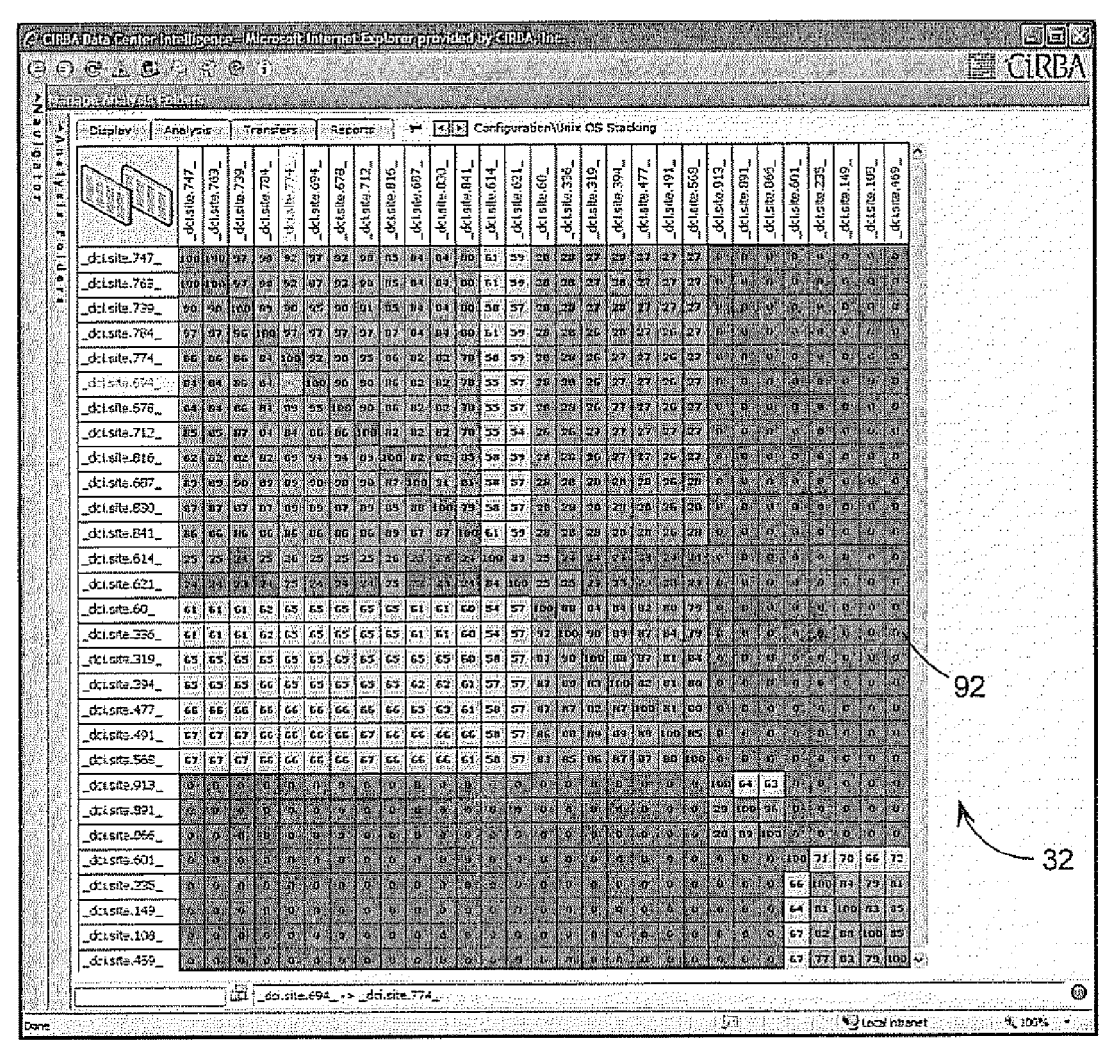
Figure 5:
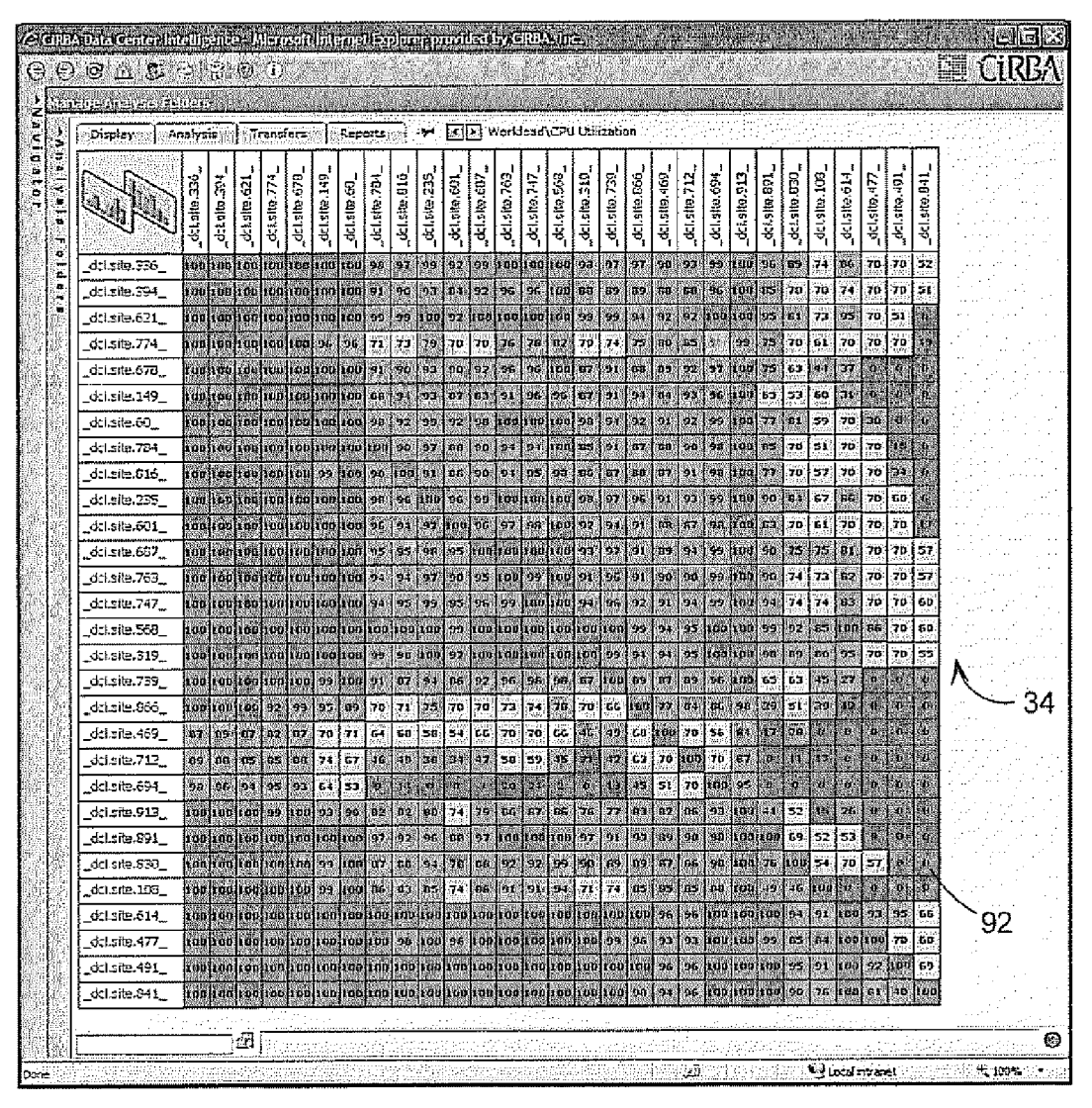
Figure 6:
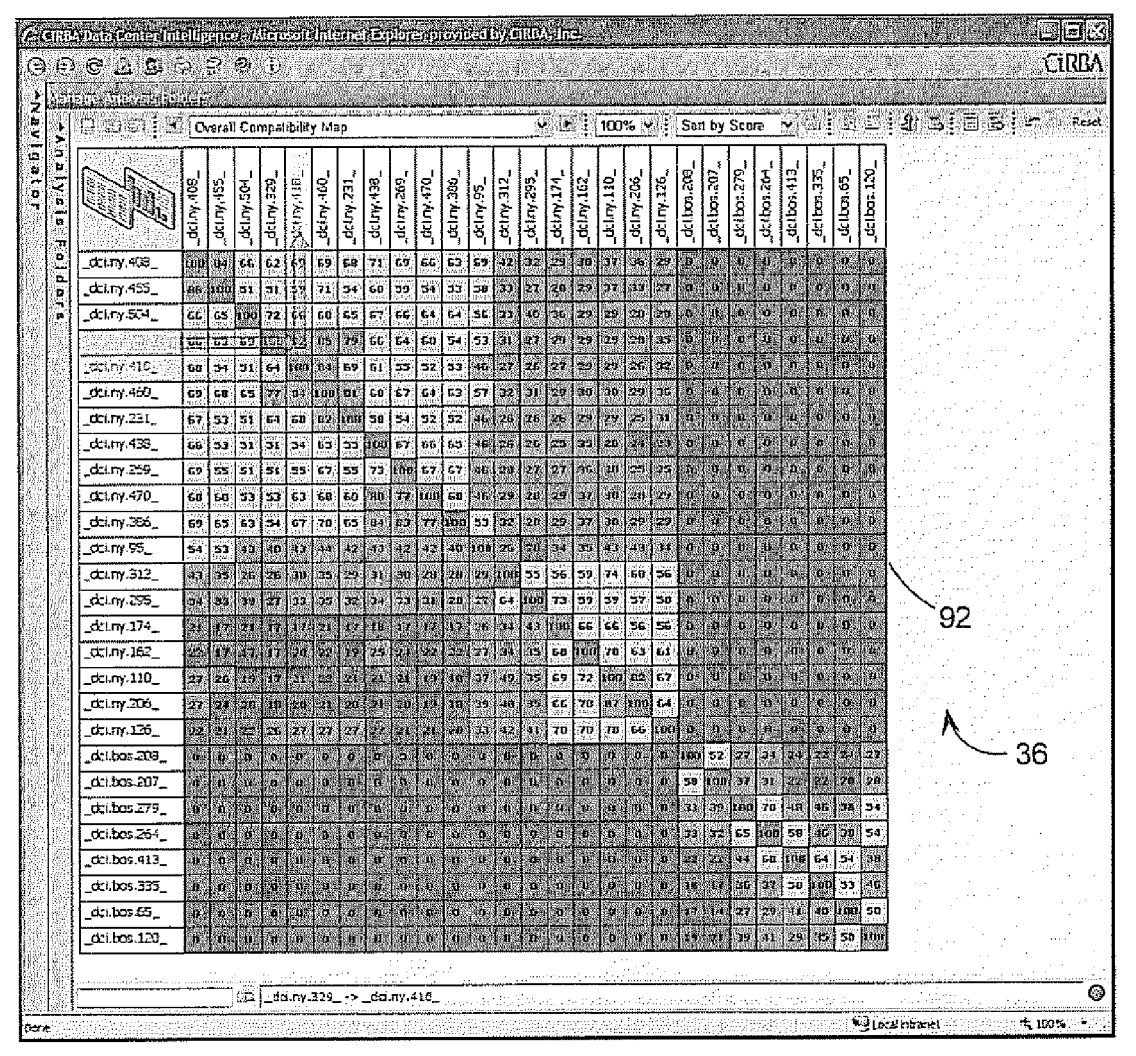

In addition to compatibility scores, the analysis provides details that account for the actual scores. The scores can be presented in color coded maps 32, 34 and 36 that illustrate patterns of the compatibility amongst the analyzed systems as shown in FIGS. 4, 5 and 6 respectively.

Analysis Modes

A collection of systems 16 to be consolidated can be analyzed in one of three modes: 1-to-1 compatibility, multi-dimensional compatibility and consolidation analyses. These analyses share many common aspects but can be performed independently.

The 1-to-1 compatibility analysis evaluates the compatibility of every possible source-target pair combination in the collection of systems 16 on a 1-to-1 basis. This analysis is useful in assessing single transfer consolidation candidates. In practice, it may be prudent to consolidate systems 16 incrementally and assess the impact of each transfer before proceeding with additional transfers.

The multi-dimensional compatibility analysis evaluates the compatibility of transfer sets that can involve multiple sources being transferred to a common target. The analysis produces a compatibility score for each specified transfer set 23 by evaluating the compatibility of the systems 16 that comprise the transfer set 23.

The consolidation analysis searches for a consolidation solution that minimizes the number of remaining source and target entities after the proposed transfers are applied, while meeting requisite compatibility constraints. This analysis employs the multi-dimensional compatibility analysis described above to evaluate the compatibility of postulated transfer sets.

The analysis program 10 performs consolidation analyses for virtualization and stacking strategies as will be explained in greater detail below, however, it will be appreciated that other consolidation strategies may be performed according to similar principles.

Analysis Program Architecture

Figure 7:
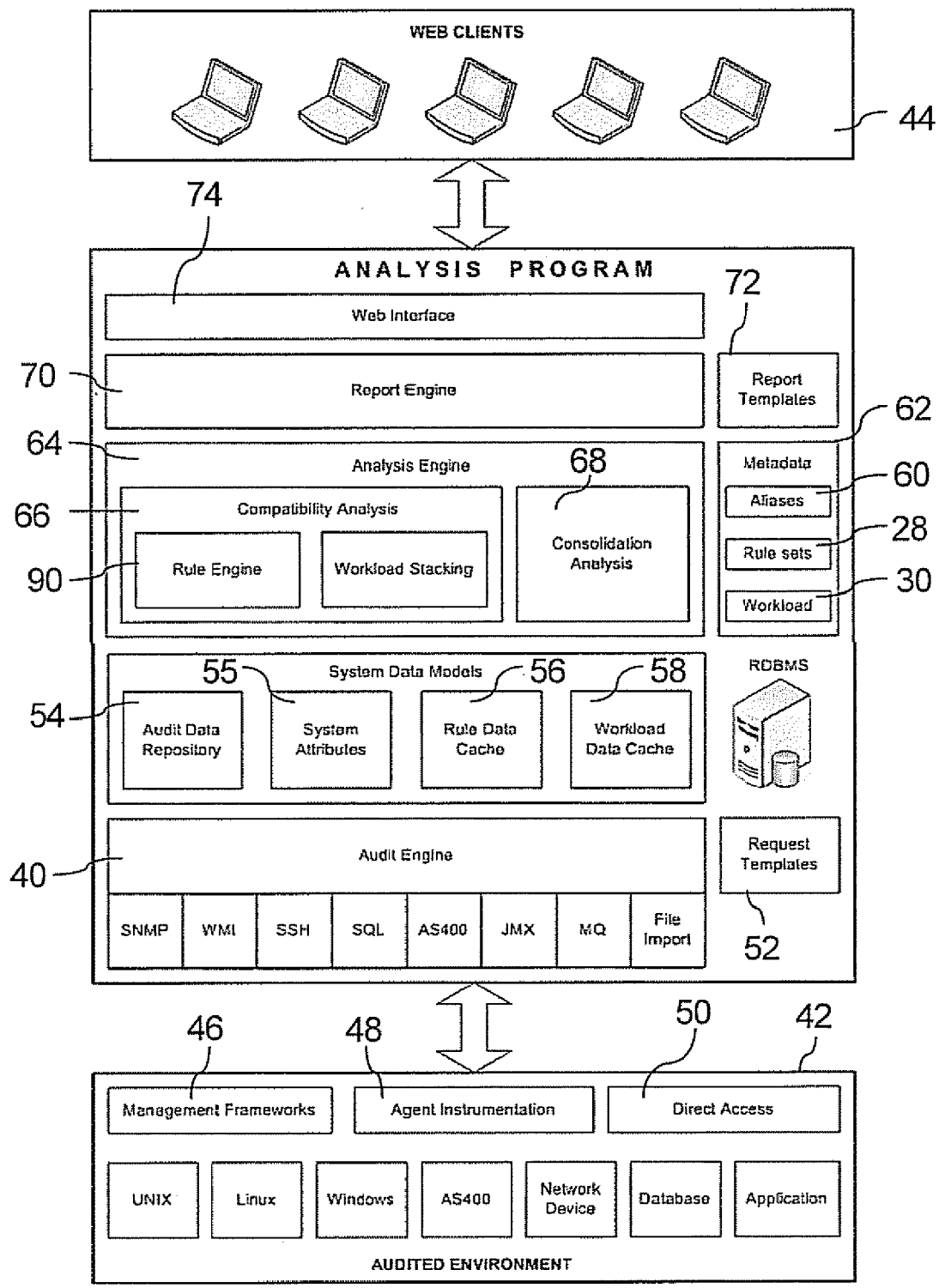
FIG. 7 is a schematic block diagram of an underlying architecture for implementing the analysis program of FIG. 1.

A block diagram of the analysis program 10 is shown in FIG. 7. The flow of data 18 through the program 10 begins as an audit engine 40 pulls audit data 18 from audited environments 42. The data works its way up to the web client 44 which displays an output on a user interface, e.g. on computer 14. The program 10 is preferably a client-server application that is accessed via the web client 44.

An audit engine 40 communicates over one or more communication protocols with audited environments 42 comprised of the actual systems 16 being analysed. The audit engine 40 typically uses data acquisition adapters to communicate directly with the end points (e.g. servers) or through software systems that manage the end points (e.g. management frameworks 46 and/or agent instrumentation 48 and/or direct access 50).

Alternatively, system data 18 can be imported from third party tools, e.g. inventory applications, performance monitoring tools etc., or can be obtained through user data entry. Examples of such third-party data having file formats that can be imported include comma separated values (CSV), extensible markup language (XML) and well formatted text files such as those generated by the UNIX™ system activity reporter (SAR).

The audit engine 40, uses a set of audit request templates 52 that define the data 18 to acquire from the systems 16. Once collected, the data 18 is stored in an audit data repository 54. Data 18 referenced by the analysis rule sets 28 and required by the workload analysis 30 are extracted and stored in separate data caches 56 and 58 respectively.

Aliases 60, differential rule sets 28, workload data types 30 and benchmark specifications comprise some of the analysis-related metadata 62 definitions used by the program 10. Aliases 60 extract and normalize system data 18 from a variety of data sources to a common model for analysis. Rule sets 28 examine system compatibility with respect to technical configuration and business-related factors. The workload definitions 30 specify the system resource parameters and benchmarks for analyzing workload compatibility.

An analysis engine 64 is also provided, which comprises compatibility and consolidation analysis engines 66 and 68 respectively. The compatibility analysis evaluates the compatibility of systems 16 through rule sets 28 and workload stacking algorithms 30. The consolidation analysis engine 68 leverages the compatibility analysis and employs constraint-based optimization algorithms to find consolidation solutions that allows the environment 12 to operate with fewer systems 16.

The program 10 has a report engine 70 that utilizes report templates 72 for generating reports that convey the analysis results. Typically, the program 10 includes a web interface layer 74 that allows web client 44 users to enter settings, initiate an audit or analysis, view reports etc.

Analysis Data Sources

Figure 8:
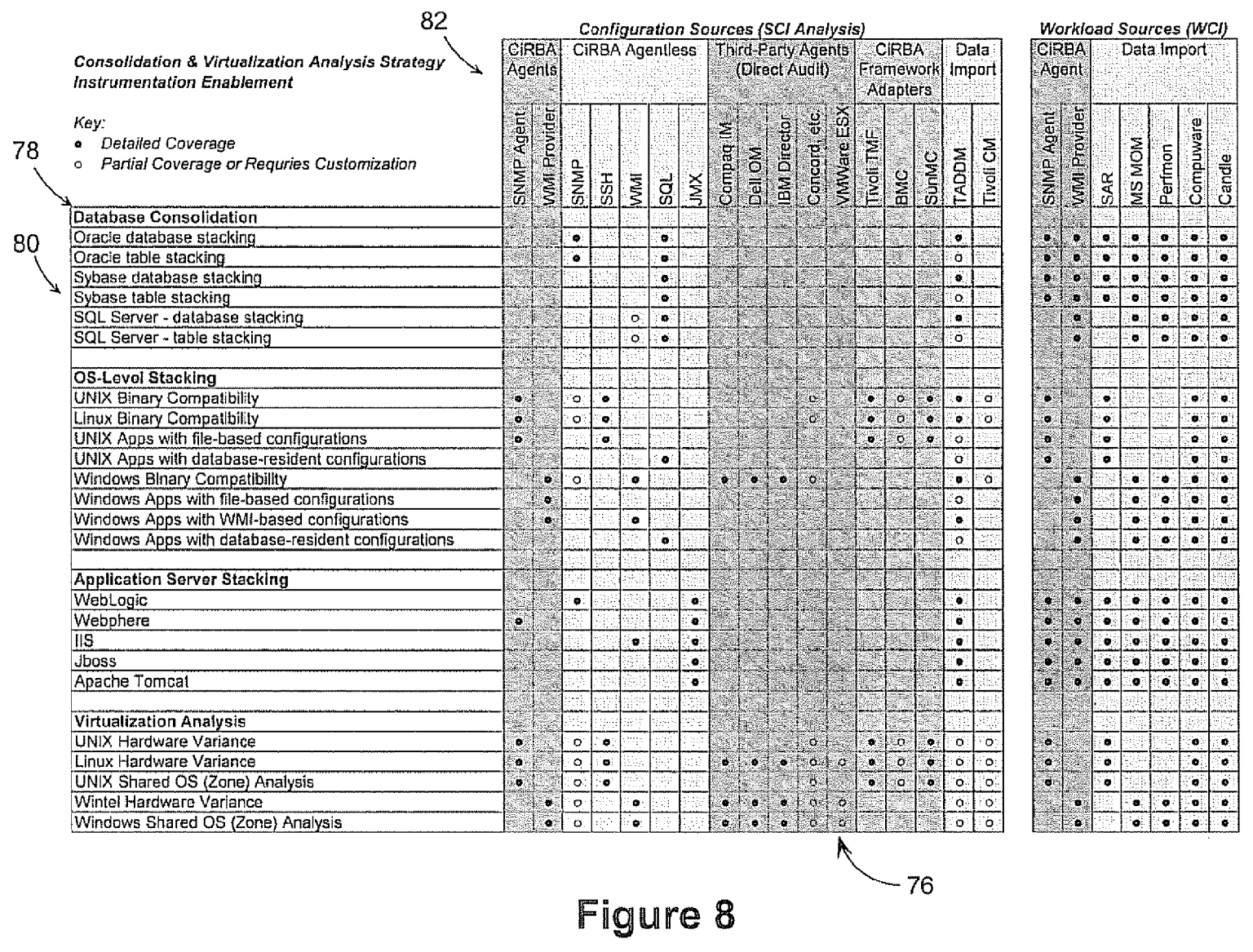

The audit data 18 can be acquired using tools such as the table 76 shown in FIG. 8 that illustrate the various types of configuration settings that are of interest and from which sources they can be obtained. FIG. 8 also provides a mapping to where the sample workload data can be obtained. In FIG. 8, a number of strategies 78 and sub-strategies 80 map to various configuration and workload sources, collectively referred to by numeral 82. As discussed making reference to FIG. 8, the strategies 78 may relate to database consolidation, OS-level stacking, application server stacking, virtualization, and many others. Each strategy 78 includes a set of sub-strategies 80, which in turn map to specific rule sets 28. The rule sets 28, which will be explained in greater detail below, determine whether or not a particular setting or system criterion/criteria have been met and thus how different one system 16 is to the next. The rule sets 28 can also indicate the cost of remediating such differences.

The table 76 lists the supported consolidation strategies and the relevant data sources that should be audited to perform the corresponding consolidation analysis. In general, collecting more basis data 18 improves the analysis results. The table 76 enables the analysis program 10 to locate the settings and information of interest based on the strategy 78 or sub-strategy 80 (and in turn the rule set 28) that is to be used to evaluate the systems 16 in the environment 12. The results can be used to determine source/target candidates for analysing the environment for the purpose of, e.g. consolidation, compliance measures etc.

Analysis Process Overview

Figure 9:
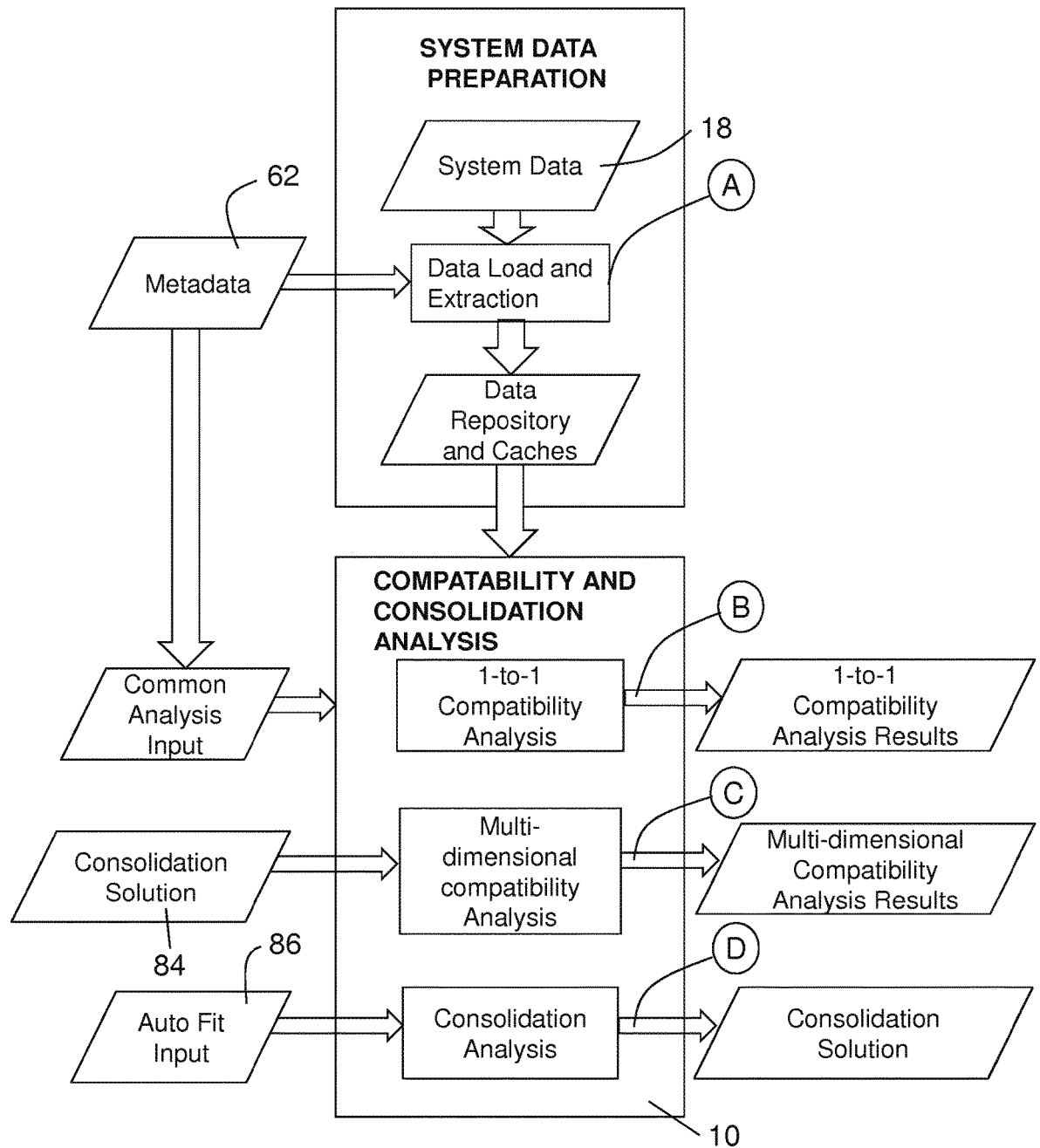
FIG. 9 is a process flow diagram of the compatibility and consolidation analyses.

Referring now to FIG. 9, a process flow diagram illustrates the data flow for performing the compatibility and consolidation analyses discussed above. The flow diagram outlines four processes: a data load and extraction process (A), a 1-to-1 compatibility analysis process (B), a multi-dimensional compatibility analysis process (C), and a consolidation analysis process (D).

In process A, the system data 18 collected via audits or imports as discussed above is prepared for use by the analyses. The compatibility and consolidation analyses processes B, C and D can be performed independently. The analyses share a common analysis input specification and get system data 18 from the data repository 54 and caches 56 and 58. The multi-dimensional compatibility and consolidation analyses take additional inputs in the form of a consolidation solution and auto fit input parameters 84 and 86 respectively.

The 1-to-1 compatibility analysis process B evaluates the compatibility of each system pair on a 1-to-1 basis. In contrast, the multi-dimensional analysis process C evaluates the compatibility of each transfer set 23 in the consolidation solution that was specified as part of its input.

The consolidation analysis process D searches for the best consolidation solution that fulfills the constraints defined by the auto fit input 86. The consolidation analysis employs the multi-dimensional compatibility analysis C to assess potential transfer set candidates.

Data Load and Extraction

Figure 10:
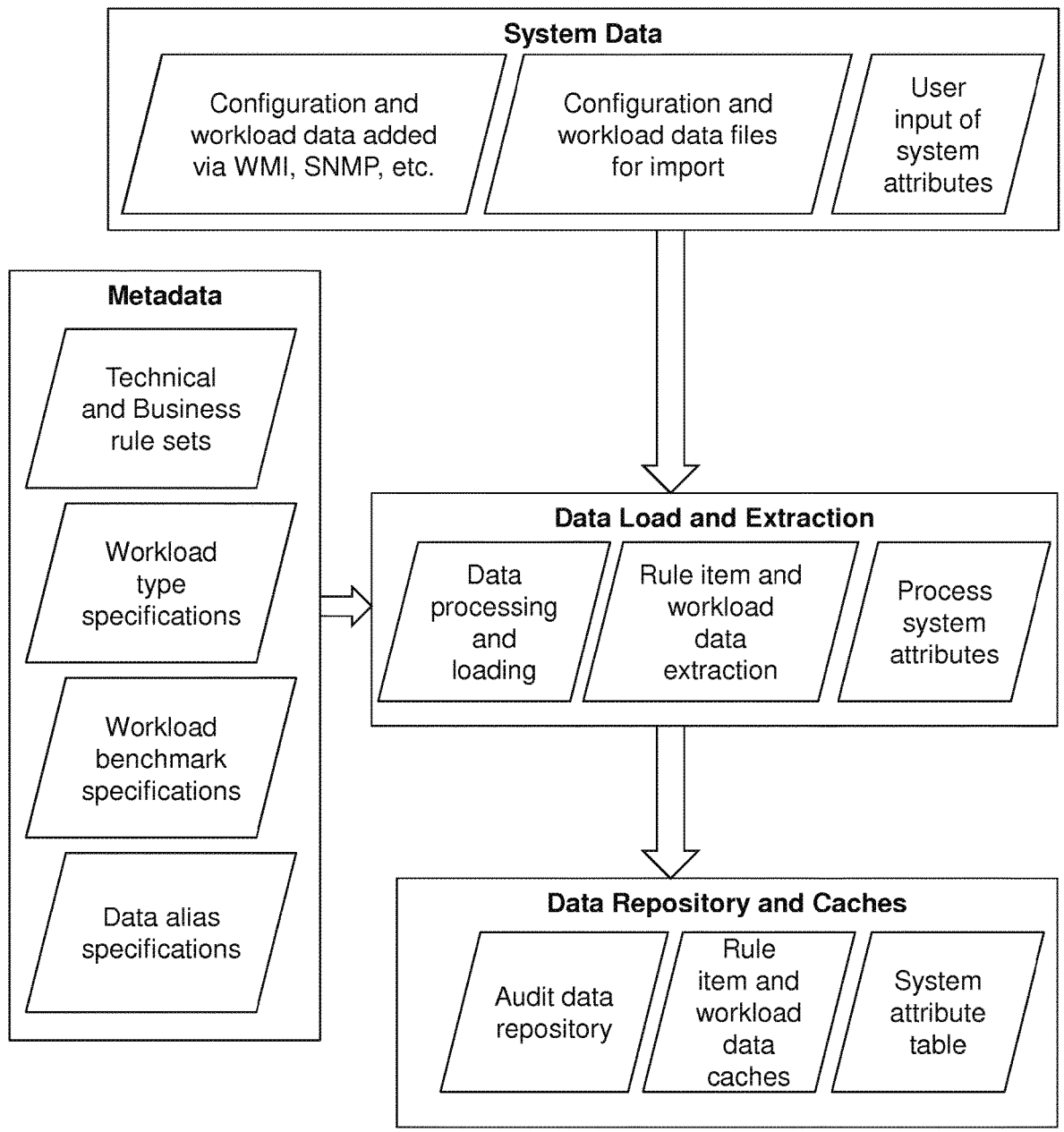
FIG. 10 is a process flow diagram illustrating the loading of system data for analysis.

A process flow diagram for the data load and extraction process A is illustrated in FIG. 10. System data including technical configuration, business related and workload collected through audits, data import and user input are prepared for use by the analyses processes B, C and D.

When system data 18 and attributes are loaded into the analysis program 10, they are stored in the audit data repository 54 and system attribute table 55, respectively. As well, system data 18 referenced by rule set items 28, workload types 30 and benchmarks are extracted and loaded into their respective caches 56, 58. Alias specifications 60 describe how data can be extracted and if necessary, normalized from a variety of data sources.

The data repository 54 and caches 56 and 58 thus store audited data 18, system attributes, the latest rule set data, historical workload data and system workload benchmarks.

1-to-1 Compatibility Analysis

Figure 11:
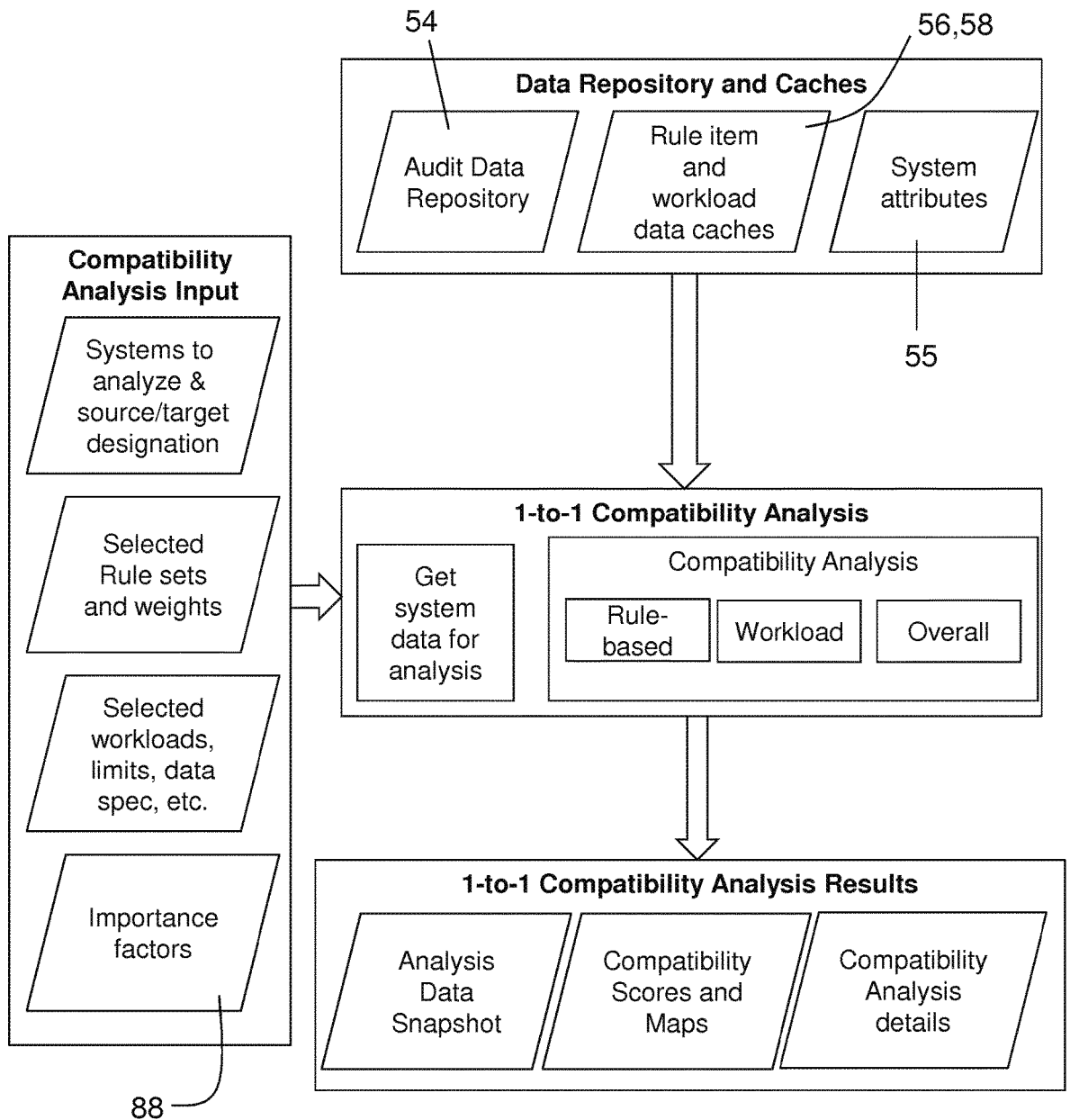
FIG. 11 is a high level process flow diagram for a 1-to-1 compatibility analysis.

A high level flow diagram of the 1-to-1 compatibility analysis is shown in FIG. 11. The 1-to-1 compatibility analysis can take into account analysis input, including input regarding the systems 16 to be analyzed, rule set related parameters, workload related parameters, workload benchmarks and importance factors 88 used to compute overall scores.

The compatibility analysis evaluates the compatibility of every specified system as source-target pairs on a 1-to-1 basis. This analysis produces a compatibility score for each system pair so that analyzing a collection of ten (10) systems 16 produces 10×10 scores. The compatibility analysis is based on the specified rule sets and workload types.

An analysis may be based upon zero or more rule sets and zero or more workload types, such that at least one rule set or workload type is selected. Example rule sets 28 and corresponding descriptions are shown in FIG. 12, and example workload types 30 and corresponding descriptions are shown in FIG. 13.

The selection of rule sets 28 and workload types 30 for an analysis depends on the systems 28 and the consolidation strategy to analyze. For example, to assess the consolidation of a set of UNIX™ systems 16, an analysis may employ the UNIX™ application stacking, location, maintenance window and ownership rule sets 28, and CPU, memory, disk space, disk I/O and network I/O workload types 30.

1-to-1 Compatibility Analysis Process Flow

Figure 14:
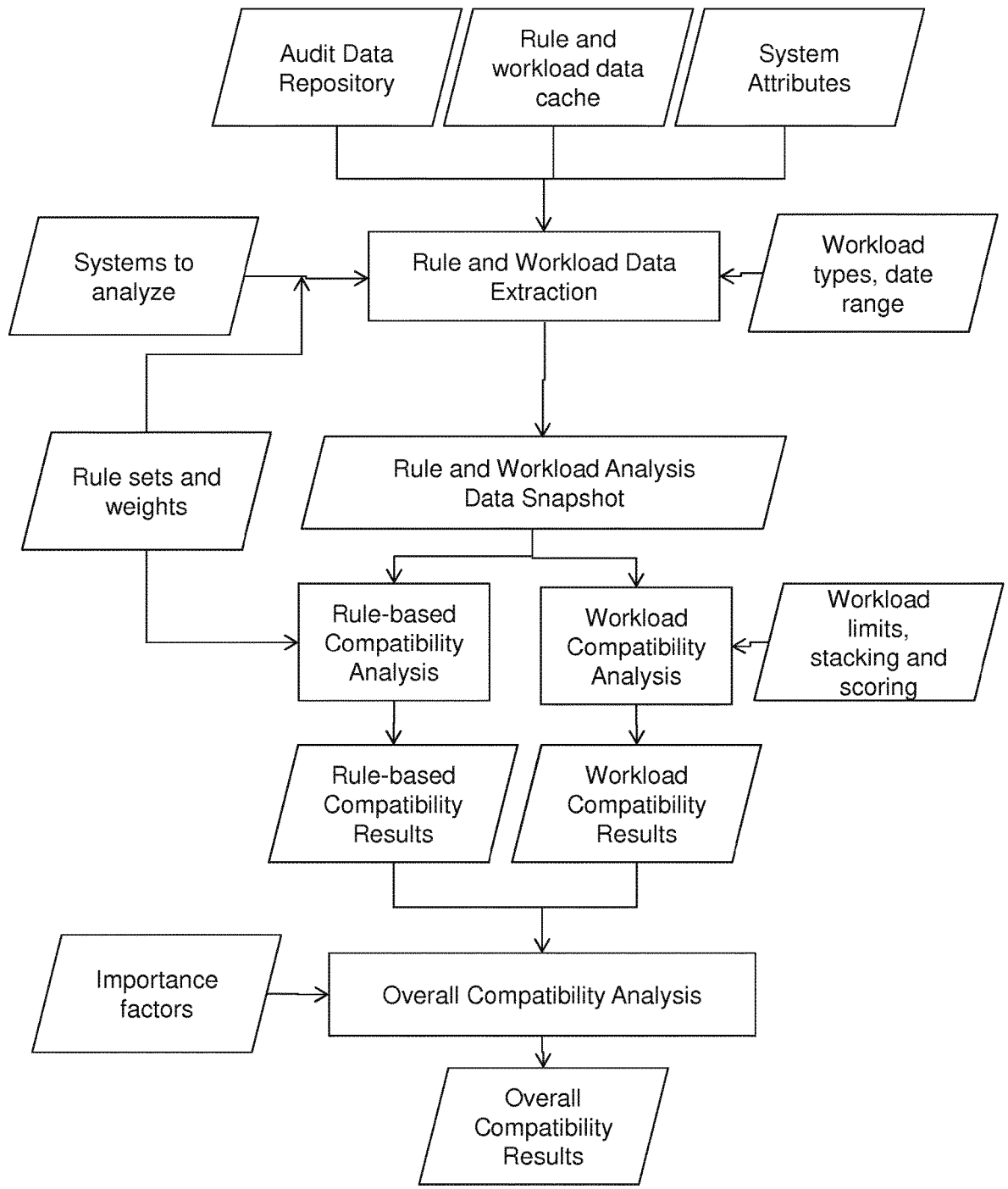
FIG. 14 is a process flow diagram for the 1-to-1 compatibility analysis.

A process flow diagram of the 1-to-1 compatibility analysis is shown in FIG. 14. The analysis generally comprises four stages.

In the first stage, data referenced by the selected rule sets 28 and workload types 30 for the specified date range are retrieved from the data repository 54 and caches 56, 58 for each system 16 to be analyzed. This analysis data is saved as a snapshot and can be used for subsequent analyses.

In the second stage, technical and business related compatibility may be analyzed the using the specified rule sets 28 and weights. Next, workload compatibility is evaluated based the specified workload types 30 and input parameters. Finally, the overall compatibility scores are computed for each pair of systems 16.

Upon completion of the compatibility analysis, the results 20 are provided to the user. The results 20 include rule item and workload data snapshots, 1-to-1 compatibility score maps for each rule set 28 and workload type 30 as well as an overall score map. Analysis details for each map may also be provided.

As noted above, the differential rule sets 28 are used to evaluate the compatibility of systems as they relate to technical and business related constraints. The rule set 28 defines which settings are important for determining compatibility. The rule set 28 typically defines a set of rules which can be revised as necessary based on the specific environment 12. The rule set 28 is thus preferably compiled according to the systems 16 being analysed and prior knowledge of what makes a system 16 compatible with another system 16 for a particular purpose. As will be discussed below, the rule sets 28 are a form of metadata 62.

Differential Rule Sets

Figure 15:
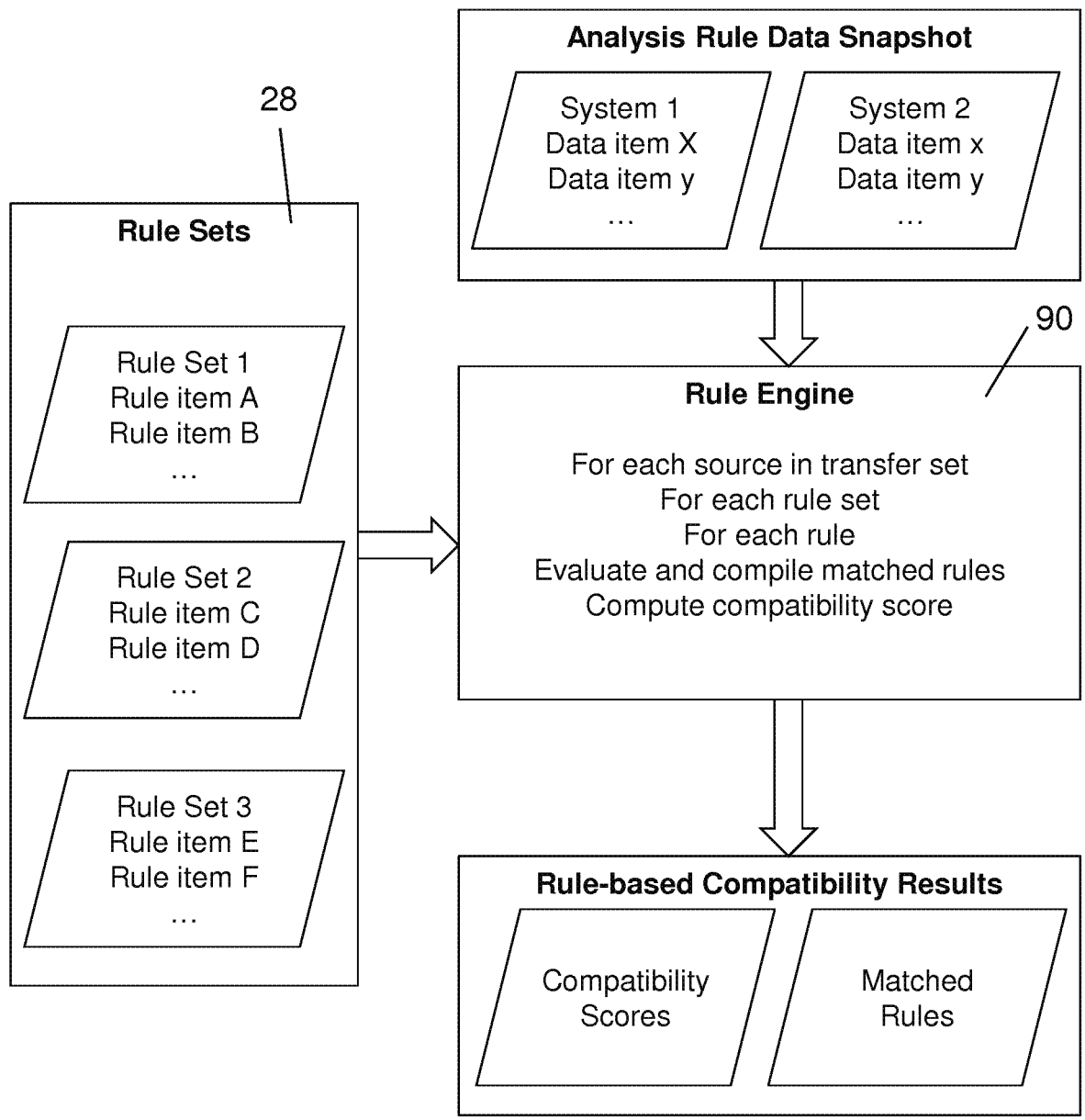
FIG. 15 is a flow diagram illustrating operation of the rule engine analysis.

Further detail regarding the differential rules and differential rule sets 28 is now described making reference to FIGS. 15 and 16, as also described in co-pending U.S. patent application Ser. No. 11/535,308 filed on Sep. 26, 2006, and entitled "Method for Evaluating Computer Systems", the contents of which are incorporated herein by reference.

With respect to the following description of the rule sets 28 and the general application of the rule sets 28 for detecting system incompatibilities by evaluating differences between data parameters of systems 16, the following alternative nomenclature may be used. A target system refers to a system being evaluated, and a baseline system is a system to which the target system is being compared. The baseline and target systems may be the same system 16 at different instances in time (baseline=prior, target=now) or may be different systems 16 being compared to each other. As such, a single system 16 can be evaluated against itself to indicate changes with respect to a datum as well as how it compares to its peers. It will be appreciated that the terms "source system" and "baseline system" are herein generally synonymous, whereby a source system is a type of baseline system.

FIG. 1 illustrates the relationships between system data 18 and the analysis program 10. Data 18 is obtained from the source and target computer systems 16 and is used to analyze the compatibility between the systems 16. In this example, the parameters are evaluated to determine system compatibilities for a consolidation strategy. A distinct data set 18 is preferably obtained for each system 16 (or instance in time for the same system 16 as required).

Rule sets 28 are computer readable and storable so that they may be accessed by the program 10 and modified if necessary, for use in evaluating the computer systems 16.

Rule sets 28 are groupings of rules that represent higher-level considerations such as business objectives or administrative concerns that are taken into account when reporting on or analysing the systems 16. In FIG. 15, six rules 43, A, B C, D, E and F are grouped into three rule sets 28, Rule Set 1, 2 and 3. It will be appreciated that there may be any number of rules in any number of rule sets 28 and those shown in FIG. 15 are for illustrative purposes only.

Rules evaluate data parameters according to rule definitions to determine incompatibilities due to differences (or contentious similarities) between the baseline and target systems. The rule definitions include penalty weights that indicate the importance of the incompatibility as they relate to the operation of the systems 16. The penalty weights are applied during an evaluation if the incompatibility is detected. The evaluation may include the computation of a score or generation of other information indicative of nature of the incompatibilities between the baseline and target systems.

Rules comprised by a rule set 28 may reference common parameters but perform different tests to identify different forms of incompatibilities that may have different levels of importance. For example a version four operating system versus a version three operating system may be considered less costly to remedy and thus less detrimental than a version five operating system compared to a version one operating system. As can be seen, even though the operating systems are different in both cases, the nature of the difference can also be considered and different weights and/or remedies applied accordingly.

Rules can also test for similarities that indicate contentions which can result in incompatibilities between systems. For example, rules can check for name conflicts with respect to system names, database instance names, user names, etc.

The flow of data for applying exemplary rule sets 28 is shown in FIG. 15. In this example, the system data gathered from a pair of systems 16 are evaluated using three rule sets. The rule engine 90 (see also FIG. 7) evaluates the data parameters of the systems 16 by applying rule sets 1, 2 and 3 which comprise of the exemplary rules A, B, C, D, E and F. The evaluation of the rules results in compatibility scores and zero or more matched rule items for each rule set 28. These results can be used for subsequent analyses, such as combining with workload compatibility results to obtain overall compatibility scores.

Rule Set Specification

Each rule set 28 has a unique rule set identifier (UUID), rule set name, rule set description, rule set version, rule set type (e.g. controlled by system 10 or by user), and a rule set category (e.g. generic rule set categorization such as business, configuration etc.).

As described above, each rule set 28 is also comprised of one or more rules.

Rule Definition

A rule is conceptually a form of metadata 62 that specifies a parameter, tests to detect an incompatibility between the baseline and target systems 16, the relative importance of the incompatibility, and the costs associated with the remediating the incompatibility. Each rule is defined by a fixed number of fields as listed in Table 1 below.

TABLE 1

Rule Item Field Specification

| Field | Description |
|---|---|
| Name | Rule name |
| Description | Rule description |
| Data Query Type | Query type to get data parameter (e.g. URI, Attribute, Alias) |

TABLE 1-continued

Rule Item Field Specification

| Field | Description |
|---|---|
| Query Value | Data query specification based on query type |
| Baseline Test | Baseline test specification |
| Target Test | Target test specification |
| Weight | Rule penalty weight |
| Mutex Flag | Y/N - This flag is used at multiple levels as described below |
| Match Flag | Rule match name referenced by suppress flag |
| Suppress Flag | Rule dependency expression to determine whether to suppress rule |
| Remediation Costs | Estimated remediation costs for rule item if true. |
| Enabled Flag | True/False |

The name and description fields are lay descriptions of the condition or discrepancy detected by the rule. These fields are used to provide management-level summaries when processing rule sets 28. The fields can provide as much or as little information as required by the application.

Rule Query Specification

The data query type and value identify the data parameter to be evaluated by the rule. The query type specifies whether the rule applies to audited data directly (UriQuery), normalized values (AliasQuery) or attributes (AttrQuery). The query value specifies the parameter specification based on the query type. For UriQuery, AliasQuery and AttrQuery types, query values specify URI, alias and attribute names, respectively.

The URI value conforms to a URI-like format used for accessing parameters from the native audit data model. The URI can specify the module, object and property of the data object or property that is being requested. The optional URI fragment (i.e. the portion after the "#" symbol) specifies the specific object instance (table row) that is being evaluated, with "*" denoting a wildcard that matches all instances.

Rule Match Test

If specified, the baseline field represents the literal value that would need to match the value of the object/property on the source system in order for the rule to match. For objects and object instances, the keywords "absent" and "present" are preferably used to match cases where that object is absent or present respectively. Similar to the baseline field, the target field allows a literal match against the value of the object/property on the target system. The target field also supports the absent/present specifiers. For numeric properties, relational operators ($>$, $<$, $=$, $!=$) can be used to cause the rule to trigger if the target value has the specified relationship with the source value.

In order to apply a rule to a target/baseline pair, the following test specification can be followed as shown in Table 2.

TABLE 2

Target/Baseline Test Specification

| | Target | Baseline | Description |
|---|---|---|---|
| 1 | | | Values are different |
| 2 | != | | Values are different |
| 3 | | != | Values are different |
| 4 | > | ANY | Target > Baseline |
| 5 | < | ANY | Target < Baseline |
| 6 | = | | Values are the same |
| 7 | | = | Values are the same |
| 8 | ~ | | Values are similar |

TABLE 2-continued

Target/Baseline Test Specification

| Target | Baseline | Description |
|---|---|---|
| 9 | | ~ | Values are similar |
| 10 | X | Y | Target = X and Baseline = Y |
| 11 | X | | Target = X and Baseline != X |
| 12 | | Y | Target != Y and Baseline = Y |

The rule test specifications can be extended to include such things as regular expression pattern matching, logical test expressions (using AND, OR), etc. as described below.

Rule Weight

The weight field specifies the relative importance of that property and combination of source/target values (if specified) in regard to the overall context of the comparison. Higher values indicate that the condition detected by the rule has a high impact on the target environment 12, with 100% being an "absolute constraint" that indicates complete incompatibility.

Mutex Flag

The mutex flag field can be used to avoid multiple penalties that would otherwise skew the scores. A "Y" in the mutex flag field specifies that multiple matches of the same rule 43 will incur only a single penalty on the overall score (as specified in the weight field), as opposed to multiple accumulating penalties (which is the default behaviour).

The mutex flag can be interpreted at multiple levels. When comparing a target and source system, should the rule specifier expand to a list (e.g. software list), the rule is evaluated for each instance. In this case, if the flag is a "Y", the score is penalized by the rule weight a maximum of one time, even if the rule was true for multiple instances. If the flag is "N", the score should be penalized for each instance that was evaluated to be true. Furthermore, when computing multi-dimensional compatibility scores (multiple sources transferred to a single target), the calculation is based on the union of the rule items that were true. In this case, the flag is used to determine whether to penalize the multi-stack score once or for each unique rule instance. The multi-dimensional compatibility analysis is described in detail below.

Rule Dependency

The match flag field enables an optional symbolic flag to be "set" when a rule matches, and which can subsequently be used to suppress other rules (through the "Suppress Flags" field). This effectively allows rule dependencies to be modeled in the rule set 28. The suppress flag field allows symbolic flags (as specified in the "Match Flag" field) to be used to suppress the processing of rules. This allows specific checks to be skipped if certain higher-level conditions exist. For example, if the operating systems are different, there is no need to check the patches. It should be noted that this allows any arbitrary logic to be constructed, such as how logic can be built from NAND gates.

The remediation cost field is preferably optional. The remediation field represents the cost of "fixing" the system(s) (i.e. eliminating the condition or discrepancy detected by the rule 43). When analyzing differences between (or changes to) IT systems this is used to represent hardware/software upgrade costs, administrative costs and other costs associated with making the required changes to the target systems. The calculations behind this field vary based on the nature of the system and the parameter that would need to be added, upgraded etc.

Each rule can include a true/false enable flag for enabling and disabling the rule item.

Rule Set Example

FIG. 16 provides an example rule set 28, which includes a number of rules. The following refers to the number indicated in the leftmost column of FIG. 16.

Rule 1 scrutinizes the normalized (AliasQuery) representation of the operating systems (e.g. Windows™, Solaris™, AIX™, Linux™, etc.) on both the source and target systems and heavily penalizes cases where these are different as evident from the high weight factor (70%). Rule 2 penalizes systems that have different operating system versions (e.g. Windows™ NT vs Windows™ 2000), and is suppressed (i.e. not processed) in cases where the systems have different overall operating systems (as detected in the previous rule). Rule 3 detects if systems are in different time zones. Rule 4 penalizes combinations of systems where the target has less memory than the source (this is what is referred to as a directional rule, which can give differing results if sources and targets are reversed, e.g. asymmetric results). Rule 5 operates directly against audit data and detects cases where the operating system patch level differs. This rule is not processed if either the operating system or the operating system version are different (since this renders the comparison of patches meaningless).

Rule 6 scrutinizes the lists of all patches applied to the source and target systems and penalizes cases where they differ. The mutex flag is set, indicating that the penalty is applied only once, no matter how many patch differences exist. This rule is ignored in cases where either the operating system or operating system version are different. Rule 7 penalizes system combinations of servers that are running the same OS but are configured to run a different number of kernel bits (e.g. 64-bit vs 32-bit). Rule 8 penalizes combinations where there are kernel parameters defined on the source that are not defined on the target. This rule is not applied if the operating systems are different.

Rule 9 scrutinizes a specific kernel setting (SHMMAX, the setting that specifies how much shared memory a system can have) and penalizes combinations where it is set to a lower value on the target than it is on the source system. Rule 10 penalizes combinations of systems that are running different database version, e.g. Oracle™ 9 vs. Oracle™ 8. Rule 11 penalizes combinations of systems that are running different versions of Oracle™. Rule 11 is suppressed if the more specific Rule 10 is true. It should be noted that the remediation cost is relatively high, owing to the fact that it will take a software upgrade to eliminate this discrepancy. In some cases the remediation cost can be low where the upgrade is less expensive. Rule 12 penalizes combinations of systems that are running different versions of Apache. It should be noted that the remediation cost is relatively low, as apache is an open source product and the cost of upgrade is based on the hourly cost of a system administrator and how long it will take to perform the upgrade.

Rule 13 scrutinizes a windows-specific area of the audit data to determine if the source and target systems are running different service pack levels. It should be noted that this rule closely mirrors rule 5, which uses a rule specifier that scrutinizes the UNIX™/Linux™ area of the audit data. Rule 14 scrutinizes the lists of all hotfixes applied to the source and target systems and penalizes cases where they differ. This rule closely mirrors rule 6, which scrutinizes patches on UNIX™ and Linux™. Rule 15 detects differing startup commands between systems. Rule 16 is a rule to detect differing Paths between systems, and rule 17 detects differing System Paths between systems.

Rule 18 penalizes system combinations where there are services installed on the source that are not installed on the target. This rule has the mutex flag set, and will therefore only penalize a system combination once, no matter how many services are missing. Rule 19 penalizes system combinations where there are services started on the source that are not started on the target. It should be noted that both the weight and the remediation cost are lower than the previous rule, owing to the fact that it is generally easier and less expensive to start a service than install it. Finally, rule 20 penalizes combinations where the target system is missing the virus scanner software.

It will be appreciated that the above described rules and rule set 28 are shown for illustrative purposes only and that any combination of rules can be used to achieve specific goals. For example, rules that are applicable to the OS can be grouped together to evaluate how a system 16 compares to its peers. Similarly, rules pertaining to database, Java applications etc. can also be grouped.

As discussed above, FIG. 12 provides a table listing several additional example rule sets and associated descriptions.

The system consolidation analysis computes the compatibility of a set of systems 16 based not only on technical and workload constraints as exemplified above, but also business constraints. The business constraints can be expressed in rule sets 28, similar to the technical constraints discussed above.

Rule Specification Enhancements

In another embodiment, the rule test specification shown above in Table 1 can be extended to support the "NOT" expression, e.g. "!X" where "!" indicates not equal to; and to support regular expression patterns, e.g. "rx:Pattern" or "!rx:Pattern". An example is shown in Table 3 below.

TABLE 3

Extended Rule Test Specification

| Target | Baseline | Description |
|---|---|---|
| X | !Y | Target = X and Baseline != Y |
| !X | | Target != X |
| | !Y | Baseline != Y |
| rx:P1 | !rx:P2 | Target matches P1 and Baseline does not match P2 |
| rx:P1 | | Target matches P1 |
| | !rx:P2 | Baseline does not match P2 |
| X | rx:P2 | Target = X and Baseline matches P2 |
| !X | rx:P2 | Target != X and Baseline matches P2 |

In yet another embodiment, an advanced rule set specification may also be used to support more flexible rule logic by considering the following rule item specification shown in Table 4.

TABLE 4

Advanced Rule Item Specification

| Field | Description |
|---|---|
| Name | As before |
| Description | As before |
| Data Query Type | As before |
| Query Value | As before |
| Test | Test expression |
| Weight | As before |
| Mutex Flag | As before |
| Match Flag | As before |

TABLE 4-continued

Advanced Rule Item Specification

| Field | Description |
|---|---|
| Match Test | Rule dependency expression to determine whether to perform the corresponding match action |
| Match Action | Action (run/suppress/stop) to execute based on match test result |
| Remediation Costs | As before |
| Enabled Flag | As before |

The highlighted fields above are incorporated to include a test expression and match test and corresponding match action to be executed according to the match test result.

In the advanced rule specification, the following elements are supported: variables, such as target, source etc.; regular expressions, e.g. regex("pattern"); constants, such as quoted string values "lala", "1" etc.; test operators, =, !=, <, <=, >, >=, ~, !~; logical operators, AND &&, OR, ||; and logical operator precedence, ( ) for nested expressions.

For example:

Target !=Source;

Target>=Source &&>"1024";

Target=regex("Windows") && Source !=regex("Solaris|AIX"); and (Target="X" && Source="Y")||(Target="A" && Source="B").

The test expression supports the following elements: match flag names; logical operators, AND &&, OR, ||; test operator, NOT !; and logical operator precedence, ( ) for nested expressions. Examples assuming match flags of A, B, C, D, etc. are as follows:

A

A||B

A && B (A && !B)||C

The match action specifies the action to perform if the match test rule is true. Possible actions are: run, evaluate the rule item; suppress, do not evaluate the rule item; and stop.

Where basic and advanced rule sets are available for the same analysis program, there are a number of options for providing compatibility. The rule set specification can be extended to include a property indicating the minimum required rule engine version that is compatible with the rule set. In addition, the basic rule sets can be automatically migrated to the advanced rule set format since the advanced specification provides a super set of functionality relative to the basic rule set specification. It will be appreciated that as new rules and rule formats are added, compatibility can be achieved in other ways so long as legacy issues are considered where older rule versions are important to the analysis.

1-to-1 Rule-Based Compatibility Analysis

Figure 17:
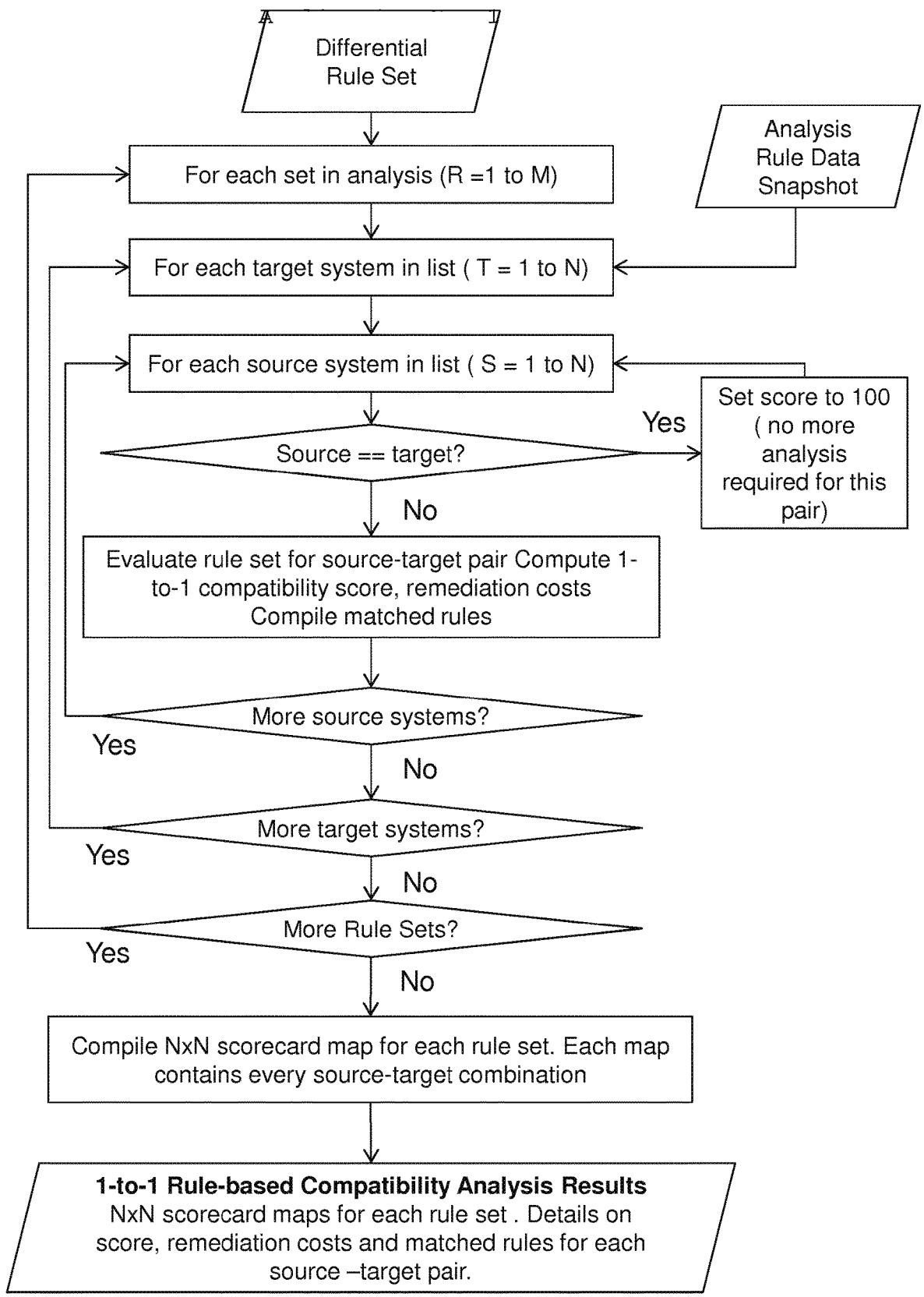
FIG. 17 is a flow diagram of the 1-to-1 rule-based compatibility analysis.
Figure 18:
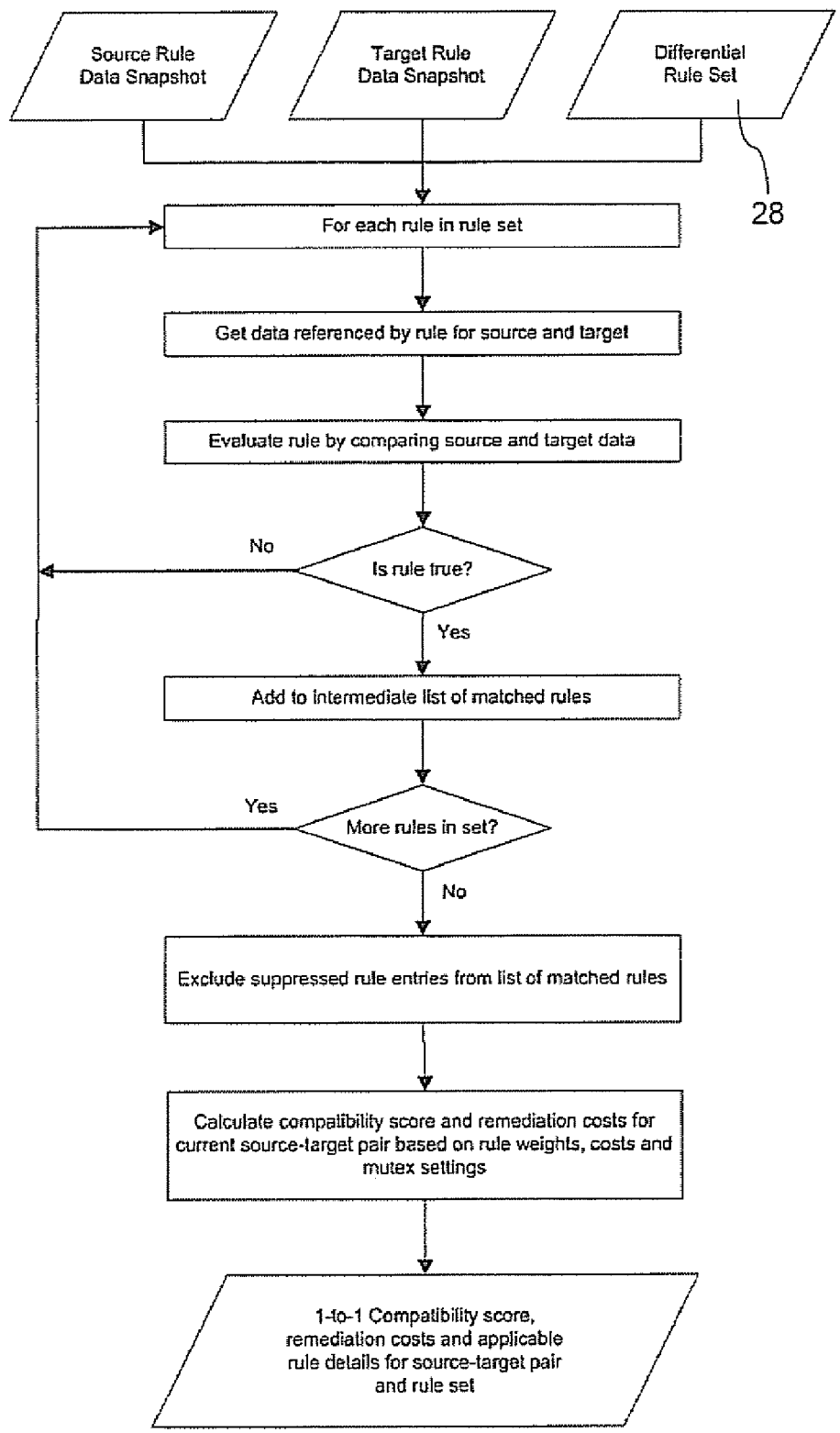
FIG. 18 is a flow diagram illustrating the evaluation of a rule set.

An exemplary process flow for a rule-based compatibility analysis is shown in greater detail in FIGS. 17 and 18. When analyzing system compatibility, the list of target and source systems 16 are the same. The compatibility is evaluated in two directions, e.g. for a Server A and a Server B, migrating A to B is considered as well as migrating B to A.

Turning first to FIG. 17, for each rule set R (R=1 to M where M is the number of rule sets) and for each target system T (T=1 to N where N is the number of systems), the rule engine 90 first looks at each source system S (S=1 to N). If the source=target then the configuration compatibility score for that source is set to 100, no further analysis is required and the next pair is analyzed. If the source and target are different, the rules are evaluated against the source/target pair to compute the compatibility score, remediation cost and to compile the associated rule details. Estimated remediation costs are optionally specified with each rule item. As part of the rule evaluation and subsequent compatibility score calculation, if a rule is true, the corresponding cost to address the deficiency is added to the remediation cost for the pair of systems 16 being analysed.

The evaluation of the rules is shown in FIG. 18. The evaluation of the rules considers the snapshot data 18 for the source system and the target system, as well as the differential rule set 28 that being applied. For each rule in the set 28, the data referenced by the rule is obtained for both the target and source. The rule is evaluated by having the rule engine 90 compare the data. If the rule is not true (i.e. if the systems 16 are the compatible according to the rule definition) then the data 18 is not considered in the compatibility score and the next rule is evaluated. If the rule is true, the rule details are added to an intermediate result. The intermediate result includes all true rules.

Preferably, a suppression tag is included with each rule. As discussed above, the suppression tag indicates other rules that are not relevant if that rule is true. The suppression flag allows the program 10 to avoid unnecessary computations. A mutex flag is also preferably used to avoid unfairly reducing the score for each true rule when the rules are closely affected by each other.

Once each rule has been evaluated, a list of matched rules is created by removing suppressed rule entries from the intermediate results based on rule dependencies, which are defined by rule matching and suppression settings (e.g. match flags and suppression tags). The compatibility score for that particular source/target pair is then computed based on the matched rules, weights and mutex settings. Remediation costs are also calculated based on the cost of updating/upgrading etc. and the mutex settings.

Turning back to FIG. 17, the current target is then evaluated against all remaining sources and then the next target is evaluated. As a result, an N×N map 32 can be created that shows a compatibility score for each system against each other system. The map 32 can be sorted by grouping the most compatible systems. The sorted map 32 is comprised of every source/target combination and thus provides an organized view of the compatibilities of the systems 16.

Preferably, configuration compatibility results are then generated for each rule set 28, comprising the map 32 (e.g. FIG. 4) and for each source-target pair details available pertaining to the configuration compatibility scoring weights, remediation costs and applicable rules. The details can preferably be pulled for each source/target pair by selecting the appropriate cell 92 (see FIG. 19).

1-to-1 Workload Compatibility Analysis

The workload compatibility analysis evaluates the compatibility of each source-target pair with respect to one or more workload data types 30. The analysis employs a workload stacking model to combine the source workloads onto the target system. The combined workloads are then evaluated using threshold and a scoring algorithm to calculate a compatibility score for each workload type.

Workload Data Types and Benchmarks

System workload constraints must be assessed when considering consolidation to avoid performance bottlenecks. Workload types representing particularly important system resources include % CPU utilization, memory usage, disk space used, disk I/O throughput and network I/O throughput. The types of workload analyzed can be extended to support additional performance metrics. As noted above, example workload types are summarized in the table shown in FIG. 13.

Each workload type can be defined by the properties listed in Table 5 below:

TABLE 5

Workload Type Definition

| Property | Description | Examples |
| --- | --- | --- |
| Name | Workload key name | CPU_Utilization |
| Display Name | Workload display name for UI | CPU Utilization |
| Benchmark Type | Benchmark type corresponding to workload type | cpu |
| Alias Name | Alias to get workload values from repository | CpuDays |
| Alias File | Alias file containing above alias | cpu_workload_alias.xml |
| Description | Short description of workload type | CPU Utilization |
| Unit | Unit of workload value | % |
| Test as percent? | Boolean flag indicating whether to test the workload against a threshold as a percentage (true) or as an absolute value (false) | true |

Workload values can be represented as percentages (e.g. % CPU used) or absolute values (e.g. disk space used in MB, disk I/O in MB/sec).

The term workload benchmark refers to a measure of a system's capability that may correspond to one or more workload types. Workload benchmarks can be based on industry benchmarks (e.g. CINT2000 for processing power) or the maximum value of a system resource (e.g. total disk space, physical memory, network I/O bandwidth, maximum disk I/O rate). Benchmarks can be used to normalize workload types that are expressed as a percentage (e.g. % CPU used) to allow direct comparison of workloads between different systems 16.

Benchmarks can also be used to convert workload types 30 that are expressed as absolute values (e.g. disk space used in MB) to a percentage (e.g. % disk space used) for comparison against a threshold expressed as a percentage. Each benchmark type can be defined by the following in Table 6:

TABLE 6

Workload Benchmark Definition

| Property | Description | Example |
| --- | --- | --- |
| Name | Benchmark name | cpu |
| Default value | Default benchmark value if not resolved by the other means (optional) | <none> |
| Alias name | Alias to get benchmark value for specific system (optional) | cpuBenchmark |
| Alias file | File containing alias specified above | benchmark_alias.xml |
| Attribute name | System attribute value to lookup to get benchmark value (optional) | CINT2000 |
| Use alias first | Boolean flag indicating whether to try the alias or the attribute lookup first | true |

System benchmarks can normalize workloads as follows. For systems X and Y, with CPU benchmarks of 200 and 400 respectively (i.e. Y is 2× more powerful than X), if systems X and Y have average CPU utilizations of 10% and 15% respectively, the workloads can be normalized through the benchmarks as follows. To normalize X's workload to Y, multiply X's workload by the benchmark ratio X/Y, i.e. 10%×200/400=5%.

Stacking X onto Y would then yield a total workload of 5%+15%=20%. Conversely, stacking Y onto X would yield the following total workload: 10%+15%×400/200=40%.

Workload Data Model

As discussed above, workload data is collected for each system 16 through various mechanisms including agents, standard instrumentation (e.g. Windows Performance Monitor™ UNIX™ System Activity Reporter), custom scripts, third party performance monitoring tools, etc. Workload data is typically collected as discrete time series data. Higher sample frequencies provide better accuracy for the analysis (5 minute interval is typical). The workload data values should represent the average values over the sample period rather than instantaneous values. An hour of CPU workload data for three fictional systems (A, B and C) is listed below in Table 7:

TABLE 7

Sample Workload Data (Time series)

| Timestamp | % CPU used (A) | % CPU used (B) | % CPU used (C) |
|---|---|---|---|
| 03/01/07 00:00:00 | 10 | 0 | 0 |
| 03/01/07 00:05:00 | 12 | 0 | 0 |
| 03/01/07 00:10:00 | 18 | 10 | 4 |
| 03/01/07 00:15:00 | 22 | 10 | 6 |
| 03/01/07 00:20:00 | 25 | 15 | 7 |
| 03/01/07 00:25:00 | 30 | 25 | 8 |
| 03/01/07 00:30:00 | 30 | 35 | 12 |
| 03/01/07 00:35:00 | 35 | 39 | 15 |
| 03/01/07 00:40:00 | 39 | 45 | 19 |
| 03/01/07 00:45:00 | 41 | 55 | 21 |
| 03/01/07 00:50:00 | 55 | 66 | 28 |
| 03/01/07 00:55:00 | 80 | 70 | 30 |

Data from different sources may need to be normalized to common workload data types 30 to ensure consistency with respect to what and how the data is measured. For example, % CPU usage may be reported as Total % CPU utilization, % CPU idle, % CPU system, % CPU user, % CPU I/O, etc. Disk utilization may be expressed in different units such as KB, MB, blocks, etc.

The time series workload data can be summarized into hourly quartiles. Specifically, the minimum, $1^{st}$ quartile, median, $3^{rd}$ quartile, maximum, and average values are computed for each hour. Based on the workload data from the previous example, the corresponding summarized workload statistics are listed below in Table 8:

TABLE 8

Summarized Workload Data (Quartiles) for Hour 0

| System | Hour | % CPU (Avg) | % CPU (Min) | % CPU (Q1) | % CPU (Q2) | % CPU (Q3) | % CPU (Max) |
|---|---|---|---|---|---|---|---|
| A | 0 | 33.1 | 10 | 20 | 30 | 40 | 80 |
| B | 0 | 30.8 | 0 | 10 | 30 | 50 | 70 |
| C | 0 | 12.5 | 0 | 5 | 10 | 20 | 30 |

The compatibility analysis for workload uses the hourly quartiles. These statistics allow the analysis to emphasize the primary operating range (e.g. $3^{rd}$ quartile) while reducing sensitivity to outlier values.

Workload Data Extraction

Workload data is typically collected and stored in the workload data cache 58 for each system 16 for multiple days. At least one full day of workload data should be available for the analysis. When analyzing workloads, users can specify a date range to filter the workload data under consideration. A representative day is selected from this subset of workload data for the analysis. The criteria for selecting a representative day should be flexible. A preferable default assessment of the workload can select the worst day as the representative day based on average utilization. A less conservative assessment may consider the $N^{th}$ percentile (e.g. $95^{th}$)) day to eliminate outliers. Preferably, the worst days (based on daily average) for each system and for each workload type are chosen as the representative days.

Figure 20:
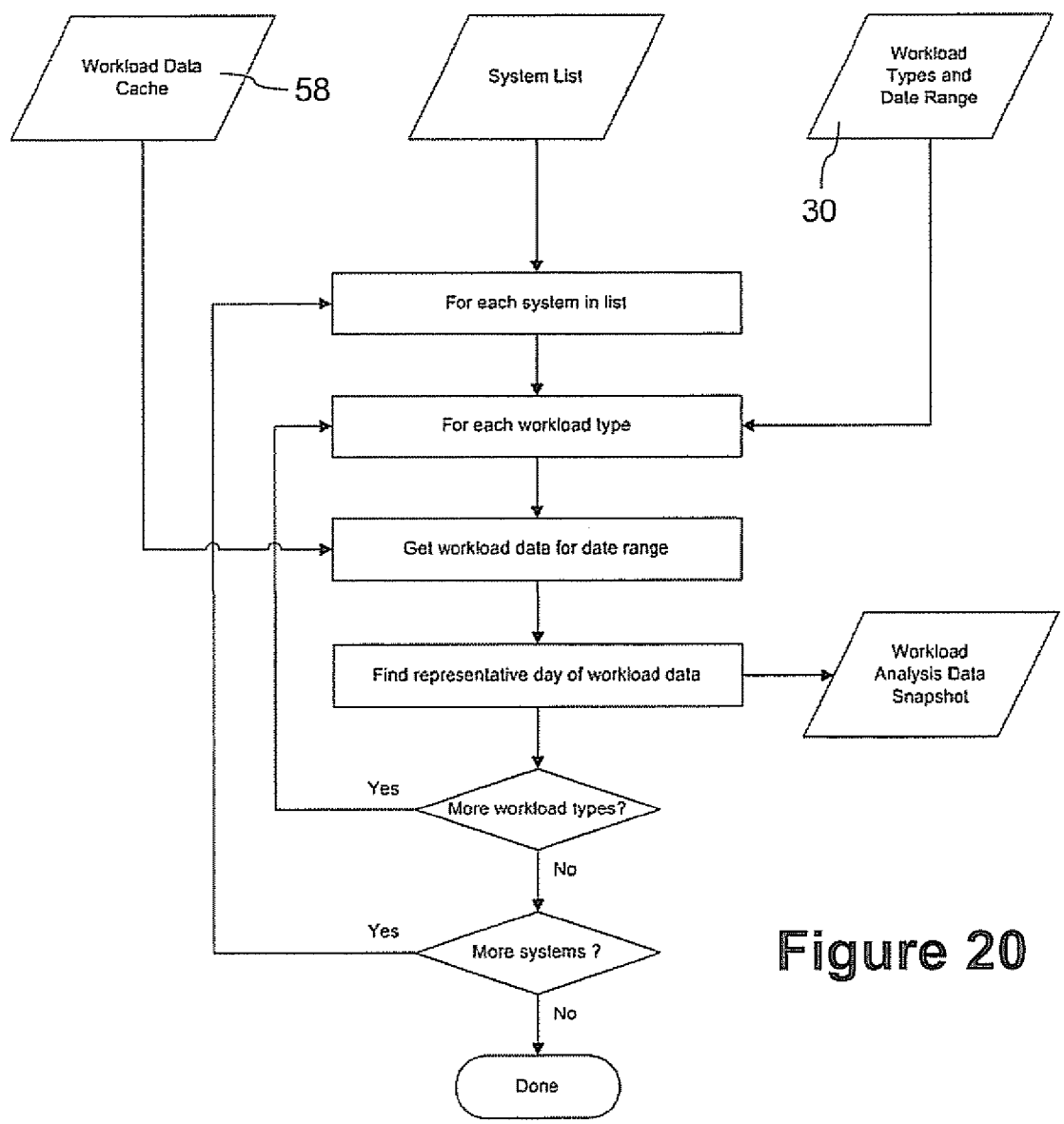
FIG. 20 is a flow diagram of workload data extraction process.

The data extraction process flow for the workload compatibility analysis is shown in FIG. 20. Preferably, the workload data cache 58 includes data obtained during one or more days. For each system 16 in the workload data set, for each workload data type 30, get the workload data for the specified date range, determine the most representative day of data, (e.g. if it is the worst day) and save it in the workload data snapshot. In the result, a snapshot of a representative day of workload data is produced for each system 16.

Workload Stacking

To evaluate the compatibility of one or more systems with respect to server consolidation, the workloads of the source systems are combined onto the target system. Some types of workload data are normalized for the target system. For example, the % CPU utilization is normalized using the ratio of target and source CPU processing power benchmarks. The consolidated workload for a specific hour in the representative day is approximated by combining the hourly quartile workloads.

There are two strategies for combining the workload quartiles, namely original and cascade. The original strategy simply adds like statistical values (i.e. maximum, third quartile, medians, etc.) of the source systems to the corresponding values of the target system. For example, combining the normalized CPU workloads of systems A and B onto C (from Table 8), the resulting consolidated workload statistics for hour 0 are:

| Maximum = | $Max_A + Max_B + Max_C =$ | 180% |
|---|---|---|
| $3^{rd}$ Quartile = | $Q3_A + Q3_B + Q3_C =$ | 110% |
| Median = | $Q2_A + Q2_B + Q2_C =$ | 70% |
| $1^{st}$ Quartile = | $Q1_A + Q1_B + Q1_C =$ | 35% |
| Minimum = | $Min_A + Min_B + Min_C =$ | 10% |

The resulting sums can exceed theoretical maximum capacity/benchmark values (e.g. >100% CPU used).

The cascade strategy processes the statistical values in descending order, starting with the highest statistical value (i.e. maximum value). The strategy adds like statistical values as with original, but may clip the resulting sums if they exceed a configurable limit and cascades a portion of the excess value to the next statistic (i.e. the excess of sum of the maximum values is cascaded to $3^{rd}$ quartile). The relevant configuration properties for the cascade calculation are listed below in Table 9.

TABLE 9

Workload Cascade Configuration

| Property | Description | Example |
|---|---|---|
| wci.cascade_overflow | Boolean flag indicating whether to apply cascade (true) or original (false) strategy | true\|false |
| wci.cascade_overflow_proportion | Fraction of overflow to cascade to next value | 0.5 |
| wci.clip_type | Flag indicating whether to use benchmark value (max) or analysis workload threshold (limit) as the clipping limit | limit\|max |
| wci.clip_limit_ratio | If clip_type is limit, this is the ratio to apply to workload limit to determine actual clipping limit | 2 |

The following example applies cascade calculation to the example workload data from Table 2 with the following settings:

| | |
|---|---|
| wci.cascade_overflow = | true |
| wci.cascade_overflow_proportion = | 0.5 |
| wci.clip_type = | max |

The max clip type indicates that the clipping level is the maximum value of the workload type. In this example, the clipping level is 100% since the workload type is expressed as a percentage (% CPU). The overflow proportion indicates that 0.5 of the excess amount above the clipping level should be cascaded to the next statistic. The consolidated workload statistics are computed as follows:

$$
\begin{aligned}
\text{Max}_{Original} &= \text{Max}_A + \text{Max}_B + \text{Max}_C \\
&= 180\% \\
\text{Max}_{Clipped} &= \text{Minimum of }(\text{Max}_{Original}, \text{clipping level}) \\
&= \text{Minimum of }(180, 100) \\
&= 100\% \\
\text{Max}_{Excess} &= \text{Max}_{Original} - \text{Max}_{Clipped} \\
&= 180\% - 100\% \\
&= 80\% \\
\text{Max}_{Overflow} &= \text{Max}_{Excess} * \text{wci.cascade\_overflow\_proportion} \\
&= 80\% * 0.5 \\
&= 40\% \\
Q3_{Original} &= Q3_A + Q3_B + Q3_C \\
&= 110\% \\
Q3_{Cascade} &= Q3_{Original} + \text{Max}_{Overflow} \\
&= 110\% + 40\% \\
&= 150\% \\
Q3_{Clipped} &= \text{Minimum of }(Q3_{Cascade}, \text{clipping level}) \\
&= \text{Minimum of }(150, 100) \\
&= 100\% \\
Q3_{Excess} &= 50\% \\
Q3_{Overflow} &= 25\% \\
Q2_{Original} &= 70\% \\
Q2_{Cascade} &= Q2_{Original} + Q3_{Overflow} \\
&= 70\% + 25\% \\
&= 95\% \\
Q2_{Clipped} &= \text{Minimum of }(Q2_{Cascade}, \text{clip level}) \\
&= \text{Minimum of }(95, 100) \\
&= 95\% \\
Q2_{Overflow} &= 0\% \\
Q1_{Original} &= 35\% \\
Q1_{Cascade} &= 35\% \\
Q1_{Clipped} &= 35\% \\
Q1_{Overflow} &= 0\% \\
\text{Min}_{Original} &= 10\% \\
\text{Min}_{Clipped} &= 10\%
\end{aligned}
$$

The consolidated statistics for the above example are summarized in the following Table 10. The clipped values are net results of the analysis, namely the new answer.

TABLE 10

Cascaded Statistics (Example 1)

| Statistic | Original | Cascade | Clipped | Excess | Overflow |
|---|---|---|---|---|---|
| Max | 180 | 180 | 100 | 80 | 40 |
| Q3 | 110 | 150 | 100 | 50 | 25 |
| Q2 | 70 | 95 | 95 | 0 | 0 |
| Q1 | 35 | 35 | 35 | 0 | 0 |
| Min | 10 | 10 | 10 | 0 | 0 |

Similarly, the following example applies cascade calculation to the example workload data from Table 7 with the following settings:

| | |
|---|---|
| wci.cascade_overflow = | true |
| wci.cascade_overflow_proportion = | 0.5 |
| wci.clip_type = | limit |
| wci.clip_limit_ratio = | 2 |

This example specifies a limit clip type to indicate that the clipping level is based on the analysis threshold for the workload type. The clip limit ratio specifies the ratio to apply to the threshold to calculate the actual clipping level. For instance, if the threshold is 80% and the clip limit ratio is 2, the clipping level is 160%. The consolidated workload statistics based on the above settings listed below in Table 11.

TABLE 11

Cascaded Statistics (Example 2)

| Statistic | Original | Cascade | Clipped | Excess | Overflow |
|---|---|---|---|---|---|
| Max | 180 | 180 | 160 | 20 | 10 |
| Q3 | 110 | 120 | 120 | 0 | 0 |
| Q2 | 70 | 70 | 70 | 0 | 0 |
| Q1 | 35 | 35 | 35 | 0 | 0 |
| Min | 10 | 10 | 10 | 0 | 0 |

Workload Compatibility Scoring

Workload compatibility scores quantify the compatibility of consolidating one or more source systems onto a target system. The scores range from 0 to 100 with higher scores indicating better compatibility. The scores are computed separately for each workload type 30 and are combined with the system configuration and business-related compatibility scores to determine the overall compatibility scores for the systems 16. The workload scores are based on the following: combined system workload statistics at like times and worst case, user-defined workload thresholds, penalty calculation, score weighting factors, and workload scoring formula.

Workloads are assessed separately for two scenarios: like-times and worst case. The like times scenario combines the workload of the systems at like times (i.e. same hours) for the representative day. This assumes that the workload patterns of the analyzed systems are constant. The worst case scenario time shifts the workloads for one or more systems 16 to determine the peak workloads. This simulates the case where the workload patterns of the analyzed systems may occur earlier or be delayed independently. The combined workload statistics (maximum, $3^{rd}$ quartile, median, $1^{st}$ quartile and minimum) are computed separately for each scenario.

For a specific analysis, workload thresholds are specified for each workload type. The workload scores are penalized as a function of the amount the combined workload exceeds the threshold. Through the workload type definition (Table 6), the workload data (Table 7) and corresponding thresholds can be specified independently as percentages or absolute values. The workload data type 30 is specified through the unit property and the threshold data type is specified by the test as percent flag. The common workload/threshold data type permutations are handled as follows.

If the workload is expressed as a percentage and test as percent is true (e.g. % CPU), normalize workload percentage using the benchmark and compare as percentages.

If the workload is expressed as an absolute value and test as percent is true (e.g. disk space), convert the workload to a percentage using benchmark and compare as percentages.

If workload unit is expressed as an absolute value and test as percent if false (e.g. network I/O), compare workload value against threshold as absolute values.

A penalty value ranging from 0 to 1 can be calculated for each workload statistic and for each scenario as a function of the threshold and the clipping level. The penalty value is computed as follows:

```
If Workload  <=  Threshold,
    Penalty = 0
If Workload  >=  Clipping Level,
    Penalty = 1
If Threshold  <  Workload  <  Clipping Level,
    Penalty = (Workload Value − Threshold)/
              (Clipping level − Threshold)
```

Using Example 2 from above (threshold=80%, clipping level=160%), the sliding scale penalty values are computed as follows:

```
Penalty_Max = (160 − 80)/(160 − 80)
            = 1
Penalty_Q3  = (120 − 80)/(160 − 80)
            = 0.5
Penalty_Q2  = 0   [since 70 < 80]
Penalty_Q1  = 0   [since 35 < 80]
Penalty_Min = 0   [since 10 < 80]
```

The workload score is composed of the weighted penalty values. Penalty weights can be defined for each statistic and scenario as shown in Table 12 below.

TABLE 12

Score Weighting Factors

| Statistic | Scenario | Property | Example |
|---|---|---|---|
| Maximum | Like Times | wci.score.max_like_times | 0.2 |
| Maximum | Worst Times | wci.score.max_worst_times | 0.1 |
| $3^{rd}$ Quartile | Like Times | wci.score.q3_like_times | 0.4 |
| $3^{rd}$ Quartile | Worst Times | wci.score.q3_worst_times | 0.3 |
| Median | Like Times | wci.score.q2_like_times | 0 |
| Median | Worst Times | wci.score.q2_worst_times | 0 |
| $1^{st}$ Quartile | Like Times | wci.score.q1_like_times | 0 |
| $1^{st}$ Quartile | Worst Times | wci.score.q1_worst_times | 0 |
| Minimum | Like Times | wci.score.min_like_times | 0 |
| Minimum | Worst Times | wci.score.min_worst_times | 0 |

The weights are used to compute the workload score from the penalty values. If the sum of the weights exceeds 1, the weights should be normalized to 1.

The actual score is computed for a workload type by subtracting the sum of the weighted penalties from 1 and multiplying the result by 100:

Score=100*(1−Sum(Weight*Penalty))

Using the previous example and assuming that the like times are the same as the worst times, the score is calculated as follows:

Score=100*(1−(Weight$_{Max\ Worst}$*Penalty$_{Max\ Worst}$+
Weight$_{Max\ Like}$*Penalty$_{Max\ Like}$+
Weight$_{Q3\ Worst}$*Penalty$_{Q3\ Worst}$+
Weight$_{Q3\ Like}$*Penalty$_{Q3\ Like}$+
Weight$_{Q2\ Worst}$*Penalty$_{Q2\ Worst}$+
Weight$_{Q2\ Like}$*Penalty$_{Q2\ Like}$+
Weight$_{Q1\ Worst}$*Penalty$_{Q1\ Worst}$+
Weight$_{Q1\ Like}$*Penalty$_{Q1\ Like}$+
Weight$_{Min\ Worst}$*Penalty$_{Min\ Worst}$+
Weight$_{Min\ Like}$*Penalty$_{Min\ Like}$))=100*(1−
(0.1*1+0.2*1+0.3*0.5+0.4*0.5)=30

1-to-1 Workload Compatibility Analysis Process Flow

Figure 21:
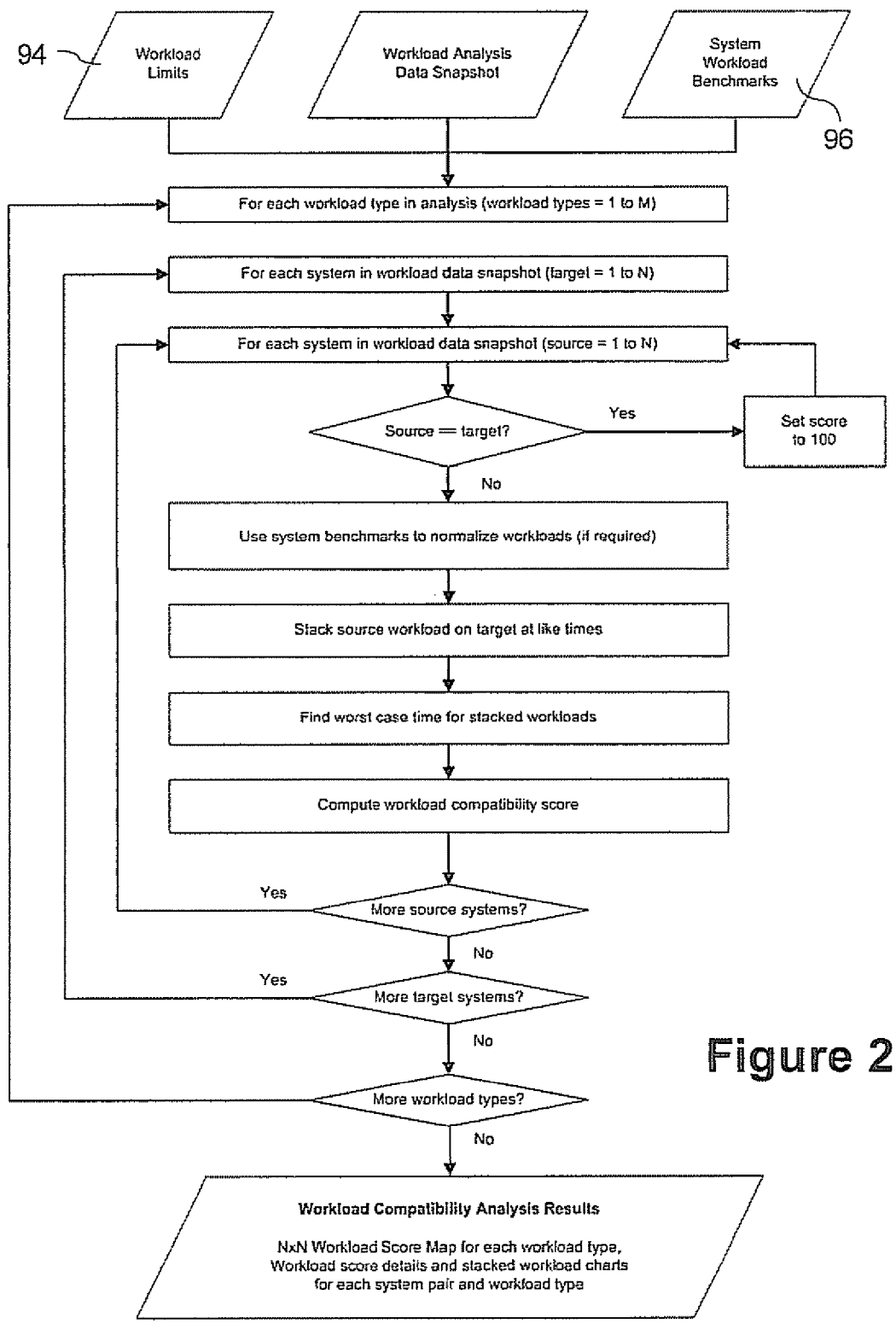
FIG. 21 is a flow diagram of the 1-to-1 workload compatibility analysis.

A flow chart illustrating a workload compatibility analysis is shown in FIG. 21. When analyzing 1-to-1 workload compatibility, the list of target and source systems 16 is the same. The compatibility is evaluated in two directions, e.g. for Server A and Server B, migrating A to B is considered as well as migrating B to A.

The workload analysis considers one or more workload types, e.g. CPU busy, the workload limits 94, e.g. 75% of the CPU being busy, and the system benchmarks 96, e.g. relative CPU power. Each system 16 in the workload data set is considered as a target (T=1 to N) and compared to each other system 16 in the data set 18 as the source (S=1 to N). The analysis engine 64 first determines if the source and target are the same. If yes, then the workload compatibility score is set to 100 and no additional analysis is required for that pair. If the source and target are different, the system benchmarks are then used to normalize the workloads (if required). The normalized source workload histogram is then stacked on the normalized target system.

System benchmarks can normalize workloads as follows. For systems X and Y, with CPU benchmarks of 200 and 400 respectively (i.e. Y is 2× more powerful than X), if systems X and Y have average CPU utilization of 10% and 15% respectively, the workloads can be normalized through the benchmarks as follows. To normalize X's workload to Y, multiply X's workload by the benchmark ratio X/Y, i.e. 10%×200/400=5%. Stacking X onto Y would then yield a total workload of 5%+15%=20%. Conversely, stacking Y onto X would yield the following total workload: 10%+15%×400/200=40%.

Using the stacked workload data, the workload compatibility score is then computed for each workload type as described above.

Each source is evaluated against the target, and each target is evaluated to produce an N×N map 34 of scores, which can be sorted to group compatible systems (see FIG. 5). Preferably, a workload compatibility results is generated that includes the map 34 and workload compatibility scoring details and normalized stacked workload histograms that can be viewed by selecting the appropriate cell 92 (see FIG. 22). The workload compatibility results are then combined with the rule-based compatibility results to produce the overall compatibility scores, described below.

1-to-1 Overall Compatibility Score Calculation

The results of the rule and workload compatibility analyses are combined to compute an overall compatibility score for each server pair. These scores preferably range from 0 to 100, where higher scores indicate greater compatibility and 100 indicating complete or 100% compatibility.

As noted above, the analysis input can include importance factors. For each rule set 28 and workload type 30 included in the analysis, an importance factor 88 can be specified to adjust the relative contribution of the corresponding score to the overall score. The importance factor 88 is an integer, preferably ranging from 0 to 10. A value of 5 has a neutral effect on the contribution of the component score to the overall score. A value greater than 5 increase the importance whereas a value less than 5 decreases the contribution.

The overall compatibility score for the system pair is computed by combining the individual compatibility scores using a formula specified by an overlay algorithm which performs a mathematical operation such as multiply or average, and the score is recorded.

Given the individual rule and workload compatibility scores, the overall compatibility score can be calculated by using the importance factors as follows for a "multiply" overlay:

$$O = 100 * \frac{100 - (100 - S_1) * F_1/5}{100} *$$
$$\frac{100 - (100 - S_2) * F_2/5}{100} * \ldots \frac{100 - (100 - S_n) * F_n/5}{100}$$

where O is the overall compatibility score, n is the total number of rule sets 28 and workload types 30 included in the analysis, $S_i$ is the compatibility score of the $i^{th}$ rule set 28 or workload type 30 and $F_i$ is the importance factor of the $i^{th}$ rule set 28 or workload type 30.

It can be appreciated that setting the importance factor 88 to zero eliminates the contribution of the corresponding score to the overall score. Also, setting the importance factor to a value less than 5 reduces the score penalty by 20% to %100 of its original value.

For example, a compatibility score of 90 implies a score penalty of 10 (i.e. 100−90=10). Given an importance factor of 1, the adjusted score is 98 (i.e. 100−10*1/5=100−2=98). On the other hand, setting the importance factor to a value greater than 5 increases the score penalty by 20% to 100% of its original value. Using the above example, given a score of 90 and an importance factor of 10, the adjusted score would be 80 (i.e. 100−10*10/5=100−20=80). The range of importance factors 88 and their impact on the penalty scores are summarized below in Table 13.

TABLE 13

| Importance Factors | | | | | |
|---|---|---|---|---|---|
| Importance Factor | Affect on Score Penalty | Original Score | Original Score Penalty | Adjusted Penalty Score | Adjusted Score |
| 0 | −100% | 90 | 10 | 0 | 100 |
| 1 | −80% | 90 | 10 | 2 | 98 |

TABLE 13-continued

| Importance Factors | | | | | |
|---|---|---|---|---|---|
| Importance Factor | Affect on Score Penalty | Original Score | Original Score Penalty | Adjusted Penalty Score | Adjusted Score |
| 2 | −60% | 90 | 10 | 4 | 96 |
| 3 | −40% | 90 | 10 | 6 | 94 |
| 4 | −20% | 90 | 10 | 8 | 92 |
| 5 | 0 | 90 | 10 | 10 | 90 |
| 6 | +20% | 90 | 10 | 12 | 88 |
| 7 | +40% | 90 | 10 | 14 | 86 |
| 8 | +60% | 90 | 10 | 16 | 84 |
| 9 | +80% | 90 | 10 | 18 | 82 |
| 10 | +100% | 90 | 10 | 20 | 80 |

Figure 23:
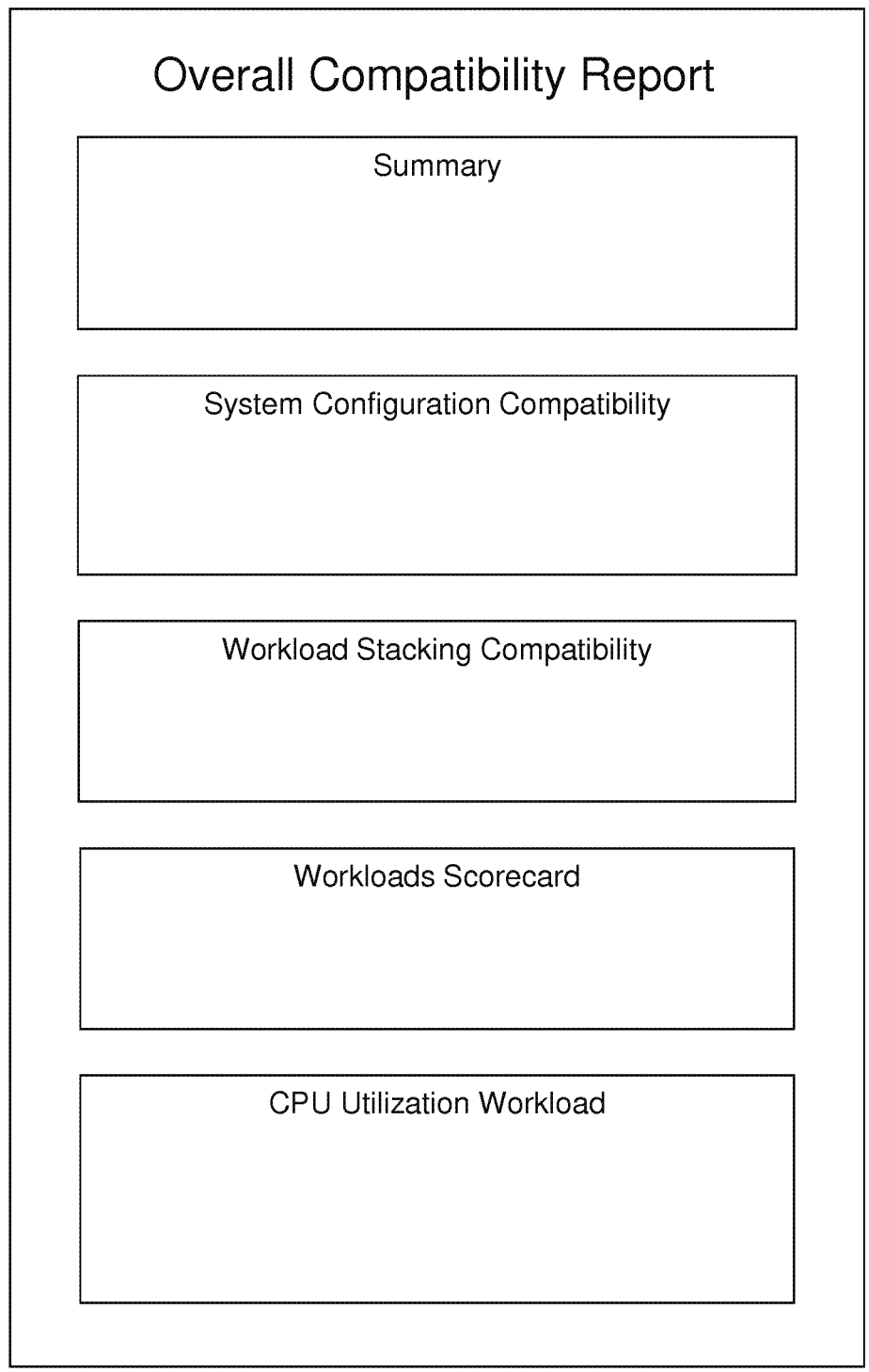
FIG. 23 is an example of the overall compatibility analysis result details.

If more systems 16 are to be examined, the above process is repeated. When overall compatibility analysis scores for all server pairs have been computed, the map 36 is displayed graphically (see FIG. 6) and each cell 92 is linked to a scorecard 98 that provides further information (FIG. 23). The further information can be viewed by selecting the cell 92. A sorting algorithm is then preferably executed to configure the map 36 as shown in FIG. 6.

Visualization and Mapping of Compatibility Scores

As mentioned above, the 1-to-1 compatibility analyses of N system computes N×N compatibility scores by individually considering each system 16 as a consolidation source and as a target. Preferably, the scores range from 0 to 100 with higher scores indicating greater system compatibility. The analysis will thus also consider the trivial cases where systems 16 are consolidated with themselves and would be given a maximum score, e.g. 100. For display and reporting purposes, the scores are preferably arranged in an N×N map form.

Rule-Based Compatibility Analysis Visualization

An example of a rule-based compatibility analysis map 32 is shown in FIG. 4. The compatibility analysis map 32 provides an organized graphical mapping of system compatibility for each source/target system pair on the basis of configuration data. The map 32 shown in FIG. 4 is structured having each system 16 in the environment 12 listed both down the leftmost column and along the uppermost row. Each row represents a consolidation source system, and each column represents the possible consolidation target. Each cell 92 contains the score corresponding to the case where the row system is consolidated onto the column (target) system 16.

The preferred output shown in FIG. 4 arranges the systems 16 in the map 32 such that a 100% compatibility exists along the diagonal where each server is naturally 100% compatible with itself. The map 32 is preferably displayed such that each cell 92 includes a numerical score and a shade of a certain colour. As noted above, the higher the score (from zero (0) to one hundred (100)), the higher the compatibility. The scores are pre-classified into predefined ranges that indicate the level of compatibility between two systems 16. Each range maps to a corresponding colour or shade for display in the map 32. For example, the following ranges and colour codes can be used: score=100, 100% compatible, dark green; score=75-99, highly compatible, green; score=50-74, somewhat compatible, yellow; score=25-49, low compatibility, orange; and score=0-24, incompatible, red.

The above ranges are only one example. Preferably, the ranges can be adjusted to reflect more conservative and less conservative views on the compatibility results. The ranges can be adjusted using a graphical tool similar to a contrast slider used in graphics programs. Adjustment of the slider would correspondingly adjust the ranges and in turn the colours. This allows the results to be tailored to a specific situation.

It is therefore seen that the graphical output of the map 32 provides an intuitive mapping between the source/target pairs in the environment 12 to assist in visualizing where compatibilities exist and do not exist. In FIG. 4, it can be seen that a system pair having a score=100 indicates complete compatibility between the two systems 16 for the particular strategy being observed, e.g. based on a chosen rule set(s) 28. It can also be seen that a system pair with a relatively lower score such as 26 is relatively less compatible for the strategy being observed.

Figure 19:
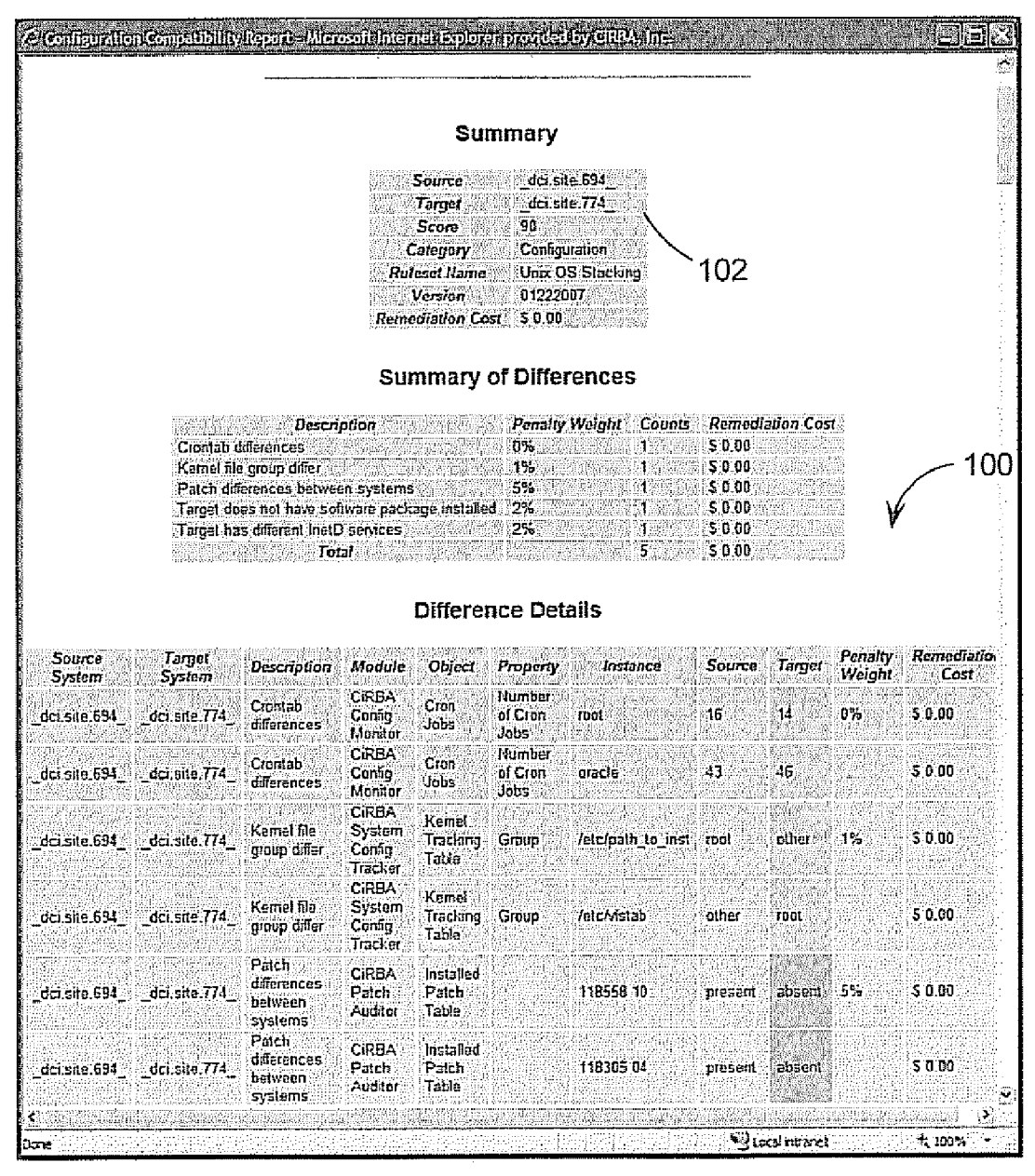

The detailed differences shown in FIG. 19 can be viewed by clicking on the relevant cell 92. Selecting a particular cell 92 accesses the detailed differences table 100 shown in FIG. 19 which shows the important differences between the two systems, the rules and weights that were applied and preferably a remediation cost for making the servers more compatible. As shown in FIG. 19, a summary differences table 102 may also be presented when selecting a particular cell 92, which lists the description of the differences and the weight applied for each difference, to give a high level overview of where the differences arise.

System Workload Compatibility Visualization

An example workload compatibility analysis map 34 is shown in FIG. 5. The map 34 is the analog of the map 32 for workload analyses. The map 34 includes a similar graphical display that indicates a score and a colour or shading for each cell to provide an intuitive mapping between candidate source/target server pairs. The workload data is obtained using tools such as the table 76 shown in FIG. 8 and corresponds to a particular workload factor, e.g. CPU utilization, network I/O, disk I/O, etc. A high workload score indicates that the candidate server pair being considered has a high compatibility for accommodating the workload on the target system. The specific algorithms used in determining the score are discussed in greater detail below. The servers are listed in the upper row and leftmost column and each cell 92 represents the compatibility of its corresponding server pair in the map. It can be appreciated that a relatively high score in a particular cell 92 indicates a high workload compatibility for consolidating to the target server, and likewise, relatively lower scores, e.g. 42 indicate lower workload compatibility for a particular system pair.

Figure 22:
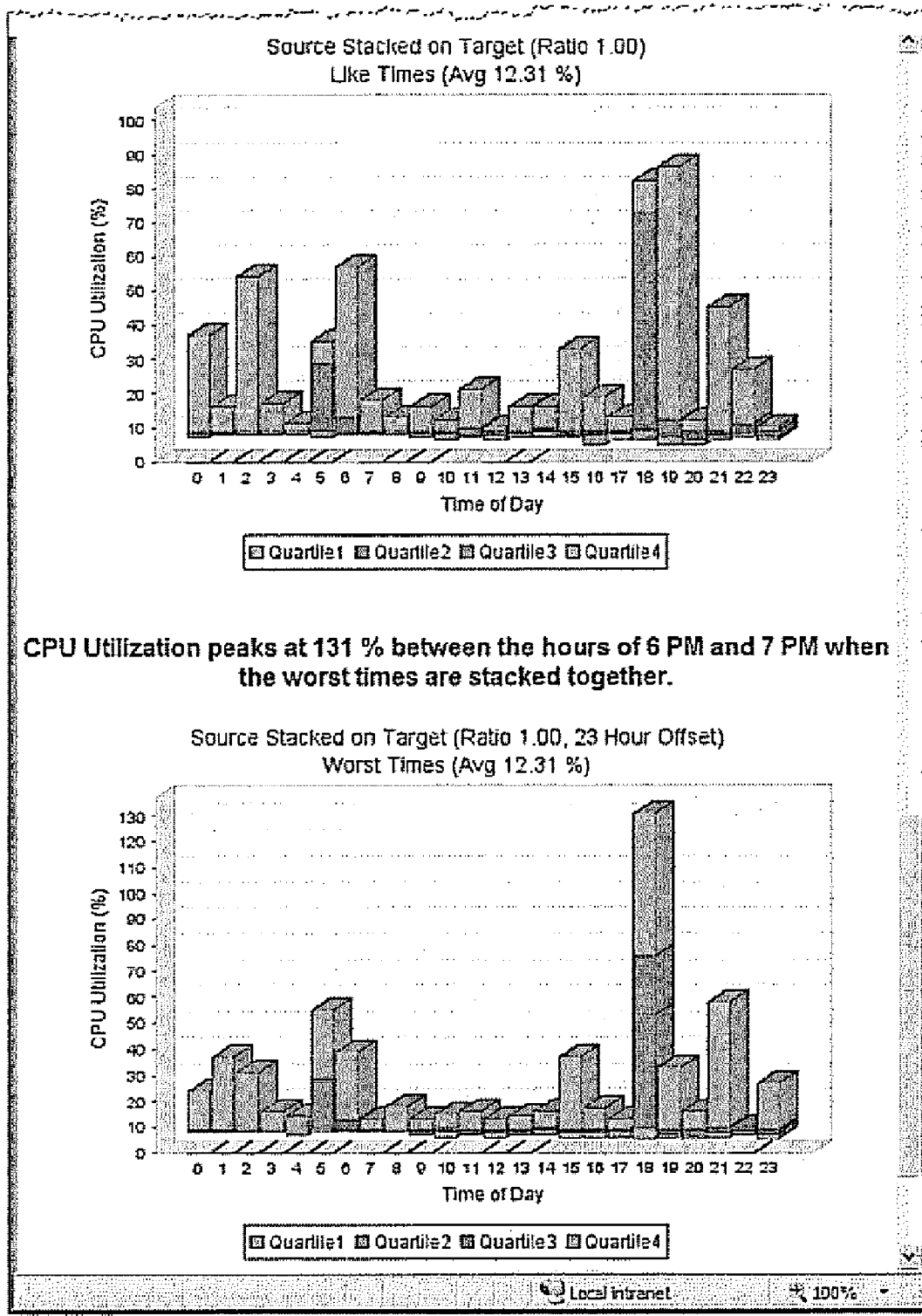
FIG. 22 is an example of the workload compatibility analysis result details.

The workload analysis details shown in FIG. 22 can be viewed by clicking on the relevant cell 92. Selecting a particular cell 92 accesses the information about the workload analysis that generated the score shown in FIG. 22, which shows the key stacked workload values, the workload benchmarks that were applied and preferably workload charts for each system separately, and stacked together.

Overall Compatibility Visualization

An example overall compatibility analysis map 36 is shown in FIG. 6. The map 36 comprises a similar arrangement as the maps 32 and 34, which lists the servers in the uppermost row and leftmost column to provide 100% compatibility along the diagonal. Preferably the same scoring and shading convention is used by all types of compatibility maps. The map 36 provides a visual display of scoring for candidate system pairs that considers the rule-based compatibility maps 32 and the workload compatibility maps 34.

The score provided in each cell 92 indicates the overall compatibility for consolidating systems 16. It should be noted that in some cases two systems 16 can have a high configuration compatibility but a low workload compatibility and thus end up with a reduced or relatively low overall score. It is therefore seen that the map 36 provides a comprehensive score that considers not only the compatibility of systems 28 at the setting level but also in its utilization. By displaying the configuration maps 32, business maps, workload maps 34 and overall map 36 in a consolidation roadmap, a complete picture of the entire system can be ascertained in an organized manner. The maps 32, 34 and 36 provide a visual representation of the compatibilities and provide an intuitive way to evaluate the likelihood that systems can be consolidated, to analyse compliance and drive remediation measures to modify systems 16 so that they can become more compatible with other systems 16 in the environment 12. It can therefore be seen that a significant amount of quantitative data can be analysed in a convenient manner using the graphical maps 32, 34 and 36, and associated reports and graphs (described below).

For example, a system pair that is not compatible only for the reason that certain critical software upgrades have not been implemented, the information can be uncovered by the map 32, and then investigated, so that upgrades can be implemented, referred to herein as remediation. Remediation can be determined by modeling cost of implementing upgrades, fixes etc that are needed in the rule sets. If remediation is then implemented, a subsequent analysis may then show the same server pair to be highly compatible and thus suitable candidates for consolidation.

The overall analysis details 98 shown in FIG. 23 can be viewed by clicking on the relevant cell 92. Selecting a particular cell 92 accesses the information about the rule-based and workload analyses that generated the score shown in FIG. 23, which shows the key differences and stacked workload values and charts.

Sorting Examples

The maps 32, 34 and 36 can be sorted in various ways to convey different information. For example, sorting algorithms such as a simple row sort, a simple column sort and a sorting by group can be used.

A simple row sort involves computing the total scores for each source system (by row), and subsequently sorting the rows by ascending total scores. In this arrangement, the highest total scores are indicative of source systems that are the best candidates to consolidate onto other systems.

A simple column sort involves computing the total scores for each target system (by column) and subsequently sorting the columns by ascending total score. In this arrangement, the highest total scores are indicative of the best consolidation target systems.

Sorting by group involves computing the difference between each system pair, and arranging the systems to minimize the total difference between each pair of adjacent systems in the map. The difference between a system pair can be computed by taking the square root of the sum of the squares of the difference of a pair's individual compatibility score against each other system in the analysis. In general, the smaller the total difference between two systems, the more similar the two systems with respect to their compatibility with the other systems. The group sort promotes the visualization of the logical breakdown of an environment by producing clusters of compatible systems 18 around the map diagonal. These clusters are indicative of compatible regions in the environment 12. In virtualization analysis, these are often referred to as "affinity regions."

Analysis Results-User Interaction

It can also be seen that users can customize and interact with the analysis program 10 during the analysis procedure to sort map scores, modify colour coding (as discussed above), show/specify source/targets, adjust weights and limits etc., and to show workload charts. This interaction enables the user to modify certain parameters in the analysis to take into account differences in objectives and different environments to provide a more accurate analysis.

Multi-Dimensional Compatibility Analysis

Figure 24A:
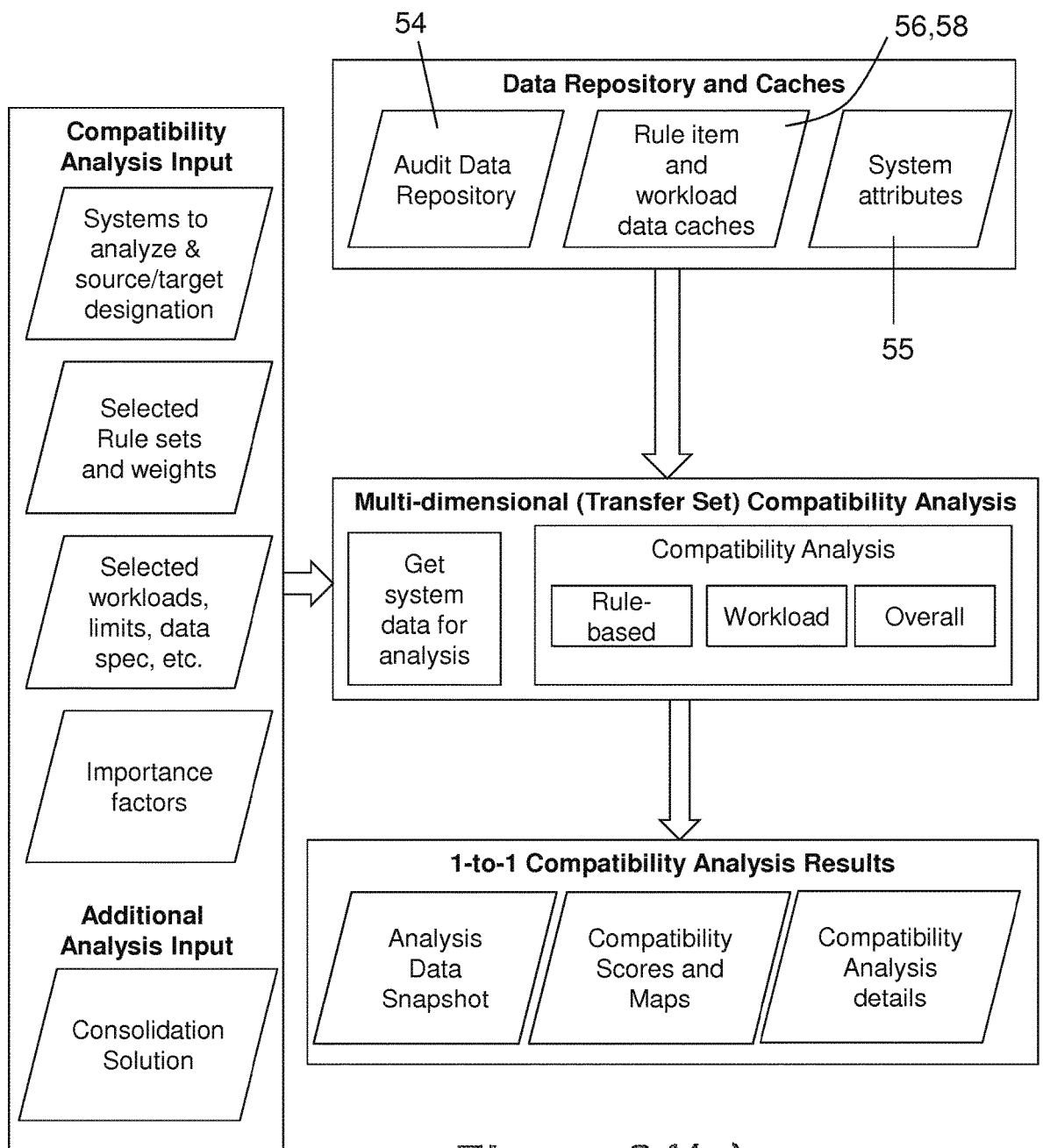
FIG. 24(a) is a high level process flow diagram of the multi-dimensional compatibility analysis.

The high level process flow of the multi-dimensional compatibility analysis is illustrated in FIG. 24(a). In addition to the common compatibility analysis input, this analysis takes a consolidation solution as input. In contrast to the 1-to-1 compatibility analysis that evaluates the compatibility of each system pair, this multi-dimensional compatibility analysis evaluates the compatibility of each transfer set 23 specified in the consolidation solution.

The multi-dimensional compatibility analysis extends the original 1-to-1 compatibility analysis that assessed the transfer of a single source entity to a target. As with the 1-to-1 compatibility analysis, the multi-dimensional analysis produces an overall compatibility scorecard 98 based on technical, business and workload constraints. Technical and business compatibility are evaluated through one or more rule sets 28. Workload compatibility is assessed through one or more workload types 30.

This produces multi-dimensional compatibility analysis results, which includes multi-dimensional compatibility scores, maps and details based on the proposed transfer sets 23.

For each transfer set 23, a compatibility score is computed for each rule set 28 and workload type 30. An overall compatibility score the transfer set 23 is then derived from the individual scores. For example, consider an analysis comprised of 20 systems, 3 rule sets, 2 workload types and 5 transfer sets 23:

Systems: S1, S2, S3, . . . S20
Analyzed with rule sets: R1, R2, R3
Analyzed with workload types: W1, W2
Transfer sets:
  a T1 (S1, S2, S3 stacked onto S4)
  a T2 (S5, S6, S7, S8, S9 stacked onto S10)
  a T3 (S11, S12, S13 stacked onto S14)
  a T4 (S15 stacked onto S16)
  a T5 (S17 stacked onto S18)
Unaffected systems: S19, S20

For the above example, the multi-dimensional compatibility analysis would comprise 5 overall compatibility scores (one for each transfer set), 15 rule-based compatibility scores (5 transfer sets×3 rule sets), and 10 workload compatibility scores (5 transfer sets×2 workload types).

The systems 16 referenced in the transfer sets 23 of the consolidation solution correspond to the systems 16 specified in the analysis input. Typically, the consolidation solution is manually specified by the user, but may also be based on the consolidation analysis, as described later.

In addition to evaluating the compatibility of the specified transfer sets, the compatibility analysis can evaluate the incremental effect of adding other source systems (specified in the analysis input) to the specified transfer sets. From the above example consisting of systems S1 to S20, the compatibility of the source systems S5 to S20 can be individually assessed against the transfer set T1. Similarly, the compatibility of the source systems S1 to S4 and S11 to S20 can be assessed with respect to the transfer set T2.

Similar to the 1-to-1 compatibility analysis, this analysis involves 4 stages. The first stage is gets the system data 18 required for the analysis to produce the analysis data snapshot. The second stage performs a multi-dimensional compatibility analysis for each rule set 28 for each transfer set 23. Next, the workload compatibility analysis is performed for each workload type 30 for each transfer set 23. Finally, these analysis results are combined to determine overall compatibility of each transfer set.

The multi-dimensional rule-based compatibility analysis differs from the 1-to-1 compatibility analysis since a transfer set can include multiple sources (N) to be transferred to the target, the analysis may evaluate the compatibility of sources amongst each other (N-by-N) as well as each source against the target (N-to-1) as will be explained in greater detail below. The multi-dimensional workload and overall compatibility analysis algorithms are analogous to their 1-to-1 analysis counterparts.

Multi-Dimensional Rule-Based Compatibility Analysis

Figure 24B:
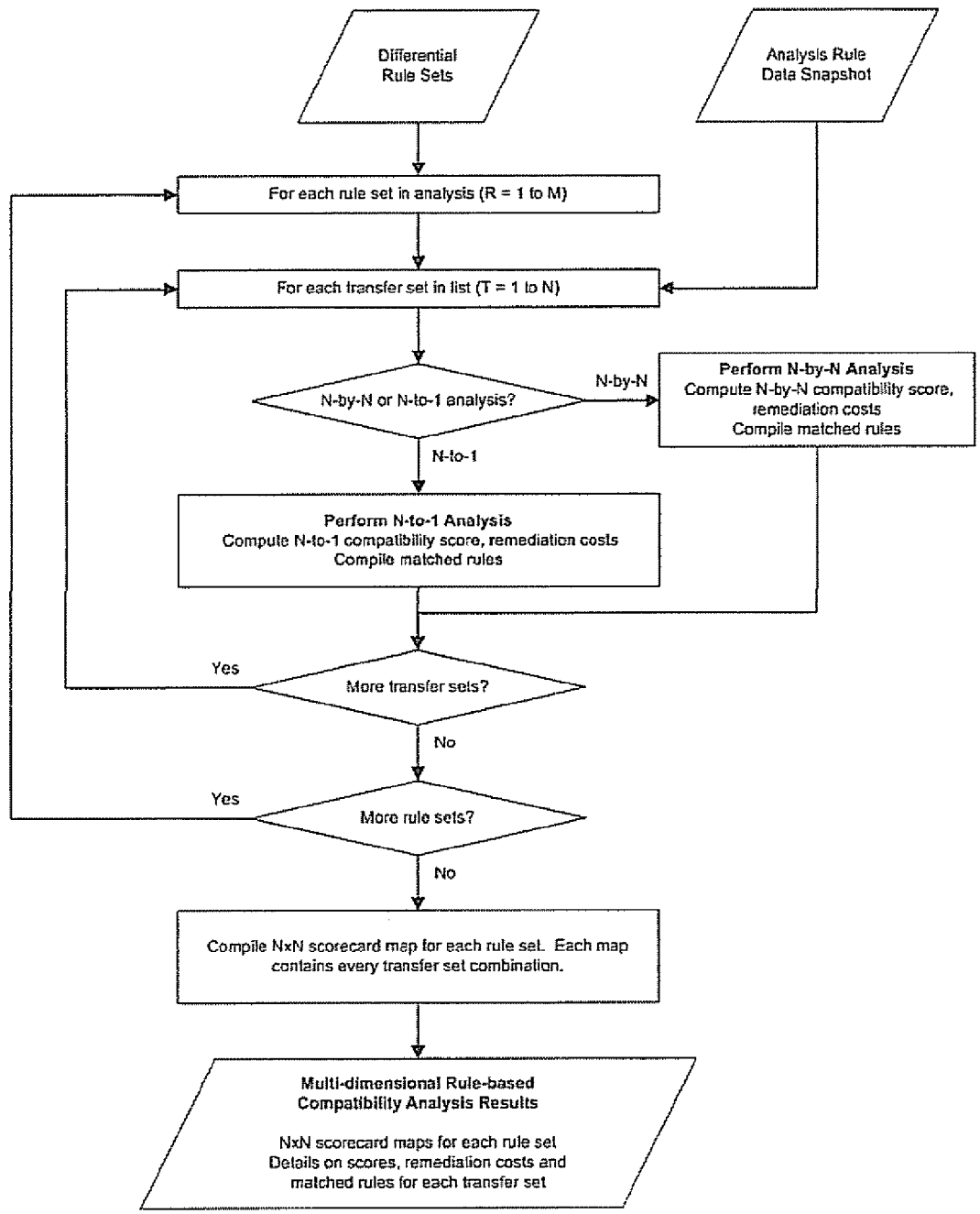
FIG. 24(b) is a flow diagram showing the multi-dimensional analysis.

To assess the compatibility of transferring multiple source entities (N) to a target (1), the rule-based analysis can compute a compatibility score based on a combination of N-to-1 and N-by-N compatibility analyses. An N-to-1 inter-compatibility analysis assesses each source system against the target. An N-by-N intracompatibility analysis evaluates each source system against each of the other source systems. This is illustrated in a process flow diagram in FIG. 24(b).

Criteria used to choose when to employ an N-to-1, N-by-N or both compatibility analyses depend upon the target type (concrete or malleable), consolidation strategy (stacking or virtualization), and nature of the rule item.

Concrete target models are assumed to rigid with respect to their configurations and attributes such that source entities to be consolidated are assumed to be required to conform to the target. To assess transferring source entities onto a concrete target, the N-to-1 inter-compatibility analysis is performed. Alternatively, malleable target models are generally adaptable in accommodating source entities to be consolidated. To assess transferring source entities onto a malleable target, the N-to-1 inter-compatibility analysis can be limited to the aspects that are not malleable.

When stacking multiple source entities onto a target, the source entities and targets coexist in the same operating system environment. Because of this inherent sharing, there is little flexibility in accommodating individual application requirements, and thus the target is deemed to be concrete. As such, the multi-dimensional analysis considers the N-to-1 inter-compatibility between the source entities and the target as the primary analysis mechanism, but, depending on the rule sets in use, may also consider the N-by-N intra-compatibility of the source entities amongst each other.

When virtualizing multiple source entities onto a target, the source entities are often transferred as separate virtual images that run on the target. This means that there is high isolation between operating system-level parameters, and causes virtualization rule sets to generally ignore such items. What is relevant, however, is the affinity between systems at the hardware, storage and network level, and it is critical to ensure that the systems being combined are consistent in this regard. In general, this causes the multi-dimensional analysis to focus on the N-to-N compatibility within the source entities, although certain concrete aspects of the target systems (such as processor architecture) may still be subjected to (N-to-1) analysis.

N-to-1 Intercompatibility Score Calculation

Figure 24C:
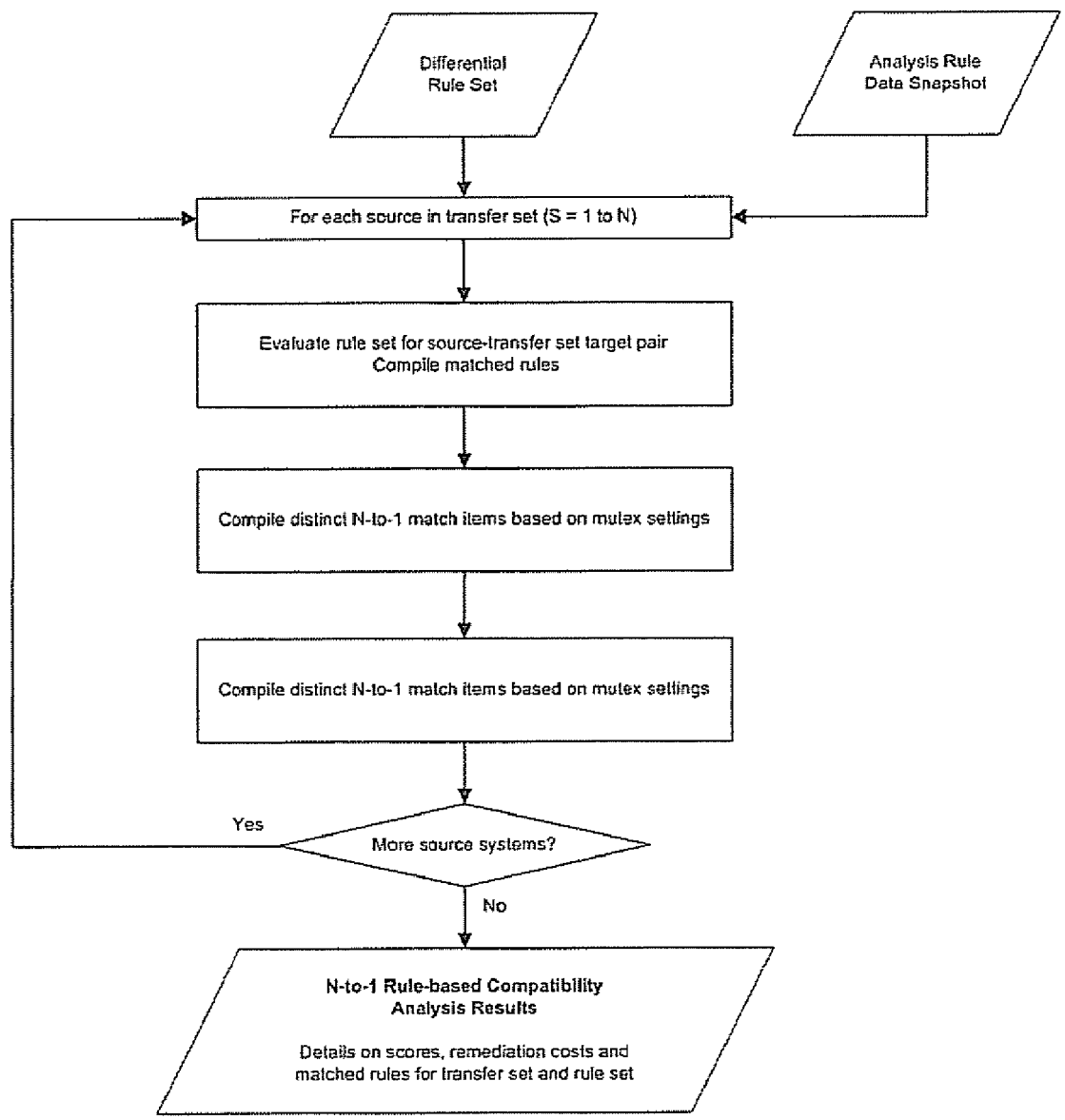
FIG. 24(c) is a flow diagram showing use of a rule set in an N-to-1 compatibility analysis.

N-to-1 intercompatibility scores reflect the compatibility between N source entities and a single target as defined by a transfer set 23 as shown in FIG. 24(c). This analysis is performed with respect to a given rule set and involves: 1) Separately evaluate each source entity against the target with the rule set to compile a list of the union of all matched rule items; 2) For each matched rule item, use the rule item's mutex (mutually exclusive) flag to determine whether to count duplicate matched rule items once or multiple times; and 3) Compute the score based on the product of all the penalty weights associated with the valid matched rule items:

$$S=100*(1-w_1)*(1-w_2)*(1-w_3)*(1-w_n);$$

where S is the score and $w_i$ is the penalty weight of the $i^{th}$ matched item.

N-to-1 Score Example

For example, assuming a transfer set t1 comprises of systems s1, s2 and s3 stacked onto s16, the union of matched rule items is based on evaluating s1 against s16, s2 against s16 and s3 against s16. Assuming this analysis produces a list of matched items comprising those shown below in Table 14:

TABLE 14

Matched Items—Multi-Dimensional N-to-1 example

| # | Source | Target | Rule Item | Source Value | Target Value | Mutex | Weight |
|---|--------|--------|-----------|--------------|--------------|-------|--------|
| 1 | S1 | S16 | Different Patch Levels | SP2 | SP3 | Y | 0.03 |
| 2 | S1 | S16 | Different Default Gateways | 10.0.0.1 | 192.168.0.1 | N | 0.02 |
| 3 | S2 | S16 | Different Patch Levels | SP2 | SP3 | Y | 0.03 |
| 4 | S3 | S16 | Different Patch Levels | SP4 | SP3 | Y | 0.03 |
| 5 | S3 | S16 | Different Default Gateways | 10.0.0.1 | 192.168.0.1 | N | 0.02 |
| 6 | S3 | S16 | Different Boot Settings | TRUE | FALSE | N | 0.01 |

Although the target and source values vary, items 1, 3 and 4 apply to the same rule item and are treated as duplicates due to the enabled mutex flag so that the penalty weight is applied only once. Items 2 and 5 apply to the same item and are exact duplicates (same values) so the penalty weight is applied only once, even though the mutex flag is not enabled for this item. As such, the compatibility score is computed as follows:

$$S=100*(1-0.03)*(1-0.02)*(1-0.01)=94$$

N-by-N Intracompatibility Score Calculation

Figure 24D:
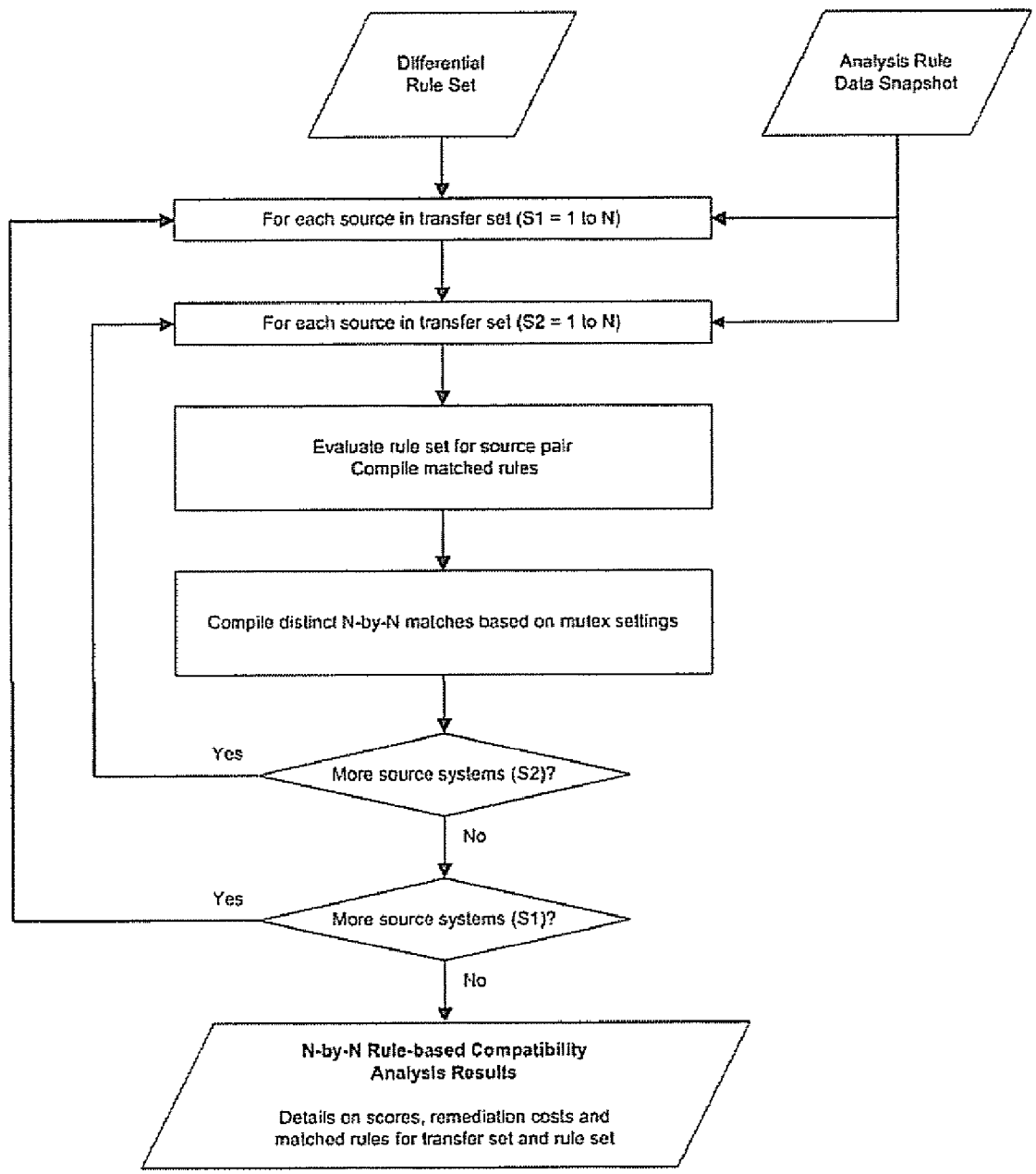
FIG. 24(d) is a flow diagram showing use of a rule set in an N-by-N compatibility analysis.

N-by-N intracompatibility scores reflect the compatibility amongst N source entities with respect to a given rule set as shown in FIG. 24(d). This analysis involves: 1) Separately evaluate each source entity against the other source entities with the rule set to compile a list of the union of all matched rule items; 2) For each matched rule item, use the rule item's mutex (mutually exclusive) flag to determine whether to count duplicate matched rule items once or multiple times; and 3) Compute the score based on the product of all the penalty weights associated with the valid matched rule items:

$$S=100*(1-w_1)*(1-w)*(1-w_3)*(1-w_n);$$

where S is the score and $w_i$ is the penalty weight of the $i^{th}$ matched item.

N-by-N Score Example

For example, assuming a transfer set t1 comprises of systems s1, s2 and s3 stacked onto s16, the union of matched rule items is based on evaluating s1 against s2, s2 against s1, s2 against s3, s3 against s2, 51 against s3 and s3 against s1. Assuming this analysis produces a list of matched items comprising those shown below in Table 15:

TABLE 15

Matched Items—Multi-Dimensional N-by-N example

| # | Source | Target | Rule Item | Source Value | Target Value | Mutex | Weight |
|---|--------|--------|-----------|--------------|--------------|-------|--------|
| 1 | S1 | S3 | Different Patch Levels | SP2 | SP4 | Y | 0.03 |
| 2 | S3 | S1 | Different Patch Levels | SP4 | SP2 | Y | 0.03 |
| 3 | S2 | S3 | Different Patch Level | SP2 | SP4 | Y | 0.03 |
| 4 | S3 | S2 | Different Patch Level | SP4 | SP2 | Y | 0.03 |
| 5 | S1 | S2 | Different Default Gateways | 10.0.0.1 | 192.168.0.1 | N | 0.02 |
| 6 | S2 | S1 | Different Default Gateways | 192.168.0.1 | 10.0.0.1 | N | 0.02 |
| 7 | S3 | S2 | Different Default Gateways | 10.0.0.1 | 192.168.0.1 | N | 0.02 |
| 8 | S2 | S3 | Different Default Gateways | 192.168.0.1 | 10.0.0.1 | N | 0.02 |
| 9 | S1 | S3 | Different Boot Settings | TRUE | FALSE | N | 0.01 |
| 10 | S3 | S1 | Different Boot Settings | FALSE | TRUE | N | 0.01 |
| 11 | S2 | S3 | Different Boot Settings | TRUE | FALSE | N | 0.01 |
| 12 | S3 | S2 | Different Boot Settings | FALSE | TRUE | N | 0.01 |

Items 1-4, 5-8 and 9-12, respectively are duplicates as they apply to the same rule items and have the same values. The compatibility score is computed as follows:

$$S=100*(1-0.03)*(1-0.02)*(1-0.01)=94.$$

Multi-dimensional Workload Compatibility Analysis

Figure 25:
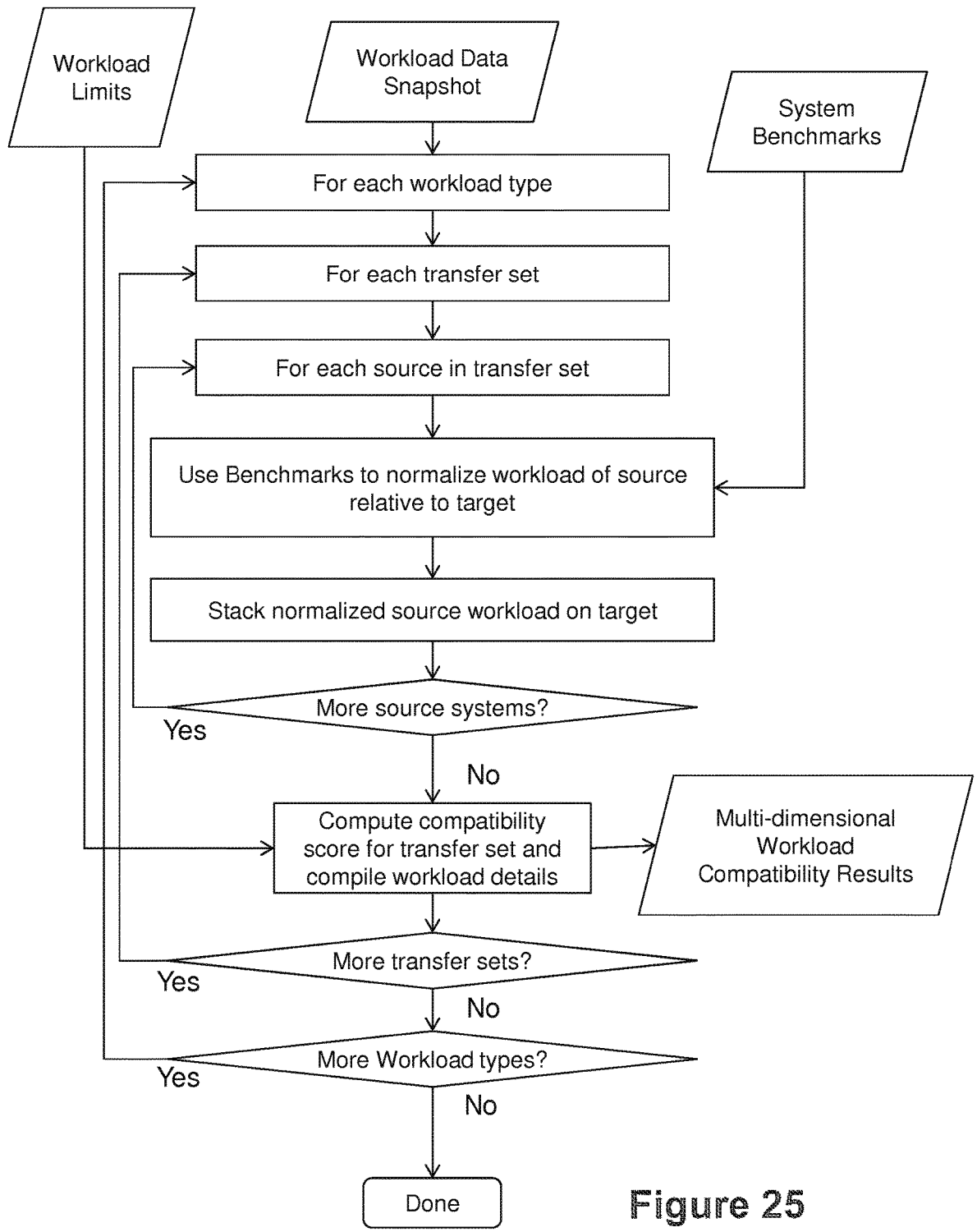
FIG. 25 is a process flow diagram of the multi-dimensional workload compatibility analysis.

A procedure for stacking the workload of multiple source systems on a target system is shown in FIG. 25. The multi-stacking procedure considers the workload limits that is specified using the program 150, the per-system workload benchmarks (e.g. CPU power), and the data snapshot containing the workload data for the source and target systems 16 that comprise the transfer sets 23 to analyze. The analysis may evaluate transfer sets 23 with any number of sources stacked on a target for more than one workload type 30.

For each workload type 30, each transfer set 23 is evaluated. For each source in the transfer set 23, the system benchmarks are used to normalize the workloads as discussed above, and the source workload is stacked on the target system. Once every source in the set is stacked on the target system, the workload compatibility score is computed as discussed above. The above is repeated for each transfer set 23. A multi-stack report may then be generated, which gives a workload compatibility scorecard for the transfer sets along with workload compatibility scoring details and normalized multi-stacked workload charts.

Figure 26:
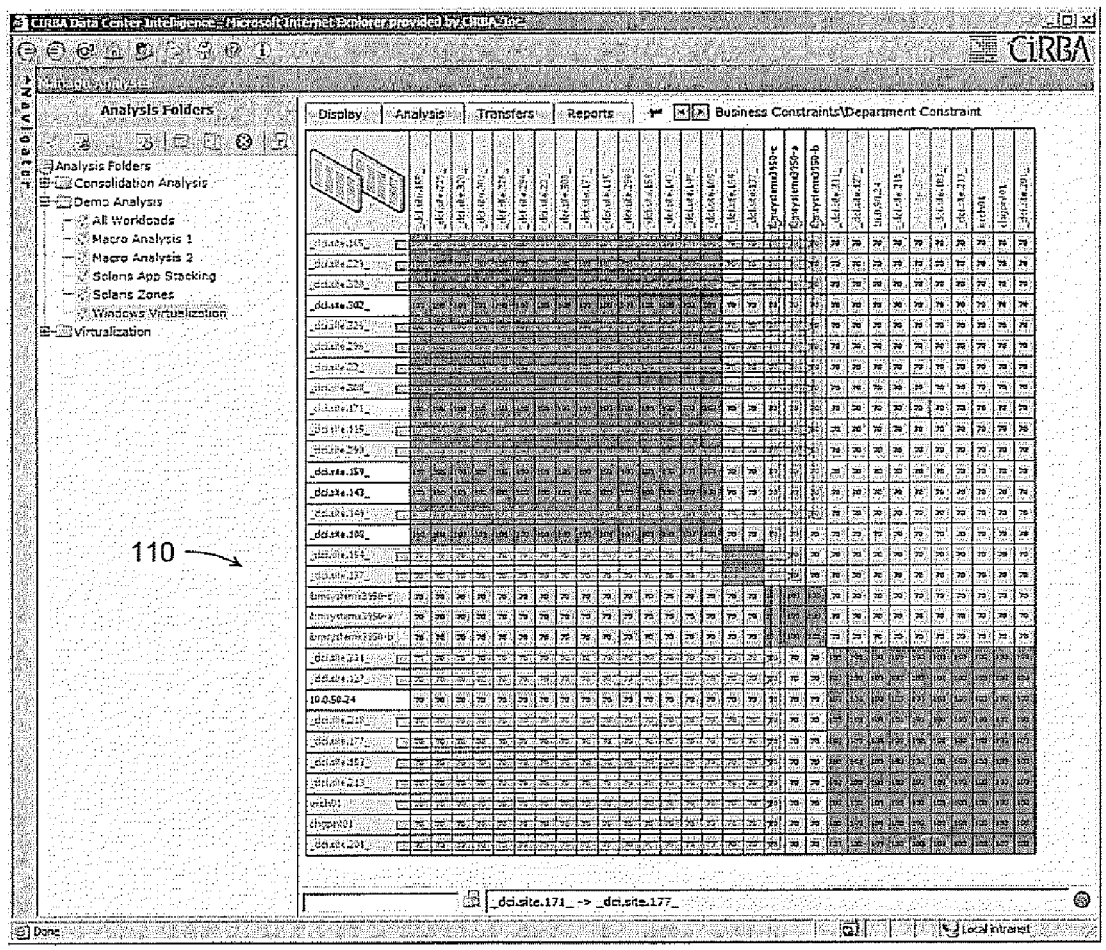
FIG. 26 is an example multi-dimensional compatibility analysis map.
Figure 28:
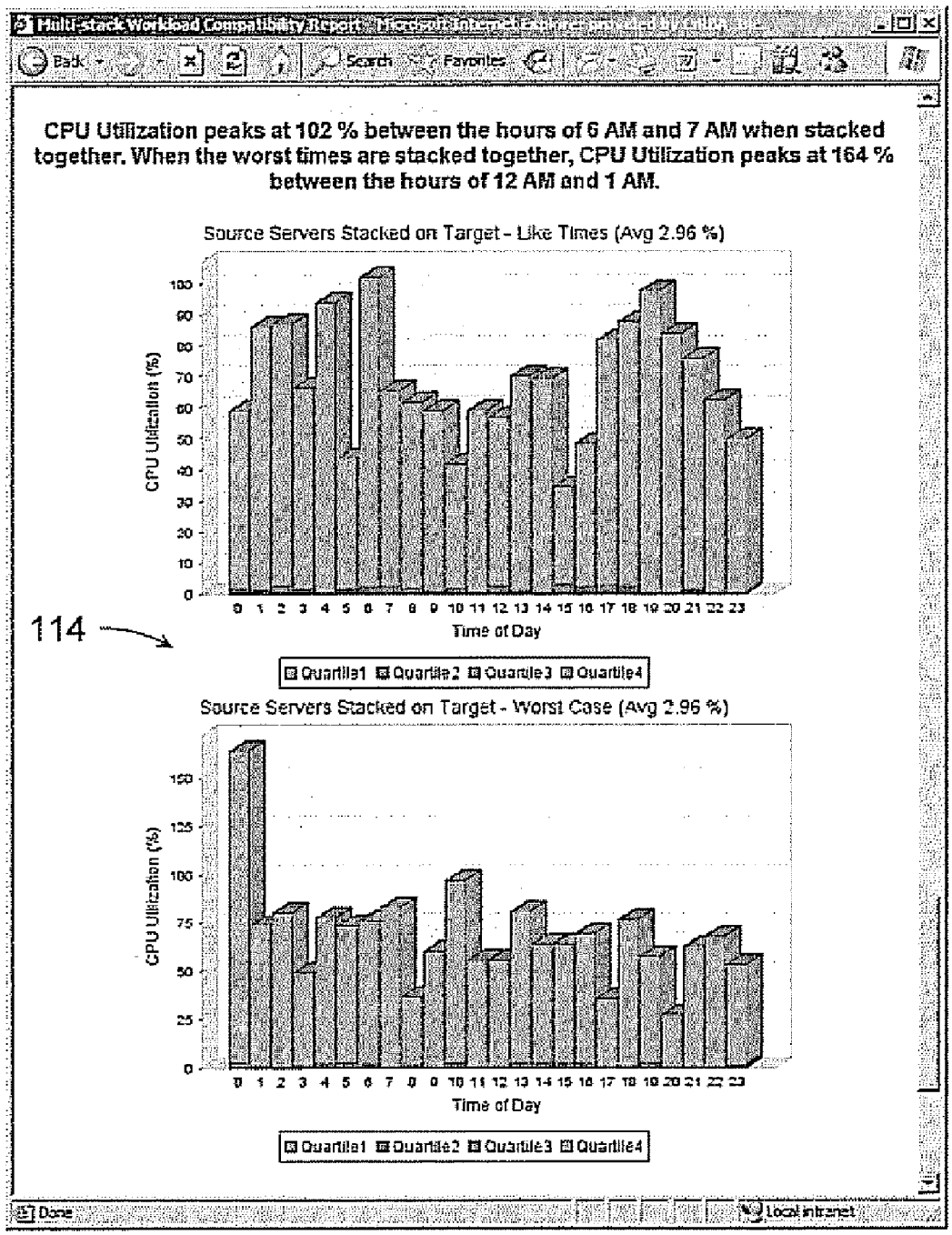
FIG. 28 is an example of the multi-dimensional workload compatibility analysis result details.

Sample multi-dimensional compatibility analysis results are shown in FIG. 26-28. FIG. 26 shows a compatibility score map 110 with the analyzed transfer sets. FIGS. 27 and 28 show the summary 112 and charts 114 from the multi-stack workload compatibility analysis details.

Consolidation Analysis

The consolidation analysis process flow is illustrated as D in FIG. 9. Using the common compatibility analysis input and additional auto fit inputs, this analysis seeks the consolidation solution that maximizes the number of transfers while still fulfilling the several pre-defined constraints. The consolidation analysis repeatedly employs the multi-dimensional compatibility analysis to assess potential transfer set candidates. The result of the consolidation analysis comprises of the consolidation solution and the corresponding multi-dimensional compatibility analysis.

Figure 29:
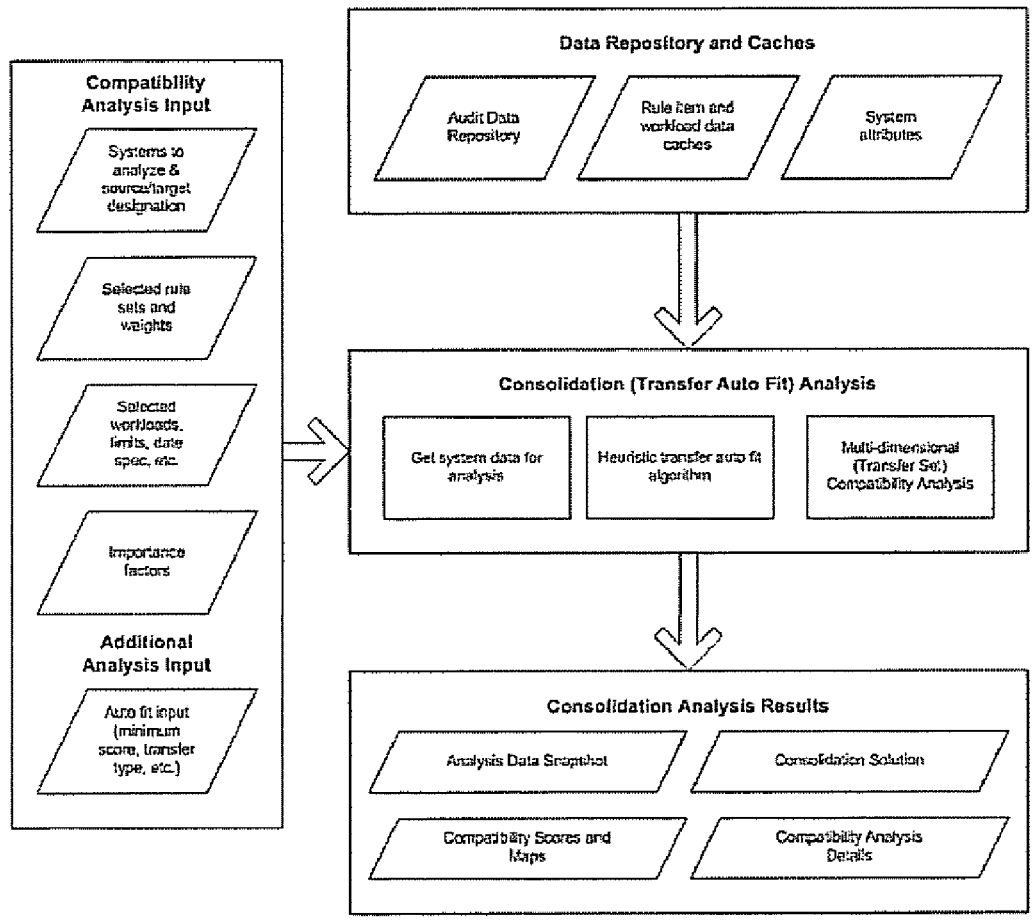
FIG. 29 is a process flow diagram of the consolidation analysis.

A process flow of the consolidation analysis is shown in FIG. 29.

The auto fit input includes the following parameters: transfer type (e.g. virtualize or stacking), minimum allowable overall compatibility score for proposed transfer sets, minimum number of source entities to transfer per target, maximum number of source entities to transfer per target, and quick vs. detailed search for the best fit. Target systems can also be designated as malleable or concrete models.

As part of a compatibility analysis input specification, systems can be designated for consideration as a source only, as a target only or as either a source or a target. These designations serve as constraints when defining transfers in the context of a compatibility analysis. The analysis can be performed on an analysis with pre-existing source-target transfers. Analyses containing systems designated as source or target-only (and no source or target designations) are referred to as "directed analysis."

The same transfer type may be assumed for all automatically determined transfers within an analysis. The selected transfer type affects how the compatibility analysis is performed. The minimum overall compatibility score dictates the lowest allowable score (sensitivity) for the transfer sets to be included in the consolidation solution. Lowering the minimum allowable score permits a greater degree of consolidation and potentially more transfers. The minimum and maximum limits for source entities to be transferred per target (cardinality) define additional constraints on the consolidation solution. The quick search performs a simplified form of the auto fit calculation, whereas the detailed search performs a more exhaustive search for the optimal solution. This distinction is provided for quick assessments of analyses containing a large numbers of systems to be analyzed.

The transfer auto fit problem can be considered as a significantly more complex form of the classic bin packing problem. The bin packing problem involves packing objects of different volumes into a finite number of bins of varying volumes in a way that minimizes the number of bins used. The transfer auto fit problem involves transferring source entities onto a finite number of targets in a way that maximizes the number of transfers. The basis by which source entities are assessed to "fit" onto targets is based on the highly nonlinear compatibility scores of the transfer sets. As a further consideration, which can increase complexity, some entities may be either source or targets. The auto fit problem is a combinatorial optimization problem that is computationally expensive to solve through a brute force search of all possible transfer set permutations. Although straightforward to implement, this exhaustive algorithm is impractical due to its excessive computational and resource requirements for medium to large data sets. Consequently, this class of problem is most efficiently solved through heuristic algorithms that yield good but likely suboptimal solutions.

There are four variants of the heuristic auto fit algorithm that searches for the best consolidation solution:

Quick Stack—quick search for a stacking-based consolidation solution;

Detailed Stack—more comprehensive search for a stacking-based consolidation solution;

Quick Virtualization—quick search for a virtualization-based consolidation solution; and Detailed Virtualization—more comprehensive search for a virtualization-based consolidation solution.

The auto fit algorithms are iterative and involve the following common phases:

Compile Valid Source and Target Candidates

The initial phase filters the source and target lists by eliminating invalid entity combinations based on the 1-to-1 compatibility scores that are less than the minimum allowable compatibility score. It also filters out entity combinations based on the source-only or target-only designations.

Set up Auto Fit Parameters

The auto fit algorithm search parameters are then set up. The parameters can vary for each algorithm. Example search parameters include the order by which sources and targets are processed and the criteria for choosing the best transfer set 23.

Compile Candidate Transfer Sets

The next phase compiles a collection of candidate transfer sets 23 from the available pool of sources and targets. The candidate transfer sets 23 fulfill the auto fit constraints (e.g. minimum allowable score, minimum transfers per transfer set, maximum transfers per transfer set). The collection of candidate transfer sets may not represent a consolidation solution (i.e. referenced sources and targets may not be mutually exclusive amongst transfer sets 23). The algorithms vary in the criteria employed in composing the transfer sets. In general, the detailed search algorithms generate more candidate transfer sets than quick searches in order to assess more transfer permutations.

Choose Best Candidate Transfer Set

The next phase compares the candidate transfer sets 23 and chooses the "best" transfer set 23 amongst the candidates. The criteria employed to select the best transfer set 23 varies amongst the algorithms. Possible criteria include the number of transfers, the compatibility score, general compatibility of entities referenced by set and whether the transfer set target is a target-only.

Add Transfer Set to Consolidation Solution

Once a transfer set is chosen, it is added to the intermediate consolidation solution. The entities referenced by the transfer set are removed from the list of available sources and targets and the three preceding phases are repeated until the available sources or targets are consumed.

Compile Consolidation Solution Candidates

Once all the sources or targets are consumed or ruled out, the consolidation solution is considered complete and added to a list of candidate solutions. Additional consolidation solutions can be compiled by iterating from the second phase with variations to the auto fit parameters for compiling and choosing candidate transfer sets.

Choose Best Consolidation Solution

The criteria used to stop compiling additional solutions can be based on detecting that the solution is converging on a pre-defined maximum number of iterations.

Figure 30:
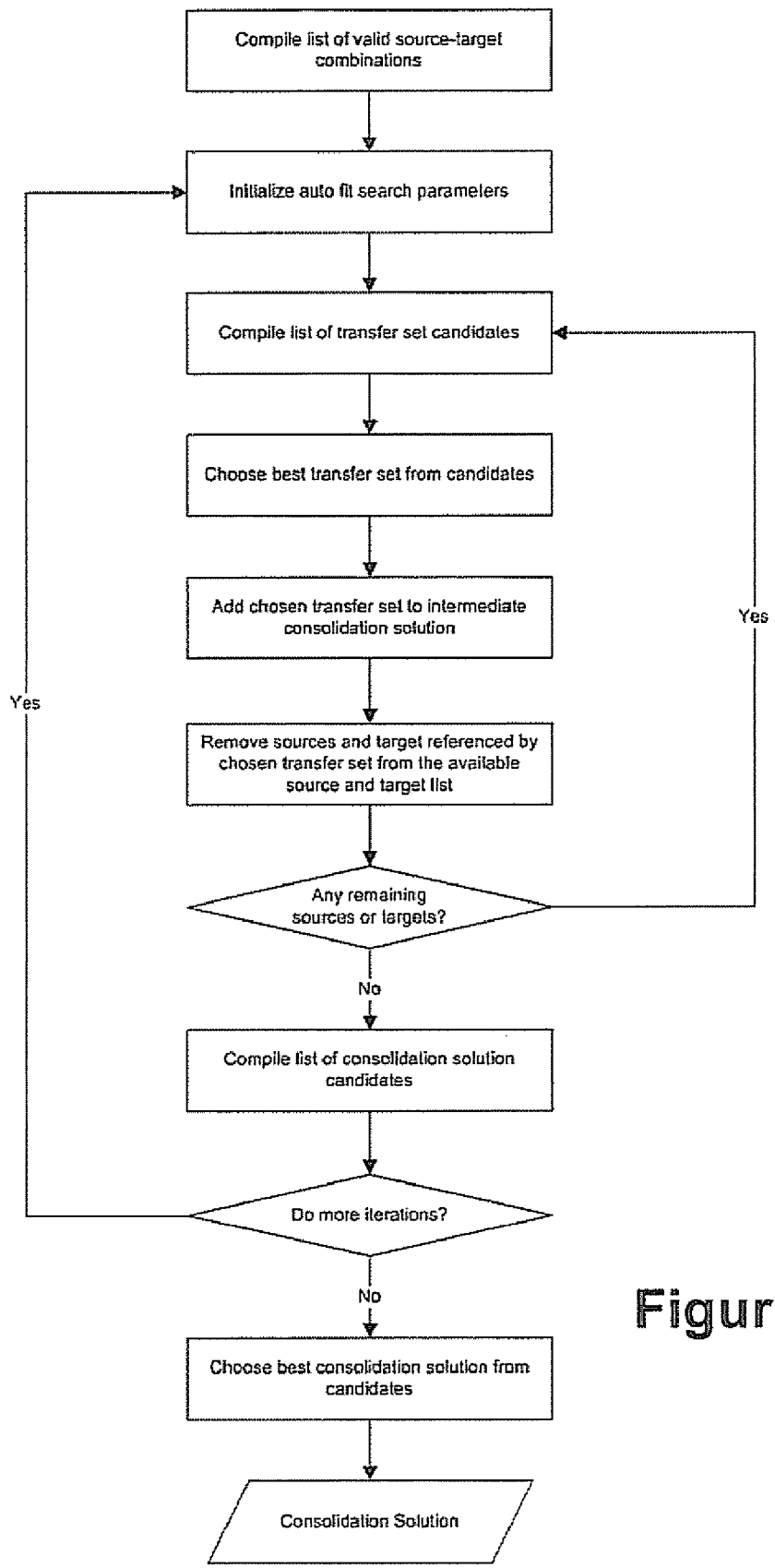
FIG. 30 is a process flow diagram of an auto fit algorithm used by the consolidation analysis.

Finally, the best candidate consolidation solution can be selected based on some criteria such as the largest reduction of systems with the highest average transfer set scores. The general algorithm is shown in the flow diagram depicted in FIG. 30.

Auto Fit Example

The following example demonstrates how a variant of the auto fit algorithm searches for a consolidation solution for a compatibility analysis comprised of 20 systems (S1, S2, S3, . . . S20) where 15 systems (S1-15) have been designated to be source-only and 5 (S16-20) to be target-only. For this example, the auto fit input parameters are: 1) Transfer type: stacking; 2) Minimum allowable compatibility score: 80; 3) Minimum sources per target: 1; 4) Maximum sources per target: 5; and 6) Search type: quick.

The auto fit would be performed as follows:

1—Compile Valid Source and Target Candidates

For each target (S16-S20), compile the list of possible sources. Since some of the 1-to-1 source-target compatibility scores are less than 80 (specified minimum allowed score), the following source-target candidates are found as shown in Table 16.

TABLE 16

Target-Source Candidates

| Target | Sources (1-to-1 scores) |
|---|---|
| S16 | S1 (100), S2 (95), S3 (90), S4 (88), S5 (88), S6 (85), S7 (82), S8 (81) |
| S17 | S1, S2, S3, S5, S6, S7, S8, S9, S10 |
| S18 | S1, S2, S3, S6, S7, S8, S9, S10, S11 |
| S19 | S9, S10, S11, S12, S13, S14, S15 |
| S20 | S9, S10, S11, S12, S13, S14, S15 |

2—Setup Auto Fit Parameters

The auto fit search parameters initialized for this iteration assume the following: 1) When compiling candidate transfer sets 23, sort source systems in descending order when stacking onto target; and 2) When choosing the best transfer set 23, choose set with most transfers and if there is a tie, choose the set 23 with the higher score.

3—Compile Candidate Transfer Sets

The candidate transfer sets 23 are then compiled from the source-target candidates. For each target, the candidate sources are sorted in descending order and are incrementally stacked onto the target. The transfer set score is computed as each source is stacked and if the score is above the minimum allowable score, the source is added to the transfer set 23. If the score is below the minimum allowable, the source is not included in the set. This process is repeated until all the sources have been attempted or the maximum number of sources per target has been reached.

For this quick search algorithm, only a single pass is performed for each target so that only one transfer set candidate is created per target. Other search algorithms can perform multiple passes per target to assess more transfer permutations. The candidate transfer sets 23 are shown below in Table 17.

TABLE 17

Candidate Transfer Sets

| Transfer Set | Target | Sources | # Sources | Score |
|---|---|---|---|---|
| T1 | S16 | S1, S2, S3, S4, S5 | 5 | 82 |
| T2 | S17 | S1, S2, S3, S5 | 4 | 81 |
| T3 | S18 | S1, S2, S3, S6, S7, S10 | 6 | 85 |
| T4 | S19 | S9, S10, S11, S12, S13, S14 | 6 | 83 |
| T5 | S20 | S9, S10, S11, S12, S13, S14 | 6 | 84 |

4—Choose Best Candidate Transfer Set

The transfer set T3 is chosen as the best transfer set from the candidates. For this example, the criteria are the greatest number of sources and if tied, the highest score.

5—Add Transfer Set to Consolidation Solution

The transfer set T3 is added to the consolidation solution, and the entities referenced by this transfer set are removed from the target-source candidates list. The updated target-source candidates are shown below in Table 18.

TABLE 18

Updated Target-Source Candidates

| Target | Sources (1-to-1 scores) |
|---|---|
| S16 | S4, S5, S8 |
| S17 | S5, S8, S9 |
| S19 | S9, S11, S12, S13, S14, S15 |
| S20 | S9, S11, S12, S13, S14, S15 |

Since there are available target-source candidates, another iteration to compile candidate transfer sets and choose the best set is performed. These iterations are repeated until there are no more target-source candidates, at which time a consolidation solution is considered complete. The consolidation solution candidates are shown below in Table 19.

TABLE 19

Consolidation Solution Candidates

| Target | Sources | # Sources | Score |
|---|---|---|---|
| S16 | S4, S5, S8 | 3 | 86 |
| S18 | S1, S2, S3, S6, S7, S10 | 6 | 85 |
| S19 | S9, S11, S12, S15 | 6 | 83 |
| S20 | S13, S14 | 2 | 87 |

6—Compile Consolidation Solution Candidates

The consolidation solution is then saved, and if warranted by the selected algorithm, another auto fit can be performed with a different search parameters (e.g. sort source systems in ascending order before stacking onto target) to generate another consolidation solution.

7—Choose Best Consolidation Solution

The consolidation solution candidates are compared and the best one is chosen based on some pre-defined criteria. A sample consolidation solution summary 116 is shown in FIG. 31.

Example Compatibility Analysis

Compatibility and consolidation analyses are described by way of example only below to illustrate an end-to-end data flow in conducting complete analyses for an arbitrary environment 12. These analyses are performed through the web client user interface 74. These examples assume that the requisite system data 18 for the analyses have already been collected and loaded into the data repository 54 and caches 56 and 58.

1-to-1 Compatibility Analysis Example

This type of analysis typically involves of the following steps: 1) Create a new analysis in the desired analysis folder; 2) Specify the mandatory analysis input; 3) Optionally, adjust analysis input parameters whose default values are not desired; 4) Run the analysis; and 5) View the analysis results.

Figure 32:
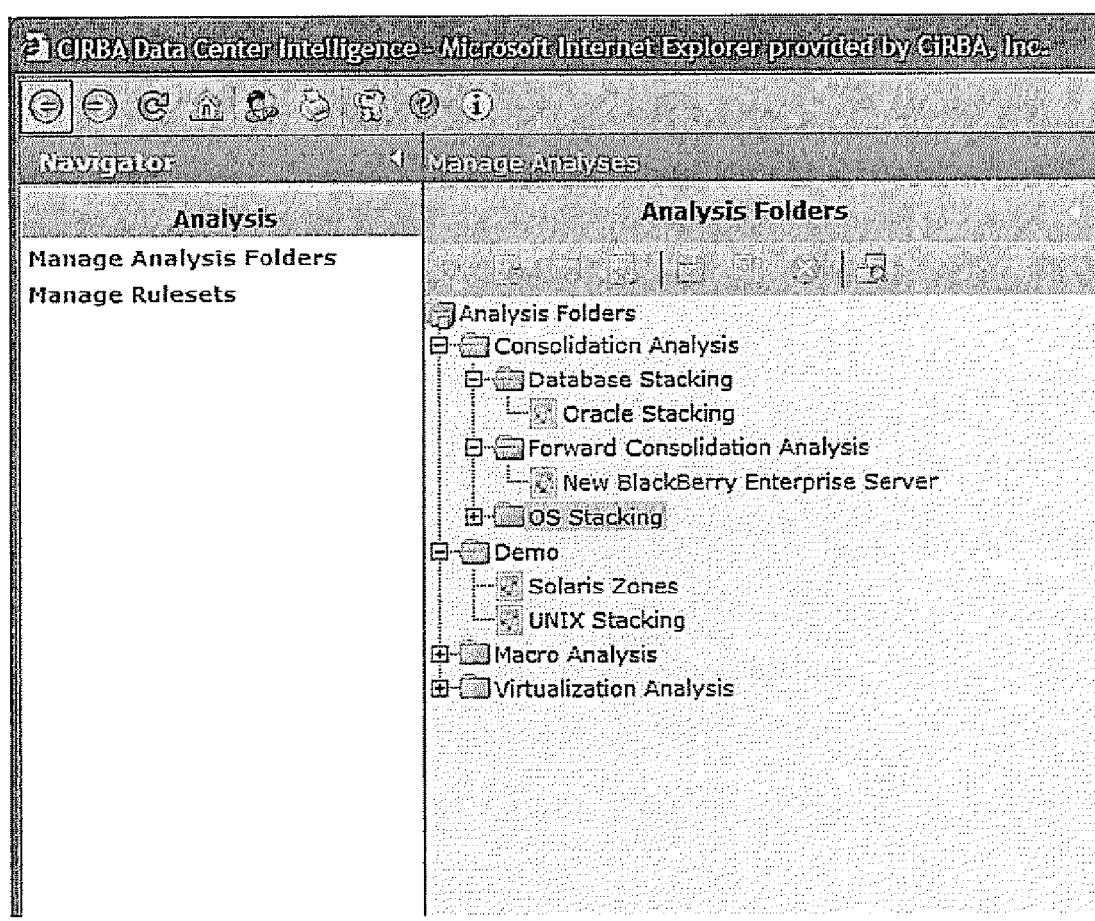
FIG. 32 shows an example hierarchy of analysis folders and analyses.

The analysis can be created in an analysis folder on a computer 14, to help organize the analyses. FIG. 32 shows an example analysis folder hierarchy containing existing analyses.

Figure 33:
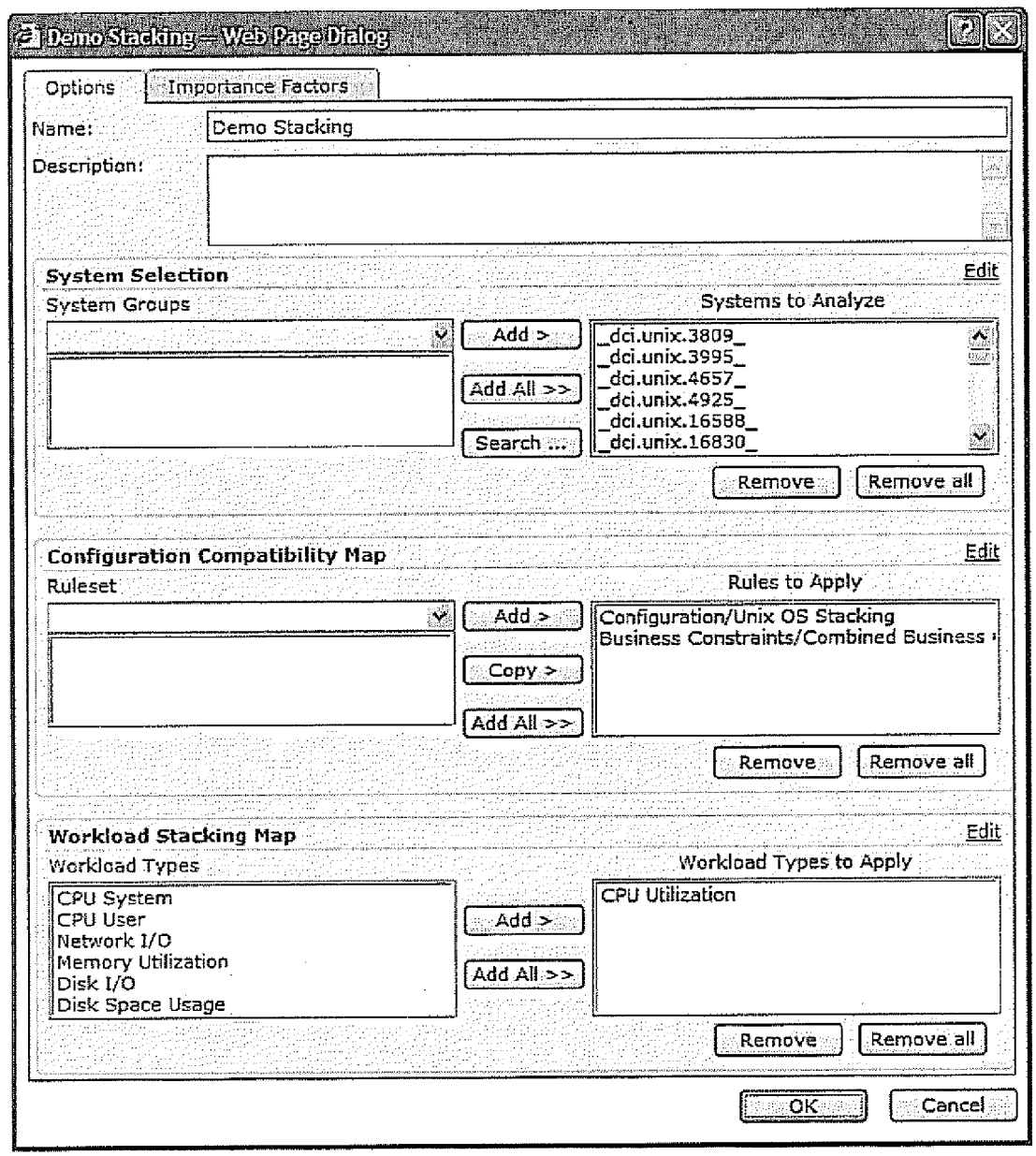
FIG. 33 shows the screen for creating and editing the analysis input parameters.

An analysis is created through a web page dialog as shown in the screen shot in FIG. 33. The analysis name is preferably provided along with an optional description.

Other analysis inputs comprise a list of systems 16 to analyze and one or more rule sets 28 and/or workload types 30 to apply to evaluate the 1-to-1 compatibility of the systems 16.

Figure 36:
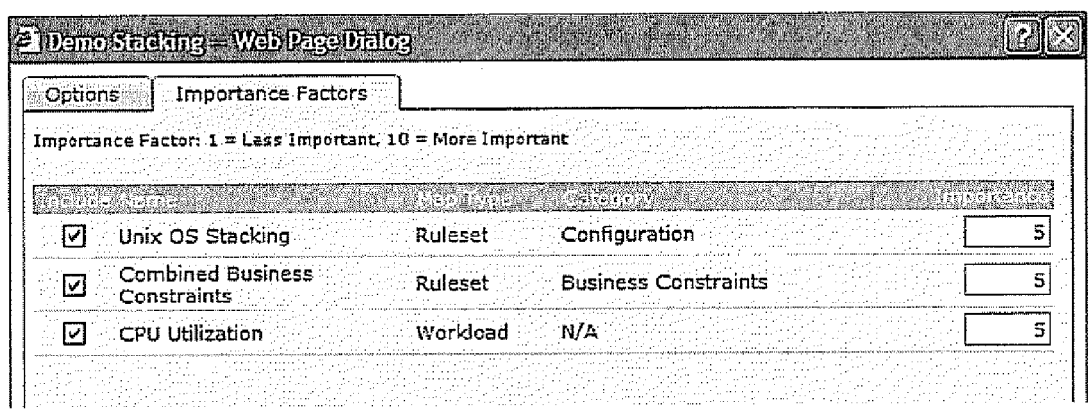
FIG. 36 shows an example screen to edit the importance factors used to compute the overall compatibility score.
Figure 37:
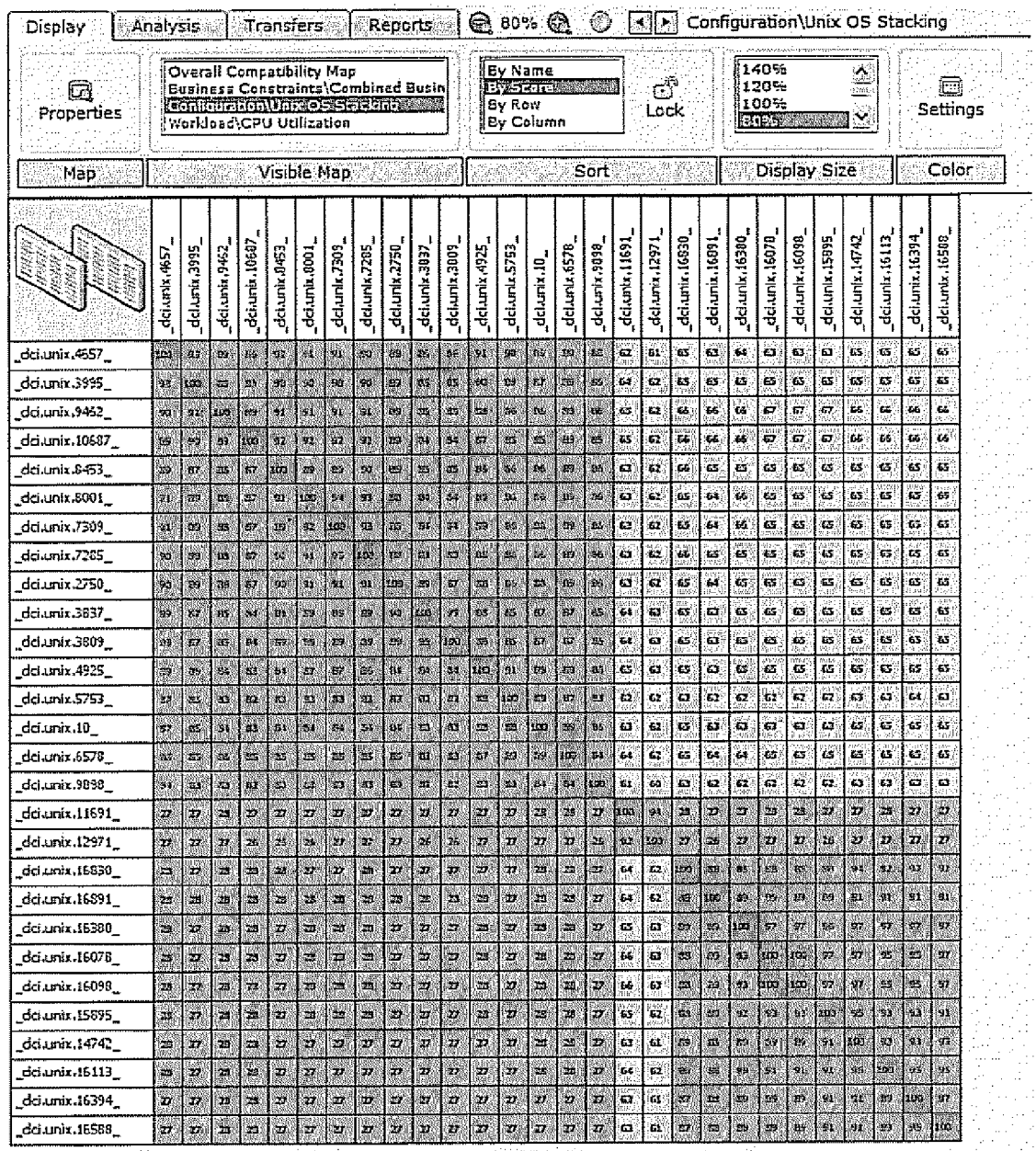
FIG. 37 is an example 1-to-1 compatibility map.
Figure 39:
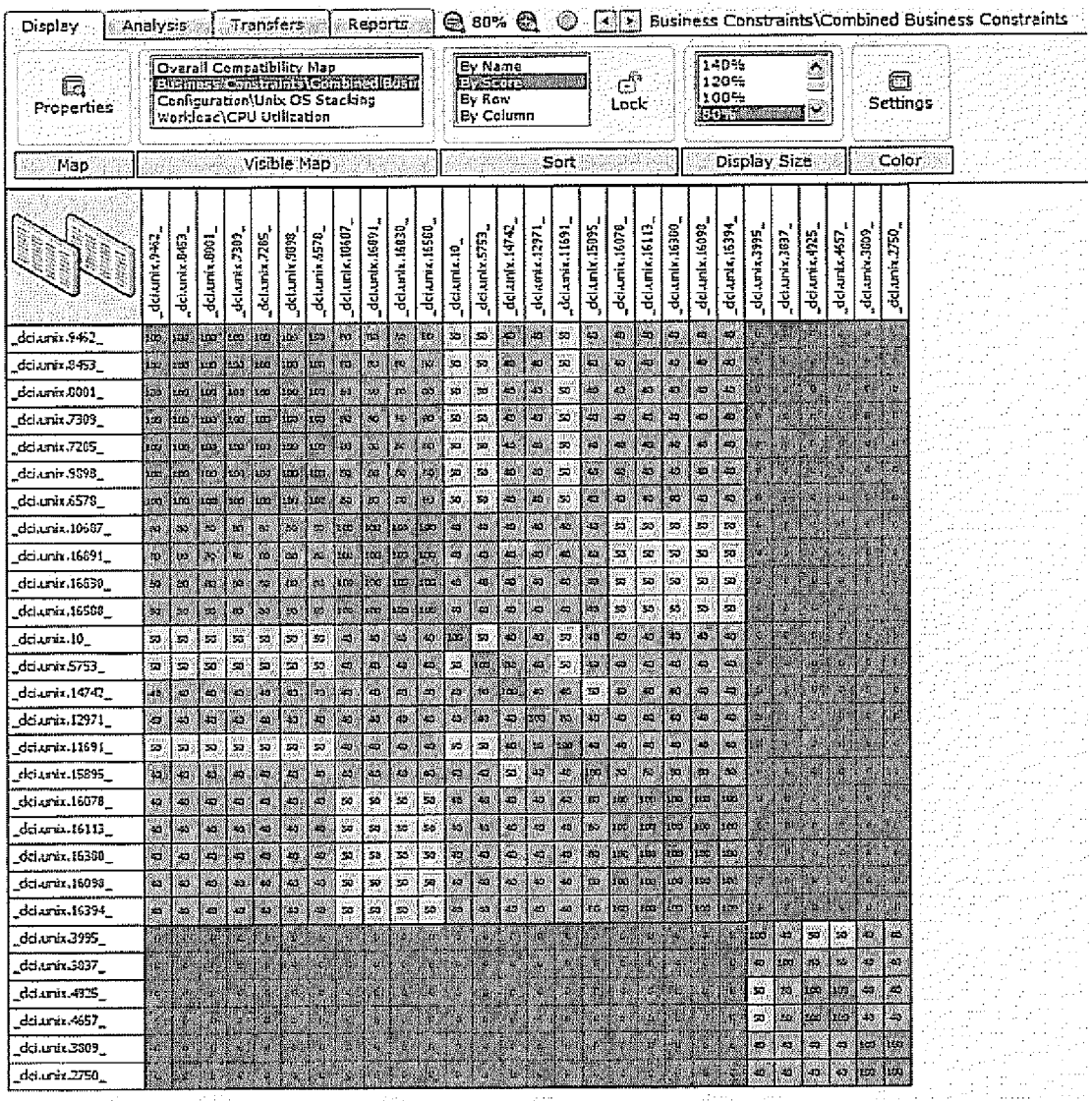
FIG. 39 is an example 1-to-1 compatibility map for business constraints.
Figure 41:
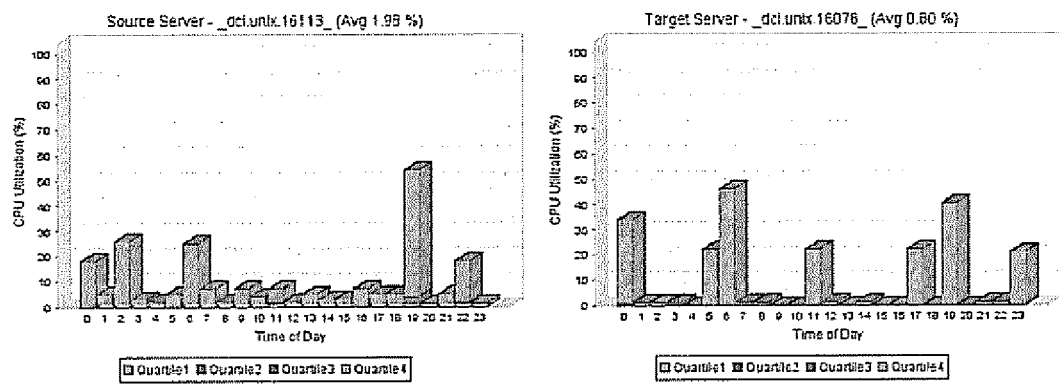
FIG. 41 is an example workload compatibility report.
Figure 43:
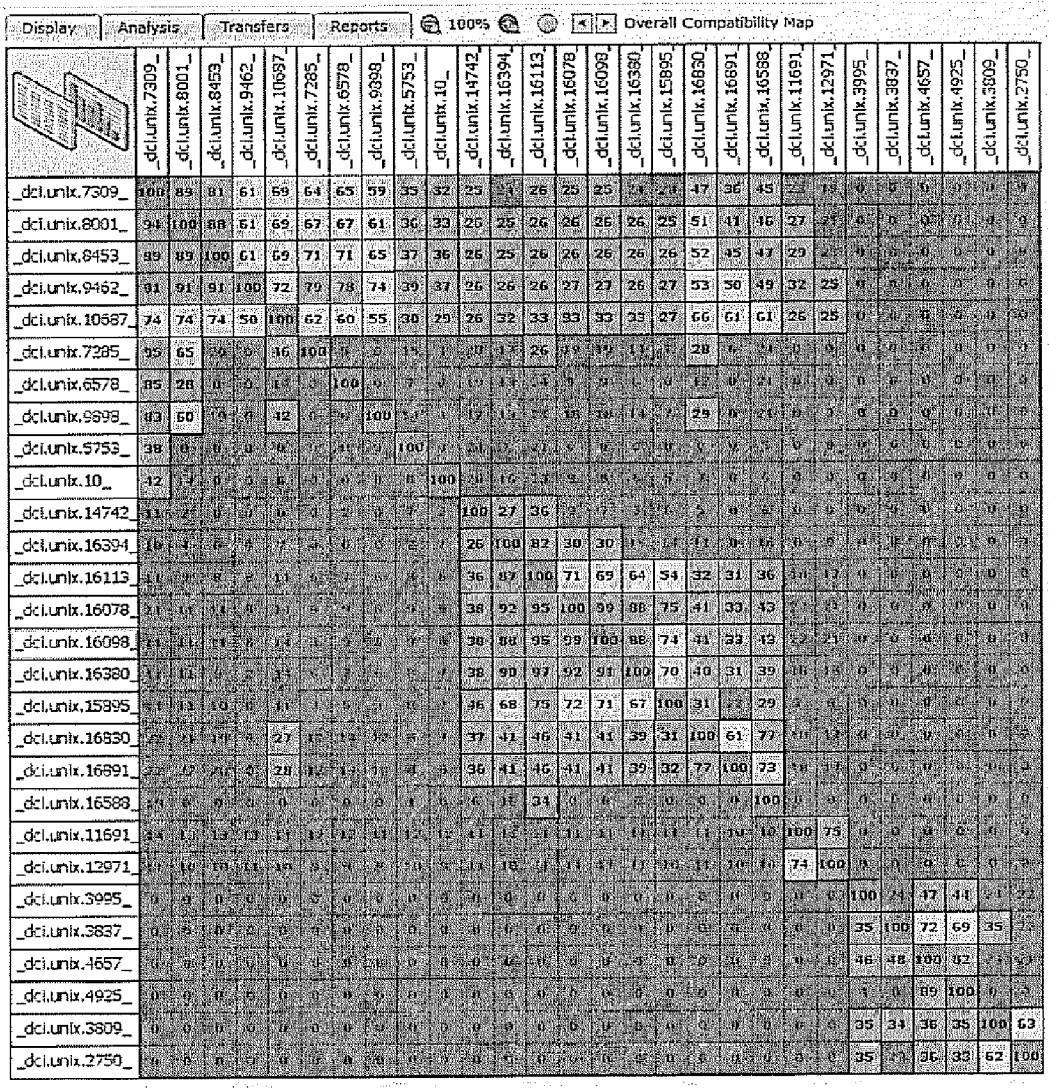
FIG. 43 is an example of a 1-to-1 overall compatibility map.
Figure 45:
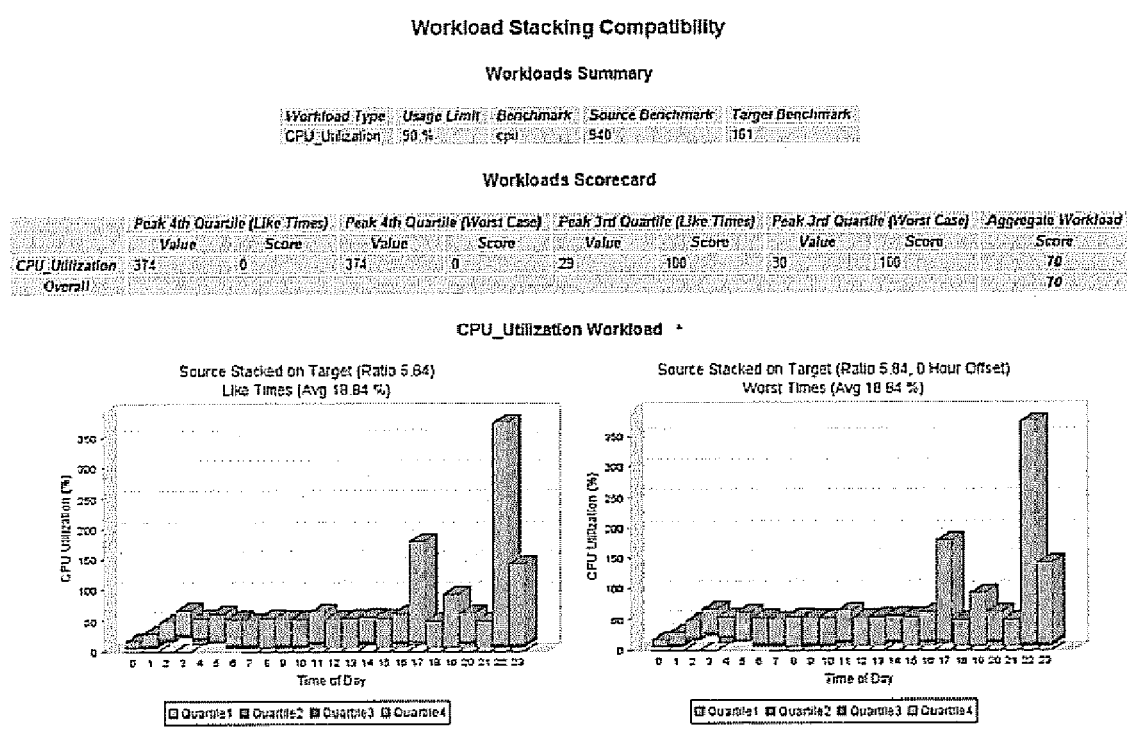
FIG. 45 shows the workload details of the overall compatibility report.

In this example, two rule sets 28 and one workload type 30 are selected. The following additional input may also be specified if the default values are not appropriate: 1) Adjustment of one or more rule weights, disable rules, or modify remediation costs in one or more of the selected rule sets; 2) Adjustment of the workload data date range; 3) Adjustment of one or more workload limits of the selected workload types; 4) Selection of different workload stacking and scoring parameters; and 5) Changing the importance factors for computing the overall scores. FIGS. 34, 35 and 36 show the pages used to customize rule sets 28, workloads 30 and importance factors 88, respectively. Once the analysis input is specified, the analysis can be executed. The analysis results can be viewed through the web client user interface 44/74. The results include the 1-to-1 compatibility maps for the overall and one for each rule set 28 and workload type 30. Such compatibility maps and corresponding analysis map details are shown in FIGS. 37 to 45.

Multi-Dimensional Compatibility Analysis Example

Figure 46:
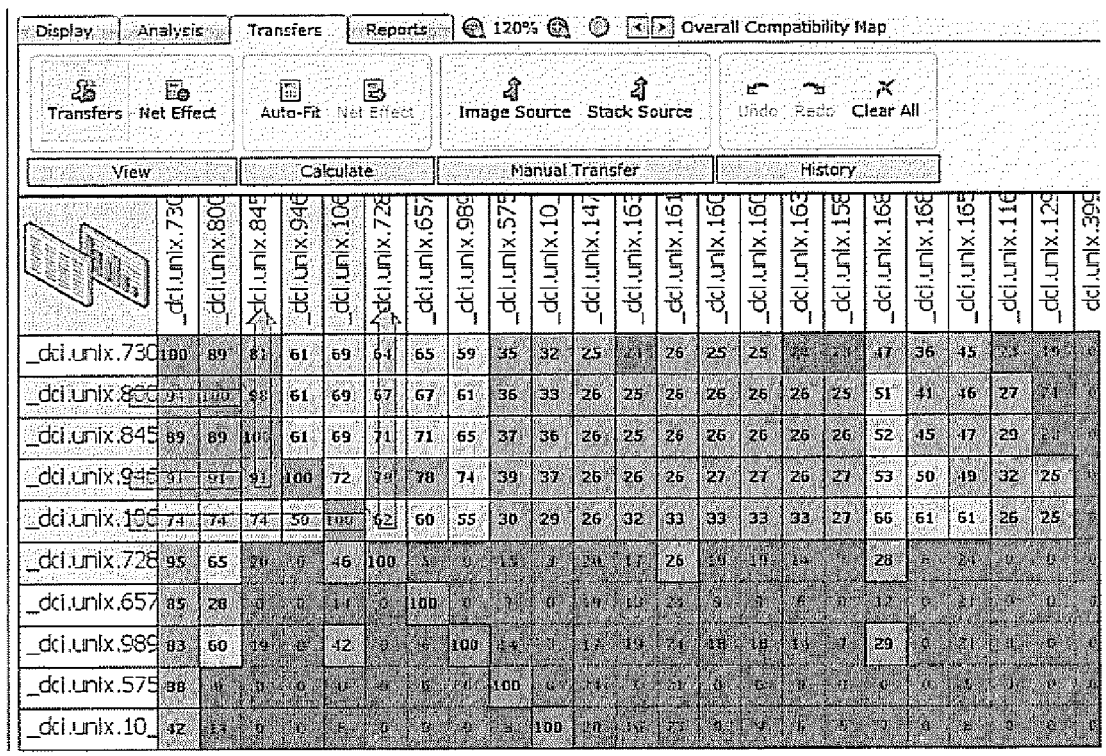
FIG. 46 shows example transfers on a compatibility map with net effect off.
Figure 47:
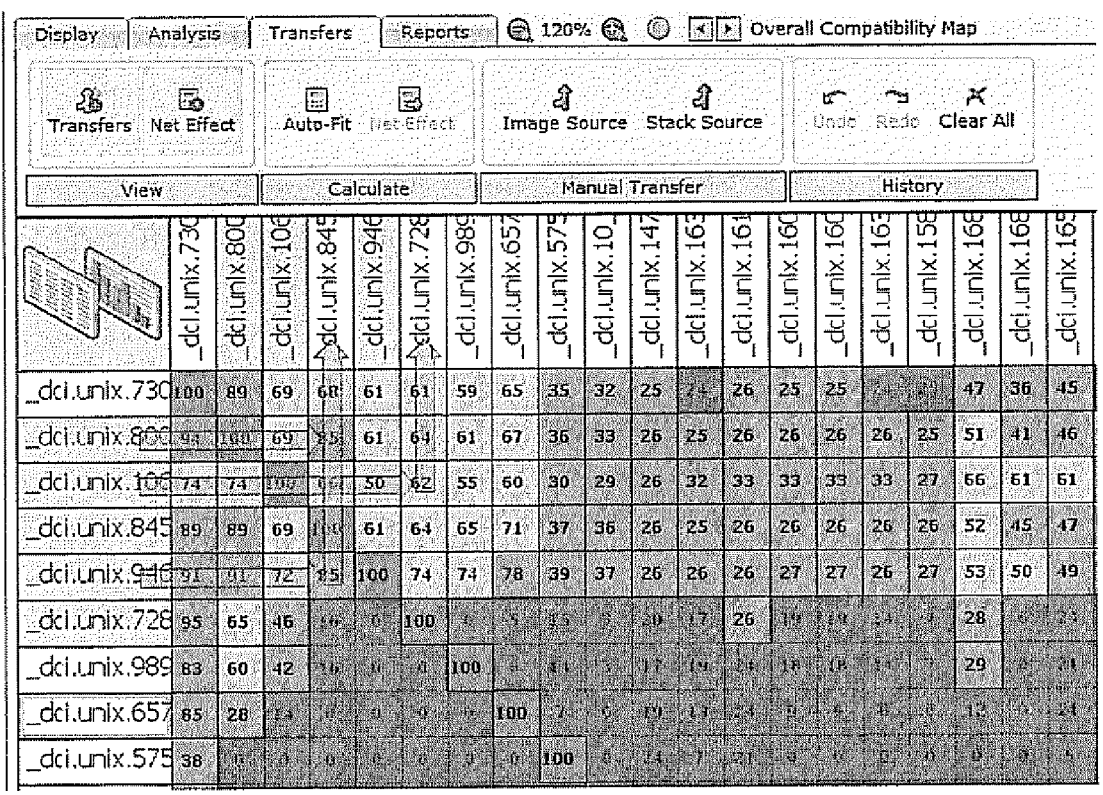

Continuing with the above example, one or more transfer sets 23 can be defined and the transfer sets 23 evaluated through a multi-dimensional compatibility analysis. The transfer sets 23 can be defined through the user interface, and are signified by one or more arrows that connect the source to the target. The color of the arrow can be used to indicate the transfer type (see FIG. 46). Once the transfer sets 23 have been defined, the net effect mode may be selected to run the multi-dimensional analysis. In the resulting compatibility maps, the score in the cells that comprise the transfer set 23 reflects the multi-dimensional compatibility score (see FIG. 47).

The corresponding overall compatibility details report is shown in FIG. 48. Note that there are two sources transferred to the single target.

Consolidation Analysis Example

Figure 49:
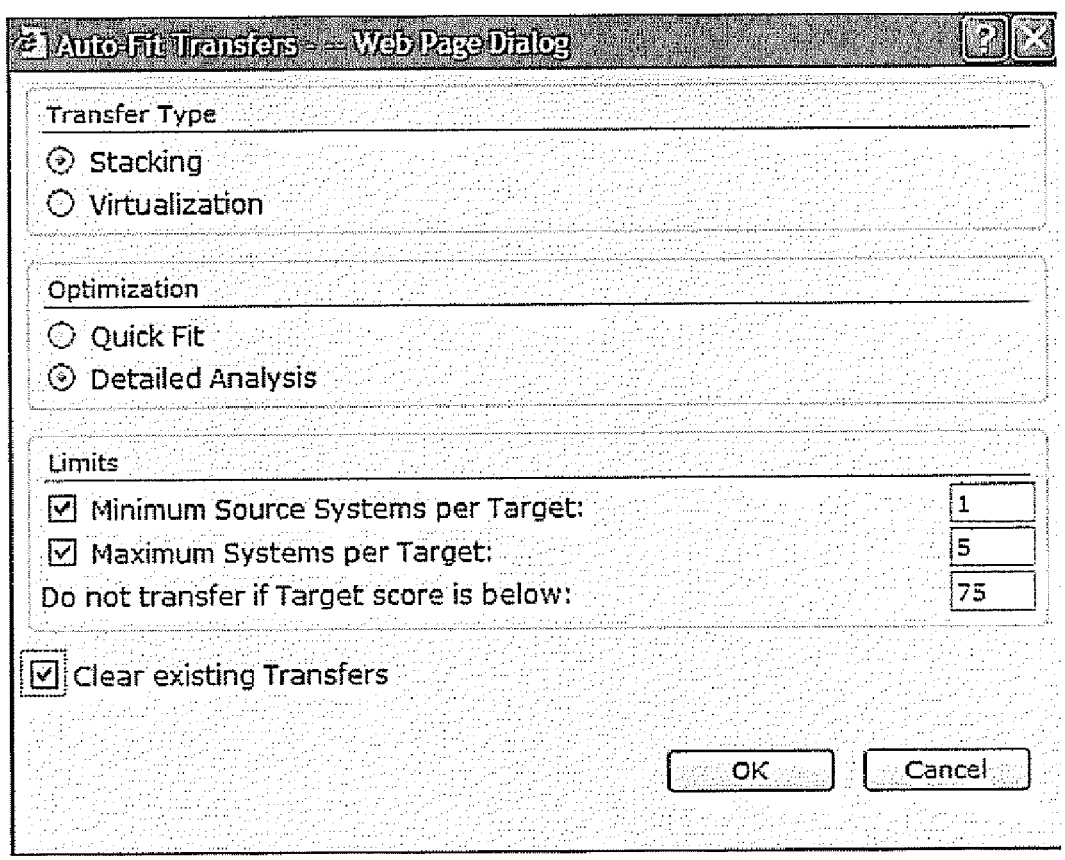
FIG. 49 shows an example of the consolidation analysis (auto fit) input screen.

Again continuing from the above example; a consolidation analysis may be performed to search for a consolidation solution by automating the analysis of the multi-dimensional scenarios. The input screen for the consolidation analysis is shown in FIG. 49. Users can specify several parameters including the minimum allowable overall compatibility score and the transfer type. As well, users can choose to keep or remove existing transfer sets before performing the consolidation analysis.

Figure 50:
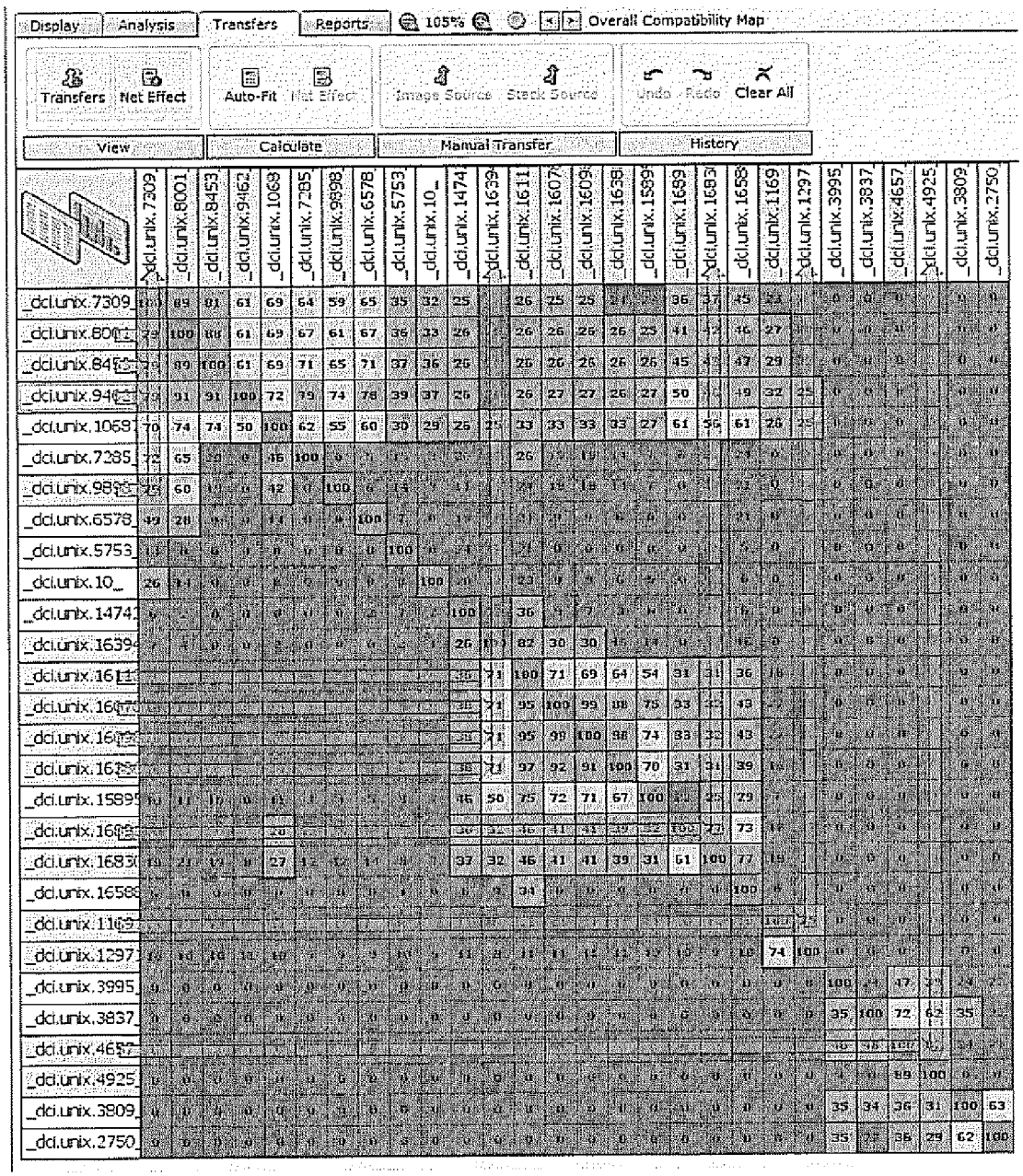
FIG. 50 is an example overall compatibility map for the consolidation solution.

Once specified, the consolidation analysis can be executed and the chosen transfer sets 23 are presented in the map as shown in FIG. 50. The multi-dimensional compatibility score calculations are also used. Finally, a consolidation summary is provided as shown in FIGS. 51 and 52. FIG. 51 shows that should the proposed transfers be applied, 28 systems would be consolidated to 17 systems, resulting in a 39% reduction of systems. FIG. 52 lists the actual transfers proposed by the consolidation analysis.

Commentary

Accordingly, the compatibility and consolidation analyses can be performed on a collection of system to 1) evaluate the 1-to-1 compatibility of every source-target pair, 2) evaluate the multi-dimensional compatibility of specific transfer sets, and 3) to determine the best consolidation solution based on various constraints including the compatibility scores of the transfer sets. Though these analyses share many common elements, they can be performed independently.

These analyses are based on collected system data related to their technical configuration, business factors and workloads. Differential rule sets and workload compatibility algorithms are used to evaluate the compatibility of systems. The technical configuration, business and workload related compatibility results are combined to create an overall compatibility assessment. These results are visually represented using color coded scorecard maps.

It will be appreciated that although the system and workload analyses are performed in this example to contribute to the overall compatibility analyses, each analysis is suitable to be performed on its own and can be conducted separately for finer analyses. The finer analysis may be performed to focus on the remediation of only configuration settings at one time and spreading workload at another time. As such, each analysis and associated map may be generated on an individual basis without the need to perform the other analyses.

It will be appreciated that each analysis and associated map discussed above may instead be used for purposes other than consolidation such as capacity planning, regulatory compliance, change, inventory, optimization, administration etc. and any other purpose where compatibility of systems is useful for analyzing systems 16. It will also be appreciated that the program 10 may also be configured to allow user-entered attributes (e.g. location) that are not available via the auditing process and can factor such attributes into the rules and subsequent analysis.

It will further be appreciated that although the examples provided above are in the context of a distributed system of computer servers, the principles and algorithms discusses are applicable to any system having a plurality of sub-systems where the sub-systems perform similar tasks and thus are capable theoretically of being consolidation. For example, a local network having a number of personal computers (PCs) could also benefit from a consolidation analysis.

Although the invention has been described with reference to certain specific embodiments, various modifications thereof will be apparent to those skilled in the art without departing from the spirit and scope of the invention as outlined in the claims appended hereto.

The invention claimed is:

1. A computer implemented method for placing source systems on target systems, the method comprising:
   evaluating one or more source systems against other source systems and against one or more target systems using at least one rule set that evaluates parameters of the systems to determine whether the systems can or can not be placed together on a specific target system, wherein the evaluating comprises one or more of: a 1-to-1 compatibility analysis, an N-to-1 compatibility analysis, or an N-by-N compatibility analysis; and
   placing the source systems onto the target systems in accordance with technical, business, and workload constraints determined in the compatibility analysis.

2. The method of claim 1, further comprising:
   generating a plurality of potential workload placement solutions; and
   selecting an optimal workload placement solution, from the plurality of potential workload placement solutions.

3. The method of claim 2, wherein the optimal workload placement solution is selected according to one or more criteria, the one or more criteria comprising at least one of a compatibility score, and a number of transfers.

4. The method of claim 1, further comprising ranking a plurality of target systems as candidates to host one or more source workloads according to compatibility scores and a resultant target resource utilization and selecting a best candidate.

5. The method of claim 1, wherein at least one compatibility parameter relates to the presence of licensed software, the method further comprising determining a combination of workloads running particular software applications that when combined onto the target system minimizes the software licensing costs.

6. The method of claim 1, further comprising determining at least one optimal combination of workloads corresponding to virtual machines operable on the target system.

7. The method of claim 6, wherein a virtual machine corresponds to an abstraction of a physical system, enabling an operating system to be independently installed on each virtual system residing on a same physical system.

8. The method of claim 6, wherein a virtual machine corresponds a logical subdivision of an operating system installed on a physical system, enabling isolation in operation without executing a different operating system.

9. The method of claim 1, further comprising determining at least one optimal combination of applications operable independently on the target system.

10. The method of claim 9, wherein the optimal combination of applications coexist in a same operating system environment.

11. The method of claim 9, wherein the optimal combination of applications is determined using a multi-dimensional analysis of inter-compatibility between a plurality of workloads and the target system.

12. A non-transitory computer readable medium comprising computer executable instructions for placing source systems on target systems, the computer executable instructions comprising instructions for:
evaluating one or more source systems against other source systems and against one or more target systems using at least one rule set that evaluates parameters of the systems to determine whether the systems can or can not be placed together on a specific target system, wherein the evaluating comprises one or more of: a 1-to-1 compatibility analysis, an N-to-1 compatibility analysis, or an N-by-N compatibility analysis; and
placing the source systems onto the target systems in accordance with technical, business, and workload constraints determined in the compatibility analysis.

13. The non-transitory computer readable medium of claim 12, further comprising instructions for:
generating a plurality of potential workload placement solutions; and
selecting an optimal workload placement solution, from the plurality of potential workload placement solutions.

14. The non-transitory computer readable medium of claim 13, wherein the optimal workload placement solution is selected according to one or more criteria, the one or more criteria comprising at least one of a compatibility score, and a number of transfers.

15. The non-transitory computer readable medium of claim 12, further comprising instructions for ranking a plurality of target systems as candidates to host one or more source workloads according to compatibility scores and a resultant target resource utilization and selecting a best candidate.

16. The non-transitory computer readable medium of claim 12, wherein at least one compatibility parameter relates to the presence of licensed software, the computer executable instructions further comprising instructions for determining a combination of workloads running particular software applications that when combined onto the target system minimizes the software licensing costs.

17. The non-transitory computer readable medium of claim 12, further comprising instructions for determining at least one optimal combination of workloads corresponding to virtual machines operable on the target system.

18. The non-transitory computer readable medium of claim 17, wherein a virtual machine corresponds to an abstraction of a physical system, enabling an operating system to be independently installed on each virtual system residing on a same physical system.

19. The non-transitory computer readable medium of claim 17, wherein a virtual machine corresponds a logical subdivision of an operating system installed on a physical system, enabling isolation in operation without executing a different operating system.

20. The non-transitory computer readable medium of claim 12, further comprising instructions for determining at least one optimal combination of applications operable independently on the target system.

21. The non-transitory computer readable medium of claim 20, wherein the optimal combination of applications coexist in a same operating system environment.

22. The non-transitory computer readable medium of claim 20, wherein the optimal combination of applications is determined using a multi-dimensional analysis of inter-compatibility between a plurality of workloads and the target system.

23. A system for determining compatibility of computer systems for placing source systems on target systems, the system comprising a processor and memory, the memory comprising computer executable instructions for operating the system by:
evaluating one or more source systems against other source systems and against one or more target systems using at least one rule set that evaluates parameters of the systems to determine whether the systems can or can not be placed together on a specific target system, wherein the evaluating comprises one or more of: a 1-to-1 compatibility analysis, an N-to-1 compatibility analysis, or an N-by-N compatibility analysis; and
placing the source systems onto the target systems in accordance with technical, business, and workload constraints determined in the compatibility analysis.

24. The system of claim 23, further comprising instructions for:
generating a plurality of potential workload placement solutions; and
selecting an optimal workload placement solution, from the plurality of potential workload placement solutions.

25. The system of claim 24, wherein the optimal workload placement solution is selected according to one or more criteria, the one or more criteria comprising at least one of a compatibility score, and a number of transfers.

26. The system of claim 23, further comprising instructions for ranking a plurality of target systems as candidates to host one or more source workloads according to compatibility scores and a resultant target resource utilization and selecting a best candidate.

27. The system of claim 23, wherein at least one compatibility parameter relates to the presence of licensed software, the method further comprising determining a combination of workloads running particular software applications that when combined onto the target system minimizes the software licensing costs.

28. The system of claim 23, further comprising instructions for determining at least one optimal combination of workloads corresponding to virtual machines operable on the target system.

29. The system of claim 28, wherein a virtual machine corresponds to an abstraction of a physical system, enabling an operating system to be independently installed on each virtual system residing on a same physical system.

30. The system of claim 28, wherein a virtual machine corresponds a logical subdivision of an operating system installed on a physical system, enabling isolation in operation without executing a different operating system.

31. The system of claim 23, further comprising instructions for determining at least one optimal combination of applications operable independently on the target system.

32. The system of claim 31, wherein the optimal combination of applications coexist in a same operating system environment.

33. The system of claim 31, wherein the optimal combination of applications is determined using a multi-dimensional analysis of inter-compatibility between a plurality of workloads and the target system.

* * * * *

(12) INTER PARTES REVIEW CERTIFICATE (3742nd)

United States Patent
Yuyitung et al.

(10) Number: US 10,523,492 K1
(45) Certificate Issued: Oct. 1, 2024

(54) METHOD AND SYSTEM FOR DETERMINING COMPATIBILITY OF COMPUTER SYSTEMS

(71) Applicants: Tom Yuyitung; Andrew D. Hillier

(72) Inventors: Tom Yuyitung; Andrew D. Hillier

(73) Assignee: CIRBA INC.

Trial Number:

IPR2021-00008 filed Oct. 1, 2020

Inter Partes Review Certificate for:

Patent No.: 10,523,492
Issued: Dec. 31, 2019
Appl. No.: 14/341,471
Filed: Jul. 25, 2014

The results of IPR2021-00008 are reflected in this inter partes review certificate under 35 U.S.C. 318(b).

INTER PARTES REVIEW CERTIFICATE
U.S. Patent 10,523,492 K1
Trial No. IPR2021-00008
Certificate Issued Oct. 1, 2024

AS A RESULT OF THE INTER PARTES REVIEW PROCEEDING, IT HAS BEEN DETERMINED THAT:

Claims 1-33 are cancelled.

\* \* \* \* \*